(12) United States Patent
Kaneko et al.

(10) Patent No.: US 7,480,693 B2
(45) Date of Patent: Jan. 20, 2009

(54) DATA PROVIDING SYSTEM, DATA PROVIDING APPARATUS AND METHOD, DATA ACQUISITION SYSTEM AND METHOD, AND PROGRAM STORAGE MEDIUM

(75) Inventors: Jun Kaneko, Kanagawa (JP); Naoki Nagano, Tokyo (JP); Satoru Kamoto, Kanagawa (JP); Katsushi Fujii, Chiba (JP); Mayumi Shinoda, Kanagawa (JP); Atsushi Fuse, Tokyo (JP); Michinari Kohno, Kanagawa (JP)

(73) Assignee: Sony Corporation (JP)

( * ) Notice: Subject to any disclaimer, the term of this patent is extended or adjusted under 35 U.S.C. 154(b) by 375 days.

(21) Appl. No.: 11/252,062

(22) Filed: Oct. 17, 2005

(65) Prior Publication Data

US 2006/0036710 A1      Feb. 16, 2006

Related U.S. Application Data

(63) Continuation of application No. 10/017,369, filed on Dec. 14, 2001, now Pat. No. 6,993,553.

(30) Foreign Application Priority Data

| Dec. 19, 2000 | (JP) | ............................ P2000-389963 |
| Dec. 19, 2000 | (JP) | ............................ P2000-389964 |
| Dec. 19, 2000 | (JP) | ............................ P2000-389965 |
| Dec. 19, 2000 | (JP) | ............................ P2000-389966 |
| Dec. 19, 2000 | (JP) | ............................ P2000-389967 |
| Dec. 19, 2000 | (JP) | ............................ P2000-389968 |

(51) Int. Cl.
*G06F 15/16* (2006.01)

(52) U.S. Cl. ........................ 709/201; 709/224; 713/165

(58) Field of Classification Search ................. 709/203, 709/220, 228, 201, 224, 226; 725/87; 715/716; 345/619
See application file for complete search history.

(56) References Cited

U.S. PATENT DOCUMENTS 5,353,391 A * 10/1994 Cohen et al. ................. 345/619

(Continued)

*Primary Examiner*—Khanh Dinh
(74) *Attorney, Agent, or Firm*—Lerner, David, Littenberg, Krumholz & Mentlik, LLP

(57) ABSTRACT

The present invention is intended to provide a data providing system including a data providing apparatus having provision image data generating means for generating provision image data of a provision image which is reusable by inlaying a predetermined advertisement image into a predetermined template image into which a predetermined user image can be inlaid as superimposed upon the predetermined advertisement image and providing-side transmitting means for transmitting the provision image data via a network. The data providing system also includes a data acquisition apparatus having acquiring-side receiving means for receiving the provision image data from the data providing apparatus via the network, transmission image data generating means for generating transmission image data of a transmission image for displaying the provision image based on the provision image data onto a predetermined display means, inlaying the predetermined user image as superimposed upon the predetermined advertisement image into the template image of the provision image, and displaying the predetermined user image together with the template image in preference to the predetermined advertisement image until the predetermined user image is detached from the template image, and acquiring-side transmitting means for transmitting the transmission image data to a predetermined destination via the network.

29 Claims, 37 Drawing Sheets

U.S. PATENT DOCUMENTS

| | | | |
|---|---|---|---|
| 5,359,712 A * | 10/1994 | Cohen et al. | 715/723 |
| 6,358,598 B1 | 3/2002 | Hicks | |
| 6,442,293 B1 * | 8/2002 | Ito et al. | 382/154 |
| 6,549,681 B1 * | 4/2003 | Takiguchi et al. | 382/294 |
| 6,640,145 B2 | 10/2003 | Hoffberg et al. | |
| 6,748,424 B1 | 6/2004 | Usuda et al. | |
| 6,850,252 B1 * | 2/2005 | Hoffberg | 715/716 |
| 6,947,571 B1 | 9/2005 | Rhoads et al. | |
| 7,043,527 B2 | 5/2006 | Shiimori et al. | |
| 2001/0018769 A1 * | 8/2001 | Matsui | 725/87 |
| 2002/0091766 A1 | 7/2002 | Shiimori et al. | |
| 2002/0103698 A1 | 8/2002 | Cantrell | |
| 2002/0103860 A1 | 8/2002 | Terada et al. | |
| 2004/0064498 A1 | 4/2004 | Imanishi | |
| 2005/0209923 A1 | 9/2005 | Jablonski et al. | |
| 2006/0041634 A1 | 2/2006 | Kaneko et al. | |

* cited by examiner

FIG. 9

| TEXT | TEXT (CHARACTER STRING), TEXT ATTRIBUTE INFORMATION (FONT, SIZE, COLOR, ETC. CAN BE SET) |
|---|---|
| PHOTO | STILL IMAGE (PHOTO) |
| ANIMATION OBJECT | MOVING IMAGE |
| FRAME | STILL IMAGE (FIXED IMAGE FOR DECORATING PHOTO AND PICTURE) |
| STAMP | STILL IMAGE (IMAGE FOR DECORATING PHOTO AND PICTURE) |
| ANIMATION EFFECTS | ANIMATION EFFECT INFORMATION (FADE-IN, FADE-OUT, ZOOM-IN, ZOOM-OUT, ETC.) |
| FILTERING EFFECTS | FILTERED IMAGE (SEPIA, MONOTONE, ETC., COLOR TONE, BRIGHTNESS, DENSITY, ETC. CAN BE SET) FILTER INFORMATION |
| LINES | STILL IMAGE (LINES FOR DECORATING PHOTO AND PICTURE; LINE COLOR AND THICKNESS CAN BE SET), LAYOUT INFORMATION |
| BALLOON | STILL IMAGE, TEXT (DECORATED TEXT BOX PLACE FOR PHOTO AND PICTURE AT ANY LOCATION FOR ACCOMMODATING TEXT) |
| RINGING MELODY | TONE (PERSONALIZED RINGING MELODY) |
| STANDBY SCREEN | STILL IMAGE, MOVING IMAGE |
| PROGRAM | IMAGE CHANGE, LINK |

FIG. 12

| INFORMATION | CONTENTS | FORMAT |
|---|---|---|
| MAIL INFORMATION | MESSAGE ID, SENDER MAIL ADDRESS, RECIPIENT MAIL ADDRESS, SUBJECT··· | mail··· |
| CARD MANAGEMENT INFORMATION | CARD TYPE, PROVISION PERIOD, TEMPLATE ID, ADVERTISEMENT ID··· | XML··· |
| CARD CONFIGURATION INFORMATION | CARD DELIMITER POSITION, MATERIAL REFERENCE POSITION, STYLE DATA REFERENCE POSITION··· | XML··· |

FIG. 13

| DATA | CONTENTS | FORMAT |
|---|---|---|
| MATERIAL DATA | TEXT (PLAIN, RICH) · · · | TEXT XML, RICHTEXT HTML · · · |
| | STILL IMAGE (PHOTO, PICTURE, FRAME) · · · | JPEG, GIF, SVC · · · |
| | MOVING IMAGE | Motion JPEG, Animation GIF, MPEG · · · |
| | MUSIC | MIDI · · · |
| | TEMPLATE FLAG | |
| STYLE DATA | LAYOUT INFORMATION<br>FONT INFORMATION<br>TEXT INFORMATION<br>BACKGROUND INFORMATION<br>VISIBLE EFFECT INFORMATION | CSS · · · |
| OTHER DATA | CALLING CARD<br>SCHEDULE<br>HYPERLINK | V-CARD<br>V-CALENDER<br>· · · |

FIG. 43

```
        ┌ <card>
        │       <ID>00456215</ID>
        │       <message>
        │               <choice>
        │                       <item>
        │                               <name>choice 1</name>
        │                               <image>choice1.jpg</image>
        │                       </item>
        │
        │                       <item>
        │                               <name>choice 2</name>
        │                               <image>choice2.jpg</image>
   155A │                       </item>
        │
        │                       <item>
        │                               <name>choice 3</name>
        │                               <image>choice3.jpg</image>
        │                       </item>
        │                       <target_program>
        │                               &send_choice($choice_name)
        │                       <target_program>
        │               </choice>
        └ </message>

┌ <message>
        │       <draw_bar>
        │               <item>
        │                       <name>choice1</name>
        │                       <value>$choice1<value>
        │               </item>
        │
155 ─   │               <item>
   155B │                       <name>choice2<name>
        │                       <value>$choice2<value>
        │               </item>
        │
        │               <item>
        │                       <name>choice3</name>
        │                       <value>$choice3<value>
        │               </item>
        │       </draw_bar>
        └ </message>

┌ <program>
        │       <send_choice>
        │               <jog>send email</job>
        │                       <adress>aaa1@bbb.co.jp</adress>
        │                       <adress>aaa2@bbb.co.jp</adress>
        │                       <adress>aaa3@bbb.co.jp</adress>
        │                       <message>
   155C │                               <target_message>
        │                                       <draw_bar>
        │                                       $choice_name=+1
        │                                       </draw_bar>
        │                               </target_message>
        │                       </message>
        │               </send_choice>
        │               </task>
        └       </program>
        └ </card>
```

DATA PROVIDING SYSTEM, DATA PROVIDING APPARATUS AND METHOD, DATA ACQUISITION SYSTEM AND METHOD, AND PROGRAM STORAGE MEDIUM

CROSS-REFERENCE TO RELATED APPLICATIONS

The present application is a continuation of U.S. application Ser. No. 10/017,369 filed Dec. 14, 2001, now U.S. Pat. No. 6,993,553 issued Jan. 31, 2006, which claims priority from Japanese Application Nos. P2000-389963, P2000-389964, P2000-389965, P2000-389966, P20003-89967, and P2000-389968, each filed Dec. 19, 2000, the disclosures of which are hereby incorporated by reference herein.

BACKGROUND OF THE INVENTION

The present invention relates generally to a data providing system, a data providing apparatus and method, a data acquisition apparatus and method, and a program storage medium. For example, the present invention is suitably applicable to a data providing system constituted by a data providing apparatus and a camera-mounted digital mobile phone.

Recently, digital mobile phones having electronic mail transfer capabilities are in wide use. Use of these digital mobile phones allows easy transfer of electronic mail also outside home or office, which has been gradually increasing the chances of using electronic mail in daily communication.

Today, a communication service is in practice in which electronic mail originated from digital mobile phones is first sent to a predetermined service server to be attached with advertisements before being received by addressees. In compensation for placing advertisements, the service server discounts the transmission cost for example of electronic mail senders.

However, this service presents a problem that, although this cost reduction service should be provided to those exposed to advertisements, it is provided to the electronic mail senders who are not exposed to advertisements, thereby making it difficult to appropriately provide the advertisement attachment service.

SUMMARY OF THE INVENTION

It is therefore an object of the present invention to provide a data providing system, a data providing apparatus and method, a data acquisition apparatus and method, and a program storage medium which appropriately provide the service of attaching advertisements to electronic mail.

In carrying out the invention and according to an aspect thereof, there is provided a data providing system including a data providing apparatus for generating the provision image data of a provision image (an image to be provided) which is reusable by inlaying a predetermined advertisement image into a predetermined template image in which a predetermined user image can be inlaid as superimposed upon the predetermined advertisement image and sending the generated provision image data via a network and a data acquisition apparatus for receiving the provision image data from the data providing apparatus via the network, displaying the provision image based on the received provision image data, inlaying the predetermined user image into the template image of this provision image as superimposed upon the predetermined advertisement image, and generating transmission image data of a transmission image for displaying the predetermined user image along with the predetermined template image in preference to the predetermined advertisement image until this predetermined user image is detached from the template image.

According to the above-mentioned novel constitution, a service can be provided for allowing only those users who have browsed advertisement images through provision images to use the provision image data for the image transmission by the users.

BRIEF DESCRIPTION OF THE DRAWINGS

These and other objects of the invention will be seen by reference to the description, taken in connection with the accompanying drawing, in which:

FIG. 9 is a table showing components of template image data and advertisement image data;

FIG. 12 is a table showing various information to be stored in the header portion of card data;

FIG. 13 is a table showing data to be stored in the data portion of card data;

FIG. 43 is a schematic diagram illustrating a linking program stored in the data portion of linkable message card data.

DETAILED DESCRIPTION OF THE PREFERRED EMBODIMENT

This invention will be described in further detail by way of example with reference to the accompanying drawings.

(1) Principles of Operation of Internet-Based Electronic Commerce

The Internet is a computer network built by interconnecting a huge number of computers through communication links, transferring information between the connected computers by means of various services such as electronic mail, Gopher, and the WWW (World Wide Web).

Figure 1:
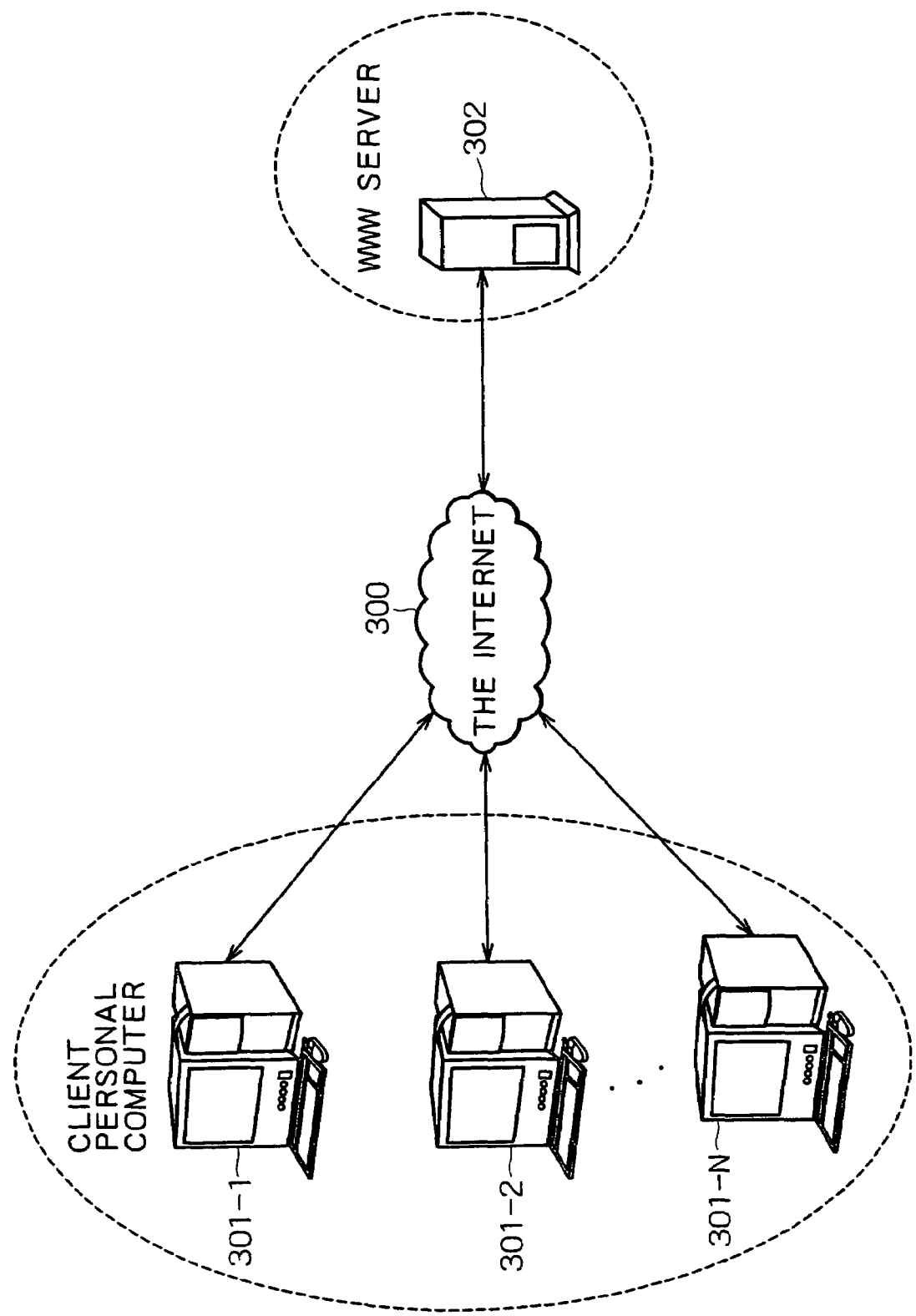
FIG. 1 is a schematic diagram illustrating the principles of operation of electronic commerce based on the Internet.

To be more specific, as shown in FIG. 1, a WWW server 302 (also referred to as a Web server or a Web site) for providing various services such as WWW to client PCs (Personal Computers) 301-1 through 301-N through the Internet stores in its hard disk Web pages made up of graphics information such as graphics and images.

The WWW server 302 and various resources such as Web pages for use on the WWW are uniquely identifiable by URL (Uniform Resource Locator), a technology for addressing on the Internet.

Therefore, when the URL of a Web page is specified by a user through a predetermined transfer protocol such as HTTP (HyperText Transfer Protocol), corresponding one of the client PCs 301-1 through 301-N connected to the Internet 300 requests the WWW server 302 for the browsing of the requested Web page in accordance with the specified URL.

Then, when the client PC has receives the requested Web page from the WWW server 302, the client PC displays the received Web page on its display section through a WWW browser stored in its hard disk for the user to browse the requested Web page.

Typical Web pages are defined by use of HTML (HyperText Markup Language). A HTML document defining a Web page concerned includes symbols called tags (reserved words) for specifying how to display the Web page.

For example, each HTML document includes various tags for displaying many functions such as graphics and control and can be specified for linking with the URLs of Web pages available on the WWW server 302 or other WWW servers from which Web page browsing is requested.

Consequently, the requested Web page is displayed on the display section of the requesting one of the client PCs 301-1 through 301-N in a manner desired by the provider of this Web page.

Recently, the above-mentioned WWW is used for the electronic commerce based on the Internet 300.

In this electronic commerce, the WWW server 302 prepares Web pages containing product catalogs created by electronically listing the products for sale and transmits the Web page which corresponds to a user request for browsing to the requesting one of the client PCs 301-1 through 301-N.

The requesting client PC displays the Web page received from the WWW server 302 through the Internet 300 on its display section for the user to browse the requested product catalogs.

When a product listed in the product catalog displayed on the display section is selected on the Web page by the user, one of the client PCs 301-1 through 301-N notifies the WWW server 302 of the selection through the Internet 300.

In response, the WWW server 302 requests one of the client PCs 301-1 through 301-N for the customer information of the user and receives from one of the client PCs 301-1 through 301-N the customer information such as the name, credit card number, product deliver address of the user.

Next, upon reception of the above-mentioned customer information, the WWW server 302 sends the Web page for product order confirmation to one of the client PCs 301-1 through 301-N to make the user confirm the contents of the order on this Web page and arrange a product delivery schedule.

Such Internet-based electronic commerce for various products as mentioned above is implemented by electronically distributing digital content such as music to customers via the Internet 300 and physically distributing products such as personal computers for example by use of delivery business.

Web pages are defined by XML (eXtensible Markup Language) in addition to HTML. Like HTML, XML expresses the structures and meanings of document by use of tags. Further, XML can specify attributes such as hierarchical structure and data type for tags by use of DTD (Document Type Definition).

Therefore, in the WWW server 302, if a Web page is defined by use of XML, information processing data such as order receipt codes, product codes, unit prices, and quantities stored in a database for example can be embedded in various tags, so that Web pages may be used not only for browsing, but also for automatically executing such information processing as order receipt computation by use of the information processing data embedded in tags.

(2) Configuration of Data Providing System (2-1) Overall Configuration

Figure 2:
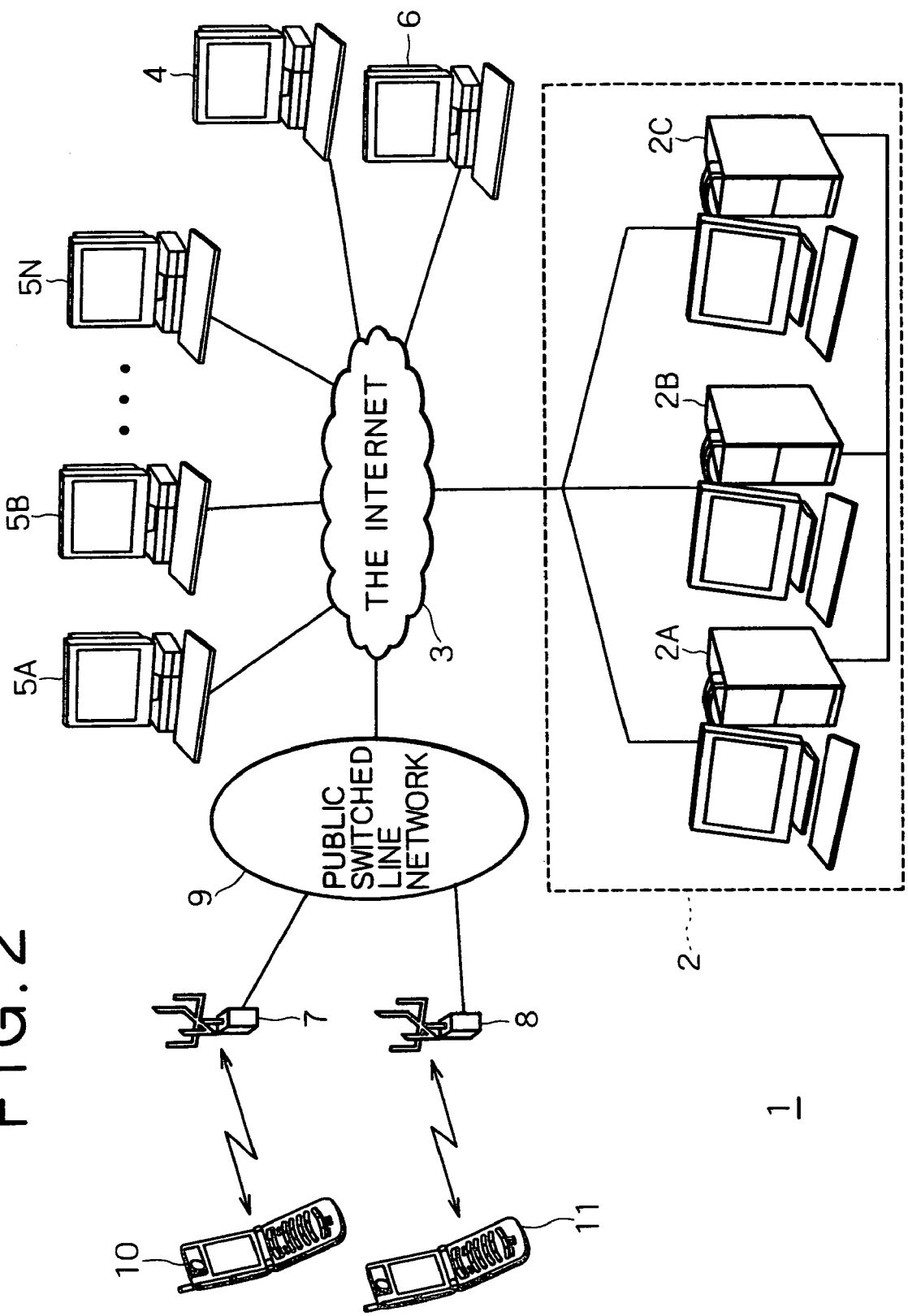
FIG. 2 is a schematic diagram illustrating an overall configuration of a data providing system practiced as one embodiment of the invention.

Referring to FIG. 2, reference numeral 1 denotes a data providing system associated with the present invention in which a data management server 2A, a send/receive management server 2B, and a fee-charge processing server 2C are interconnected in a data providing apparatus 2 owned by a service provider, these servers being also connected to the Internet 3.

The Internet 3 is also connected to a personal computer 4 for advertisement order placement owned by an advertiser (hereafter referred to as an advertisement order placing PC), two or more personal computers 5A through 5N for creating data owned by design companies and individuals for example (hereafter referred to as data creating PCs), a personal computer 6 for settlement processing owned by a settlement institution such as a bank (hereafter referred to as a settlement processing PC).

The Internet 3 is further connected through a public switched line network 9 to base stations 7 and 8, which are fixed radio stations each arranged in each of the cells obtained by dividing a communication service area into a desired size. Camera-mounted digital mobile phones 10 and 11 are wirelessly connected to the base stations 7 and 8 by a communication scheme known as W-CDMA (Wideband-Code Division Multiple Access) for example. The camera-mounted digital mobile phones 10 and 11 operates at high-speed data transfer of up to 2 Mbps by use of 2-GHz frequency band based on W-CDMA, thereby performing various kinds of data communications such as the transfer of electronic mail, the browsing of simplified home pages, and the transfer of image data, in addition to the normal voice talk communication.

In this configuration, the data providing apparatus 2 totally manages, as data for displaying images in card forms (the data are hereafter referred to as card data), the card data for many product advertisements desired by the advertiser to be distributed on the Internet 3 (the card data are hereafter especially referred to as advertisement card data). The data providing apparatus 2 provides the advertisement card data to the camera-mounted digital mobile phones 10 and 11 via the Internet 3, thereby performing product advertisements.

Actually, the advertiser places, from the advertisement order placing PC 4 to a design company through the Internet 3, an order for the creation of product advertisements to be placed on the Internet 3.

Figure 3:
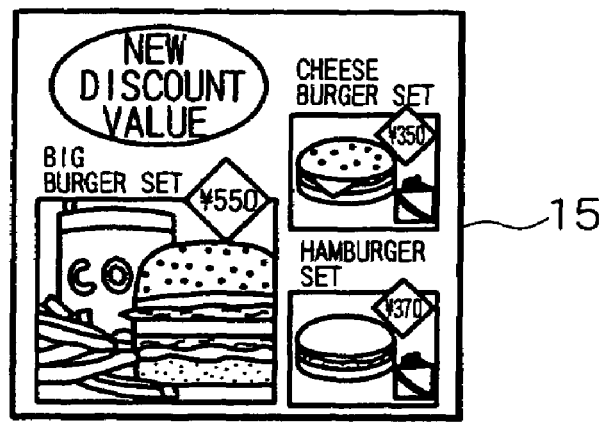
FIG. 3 is a schematic diagram illustrating an advertisement image configuration.
Figure 4:
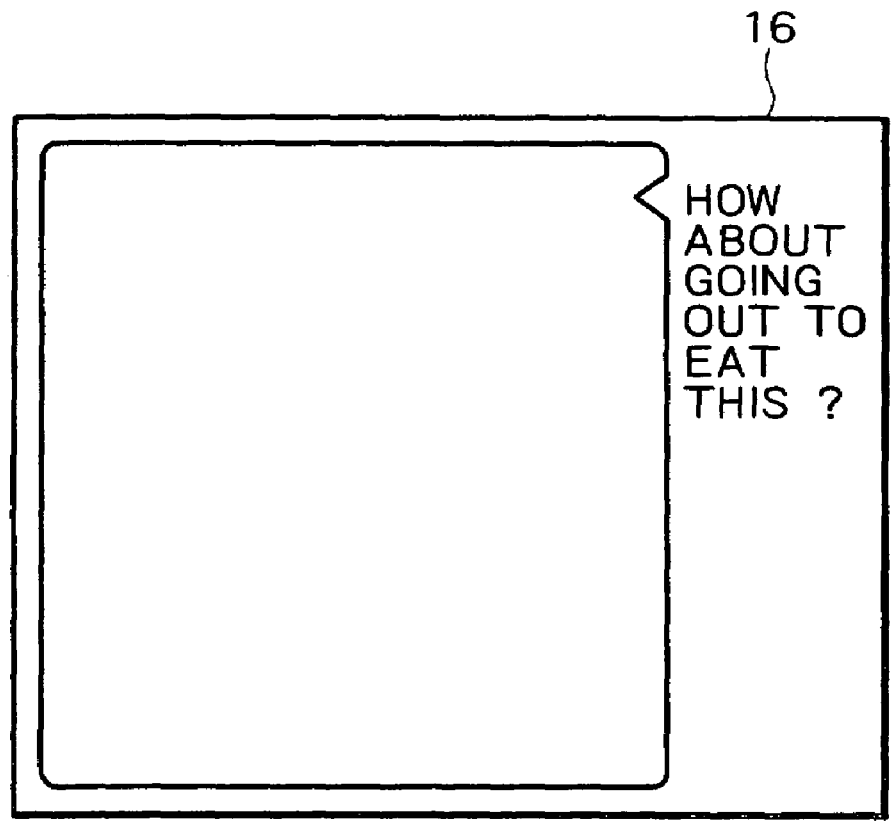
FIG. 4 is a schematic diagram illustrating a template image configuration.

The design company receives, by one of its data creating PCs 5A through 5N, the request for creating the product advertisement ordered by the advertiser and creates, by one of its data creating PCs 5A through 5N, the advertisement image data of an advertisement image 15 as shown in FIG. 3 represented by text and still image for example intended by the advertiser. At the same time, as shown in FIG. 4, the design company creates the template image data of a template image 16 composed of a frame (still image) for decorating the advertisement image 15 and phrases (text) for highlighting or complementing the advertisement image 15, transmitting the created advertisement image data or template image data to the data management server 2A of the data providing apparatus 2 via the Internet 3.

In the data providing system 1, design companies having no order for creating product advertisements from advertisers or individuals can create template image data by use of their data creating PCs 4A through 4N and transmit the created template image data to the data management server 2A of the data providing apparatus 2 via the Internet 3.

Receiving the various advertisement image data and template image data from the data creating PCs 5A through 5N, the data management server 2A registers these template image data and advertisement image data by associating the template image 16 with the advertisement image 15 which is inlaid in the template image 16, storing these data into an internal hard disk.

Having associated the template image data with the advertisement image data, the data management server 2A generates a Web page composed by a table which electronically lists the titles of advertisement card data to be generated on the basis of these associated template image data and advertisement image data (this Web page will hereafter be referred to as a card acquiring Web page), storing the created Web page into the internal hard disk.

When the browsing of the card acquiring Web page is requested from the camera-mounted digital mobile phone 10 or 11 in a predetermined communication protocol such as HTTP via the nearby base station 7 or 8, the public switched line network 9, and the Internet 3, the data management server 2A sends the requested card acquiring Web page to the requesting camera-mounted digital mobile phone 10 or 11 via the Interent 3, the public switched line network 9, and the base station 7 or 8.

Consequently, upon reception of the card acquiring Web page from the data management server 2A via the Internet 3, the camera-mounted digital mobile phone 10 or 11 displays the received card acquiring Web page on its display section for the user to browse.

Upon request from the camera-mounted digital mobile phone 10 or 11 letting the user browse the card acquiring Web page via the nearby base station 7 or 8, the public switched line network 9, and the Internet 3 for the browsing of advertisement card data, the data management server 2A generates the requested advertisement card data from the corresponding template image data and advertisement image data and sends the generated advertisement card data to the requesting camera-mounted digital mobile phone 10 or 11 via the Internet 3, the public switched line network 9, and the base station 7 or 8.

Figure 5:
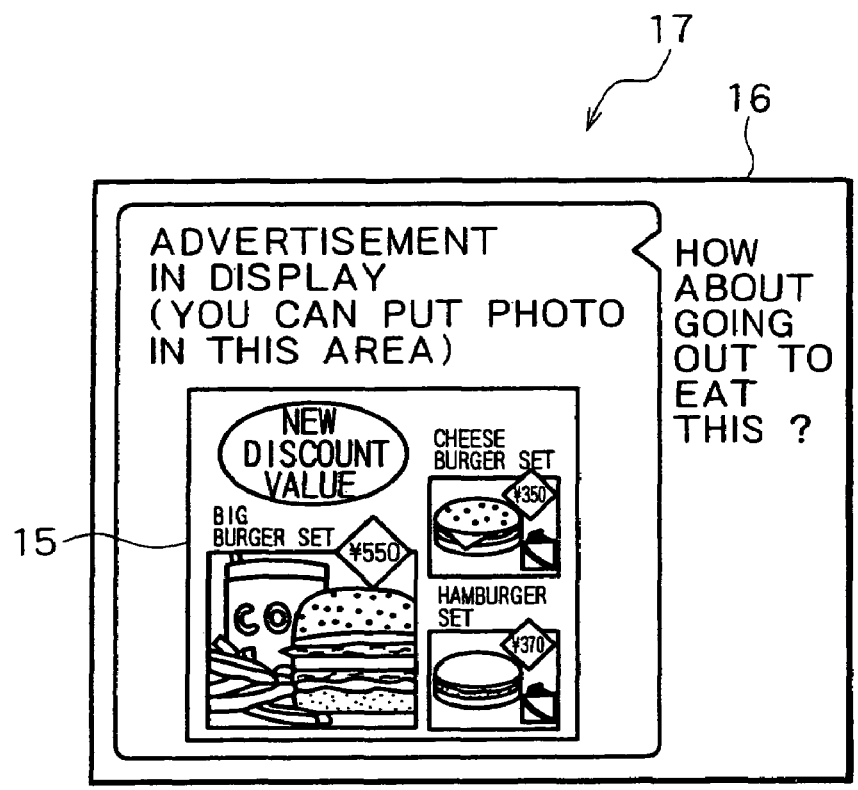
FIG. 5 is a schematic diagram illustrating an advertisement card image configuration.

Thus, upon reception of the advertisement card data from the data management server 2A via the Internet 3, the camera-mounted digital mobile phone 10 or 11 displays on its display section an advertisement card image 17 formed by inlaying the advertisement image 15 into the template image 16 on the basis of the received advertisement card data as shown in FIG. 5.

When the advertisement card image 17 is selected and specified by the user as a result of its browsing, the camera-mounted digital mobile phone 10 or 11 records the advertisement card data of the advertisement card image 17 into the semiconductor memory in a Memory Stick (trademark of Sony Corporation) detachably loaded in the camera-mounted digital mobile phone 10 or 11.

The advertisement card image 17 acquired by the camera-mounted digital mobile phone 10 or 11 is formed by one or more card-shaped images which can be displayed one after the other on its display section, thereby advertising products to the user through the advertisement image 15 and the template image 16.

In addition to the above-mentioned configuration, the advertisement card image 17 and the template image 16 cannot be manipulated by the user. On the contrary, as apparent from the attribute display (also includes "You can put a message in this area" for example) indicative of the manipulative advertisement image 15 like "Advertisement in display (You can put a photo in this area)" shown in FIG. 5, the advertisement image 15 can be manipulated by the user such that a message image formed by a still image to be transmitted to user's friends for example is superimposed on the advertisement image 15, thus being available for use in message transmission.

To be more specific, according to the above-mentioned advertisement image 17 shown in FIG. 5, the advertisement image 15 of hamburger is generated as inlaid in the template image 16 formed by a frame written with a phrase "How about going out to eat this?" for the advertisement image 15. At the time of message image manipulation, the template image 16 can be used as it is, thereby inlaying a message image into the template image 16 as superimposed on the advertisement image 15.

Figure 6:
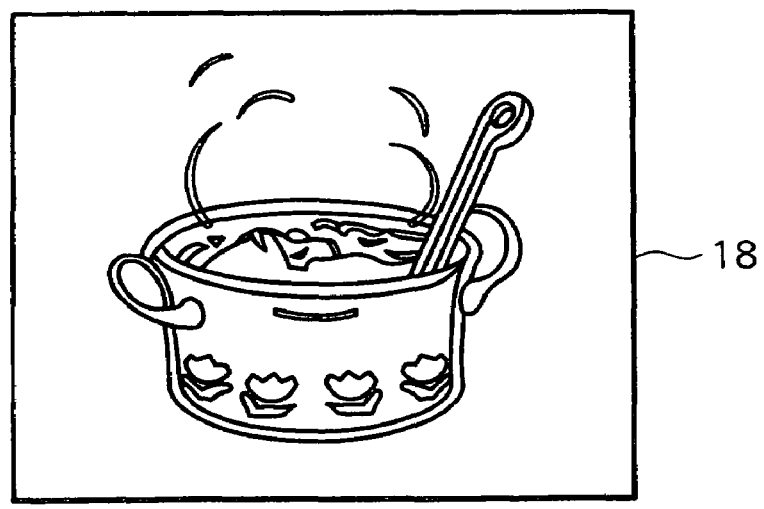
FIG. 6 is a schematic diagram illustrating a message image configuration.
Figure 7:
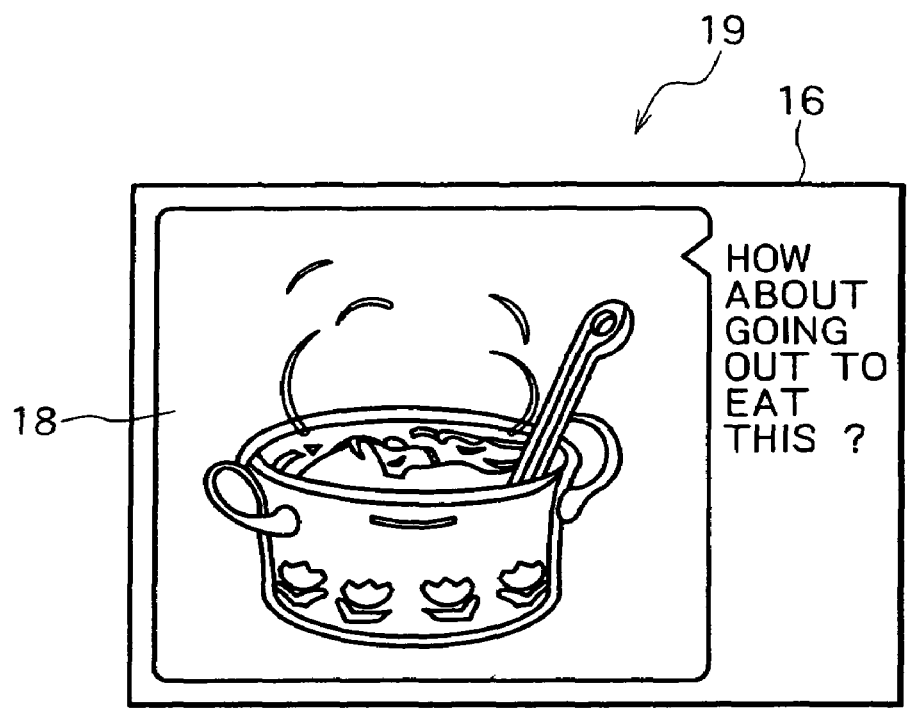
FIG. 7 is a schematic diagram illustrating a message card image.

Therefore, as shown in FIG. 6, when the manipulation of the advertisement image 17 is commanded by the user, the camera-mounted digital mobile phone 10 or 11 inlays a message image 18 (a still image) obtained by imaging a pan of stew for example by a CCD (Charge Coupled Device) camera mounted on the camera-mounted digital mobile phone 10 or 11 into the template image 16 of the advertisement image 17 as superimposed on the advertisement image 15 as shown in FIG. 7, generating a message card image 19 for displaying on the destination the message image 18 in preference to the advertisement image 15.

Then, while effectively using the template image 17 as it is, the camera-mounted digital mobile phone 10 or 11 can create the message card image 19 for asking for going out to eat stew only by inlaying the message image 18 obtained by imaging a pot of stew for example into the template image 16 of the advertising card image 17 as superimposed on the hamburger advertisement image 15, thus easily generating the message card image 19 specified by the user without requiring the inputting of many characters for example.

Consequently, after generating the message card image 19, when the mail address of the destination of the message card image 19 is specified by the user, the camera-mounted digital mobile phone 10 or 11 sends the card data (hereafter referred to as message card data) of the message card image 19 to the send/receive management server 2B via the nearby base station 7 or 8, the public switched line network 9, and the Internet 3 on the basis of this mail address and a simplified electronic mail transfer protocol called SMTP (Simple Mail Transfer Protocol).

The send/receive management server 2B totally manages the transfer of the message card data and, upon reception of the message card data from the camera-mounted digital mobile phone 10 or 11, the sending source of the message card data, stores the received message card data into its hard disk.

Then, the send/receive management server 2B sends the message card data from the hard disk to the camera-mounted digital mobile phone 10 or 11 via the Internet 3, the public switched line network 9, and the base station 7 or 8 on the basis of an electronic mail transfer protocol called IMPA4 (Internet Message Access Protocol version 4).

Receiving the message card data, the camera-mounted digital mobile phone 10 or 11 displays the message card image 19 based on the received message card data onto its display for the user of the destination camera-mounted digital mobile phone 10 or 11 (hereafter referred to as a message recipient) to browse.

If the message recipient uses the received message card data for his message transmission, the camera-mounted digital mobile phone 10 or 11 extracts the message image 18 (a pot of stew) from the message card image 19 based on the received message card data and presents the advertisement card image 17 described with reference to FIG. 5 to the message recipient, thereby advertising the product (hamburger) to the message recipient.

Figure 8:
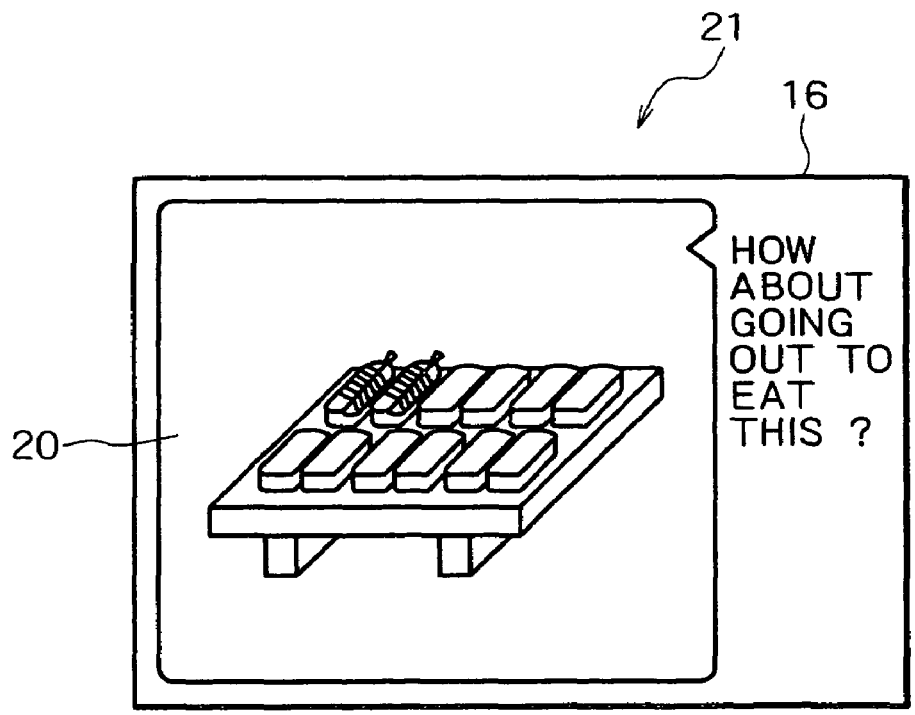
FIG. 8 is a schematic diagram illustrating another message card image.

Next, as shown in FIG. 8, the camera-mounted digital mobile phone 10 or 11 images through its CCD camera a dish of sushi for example to get a new message image 20 and, at the same time, inlays the message image 20 into the template image 16 of the advertisement card image 17 as superimposed on the advertisement image 15 in the same manner as described with reference to FIG. 7 to create a new message card image 21, sending the message card data of the newly created message card image 21 to the send/receive management server 2B on the basis of the mail address of the destination via the nearby base station 7 or 8, the public switched line network 9, and the Internet 3, the transmitted message card data being stored therein.

Thus, the camera-mounted digital mobile phone 10 or 11 owned by the message recipient reuses the advertisement card data for message transmission, transmitting messages specified by the user of the other camera-mounted digital mobile phone 10 or 11.

Consequently, in the data providing system 1, the advertisement card data can be used without restriction for the message transmission by the user and, at the same time, when using the advertisement card data for the message transmission, the advertisement image 15 is presented to the user every time the advertisement card data are used for the message transmission; if one piece of advertisement card data is sequentially used among many users, the products intended by each advertiser can be advertised on the Internet 3 in the manner of word-of-mouth communication as it were.

Meanwhile, the fee-charge processing server 2C (FIG. 2) periodically (for example, at the end of every month) totals the number of times a product has been advertised by use of the advertisement card data and, on the basis of obtained results, computes the advertisement fee to be billed to the advertiser in accordance with the advertisement count and, at the same time, on the basis of the totaling results, computes the data usage fee for the design companies and the users who created template image data, in accordance with the number of times the advertisement image data and the template image data have been used.

In addition, because the data providing apparatus 2 advertises a product by providing to the user their advertisement card data in place of the advertiser, the fee-charge processing server 2C computes the advertisement mediation fee for the service providing company in accordance with the number of times the product has been advertised in a mediation manner on the basis of the results of totaling the number of times this product has been advertised.

Then, upon periodical computation of the advertisement fee, the data usage fee, and the advertisement mediation fee, the fee-charge processing server 2C sends, as the fee-charge processing data for product advertisement (hereafter referred to as advertisement fee-charge processing data), these fees and the registered information including the banks of account and account numbers of the advertisers, design companies, individuals who have created template image data, and service providing companies stored in the hard disk to the settlement processing PC 6 via the Internet 3.

Further, when message card data are transferred between the camera-mounted digital mobile phones 10 and 11 via the send/receive management server 2B, the fee-charge processing server 2C computes the transmission fee for the users of these phones and sends the computed transmission fee and the registered information including users' banks of account and account numbers stored in the hard disk to the settlement processing PC 6 via the Internet 3 as the fee-charge processing data (hereafter referred to as message send/receive fee-charge processing data).

Upon reception of advertisement fee-charge processing data from the fee-charge processing server 2C, the settlement processing PC 6 draws from the bank account of the advertiser the advertisement fee on the basis of the advertisement fee, data usage fee, and advertisement mediation fee obtained on the basis of the received advertisement fee-charge processing data and on the basis of the banks of account and account numbers of advertiser, design company, individuals who created template image data, and service providing company, divides the drawn advertisement fee into data usage fee and advertisement mediation fee, and remits these fees to the corresponding design company, individuals who created template image data, and service company, thereby executing electronic settlement processing.

Further, upon reception of message send/receive fee-charge processing data from the fee-charge processing server 2C, the settlement processing PC 6 draws from the user's bank account the transmission fee on the basis of the transmission fee obtained on the basis of the received message send/receive fee-charge processing data and the user's account of bank and account number and remits the drawn transmission fee to the service company, thereby executing electronic settlement processing.

Thus, the data providing system 1 directly provides advertisement card data to the users of the camera-mounted digital mobile phones 10 and 11 for product advertisement and, at the same time, allows each user to use the advertisement card data for message transmission. Consequently, a novel business process can be built in which products can be effectively advertised between the camera-mounted digital mobile phones 10 and 11 which have received the message card data generated from the provided advertisement card data by reusing the message card data on the basis of the Internet 3.

(2-2) Configuration of Card Data

As shown in FIG. 9, template image data and advertisement image data each use, as material data, documents (text) and photographs (still image data), moving images captured by video camera, animation, and still images such as background, frame, and line, music such as ringing melodies, and programs. The layout information and text information such as character font and color (these are hereafter generically referred to as style data) for example of these material data are defined by use of HTML, XML, or CSS (Cascading Style Sheets) for example.

Further, template image data and advertisement image data may be embedded with animation effect information and filtering information to add image changing visual effects such as animation effects including fade-in and fade-out and filtering effects including setting of tone, brightness and density.

Figure 10:
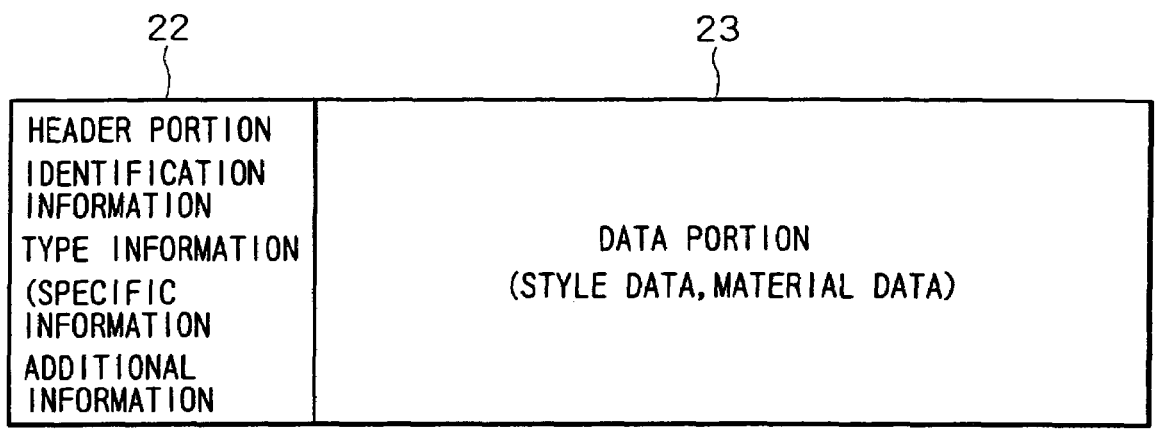
FIG. 10 is a schematic diagram illustrating template image data and advertisement image data configuration.

Referring to FIG. 10, template image data are package data having a header portion 22 and a data portion 23. The header portion 22 has identification information indicative of template image data, type information indicative of the type of the advertisement image 15 to be inlaid, and, if the advertisement image 15 to be inlaid has been specified beforehand, specification information for specifying this advertisement image 15, along with additional information indicative of the provision period of time based on the Internet 3 and the size of the template image data for example.

The data portion 23 of template image data has the style data defined by HTML, XML, or CSS for example, the material data constituting the template image 16, and a template flag for disabling the manipulation of the material data by the user. If the material data for the template image 16 are moving image data, still image data, and music data, these data are compressed by a predetermined compression algorithm to be stored in the data portion 23.

On the other hand, advertisement image data are package data having a header portion and a data portion like the template image data described with reference to FIG. 10. The header portion has identification information indicative of advertisement image data, type information indicative of the type of the template image 16 to be inlaid, and, if the template image 16 to be inlaid has been specified beforehand, specification information for specifying this template image 16, along with additional information indicative of the provision period of time based on the Internet 3, name of product to be advertised, and the size of the advertisement image data for example.

The data portion of advertisement image data stores the style data defined by HTML, XML, or CSS for example and the material data constituting the advertisement image 15. If the material data for the advertisement image 15 are moving image data, still image data, and music data, these data are compressed by a predetermined compression algorithm to be stored in the data portion.

Figure 11:
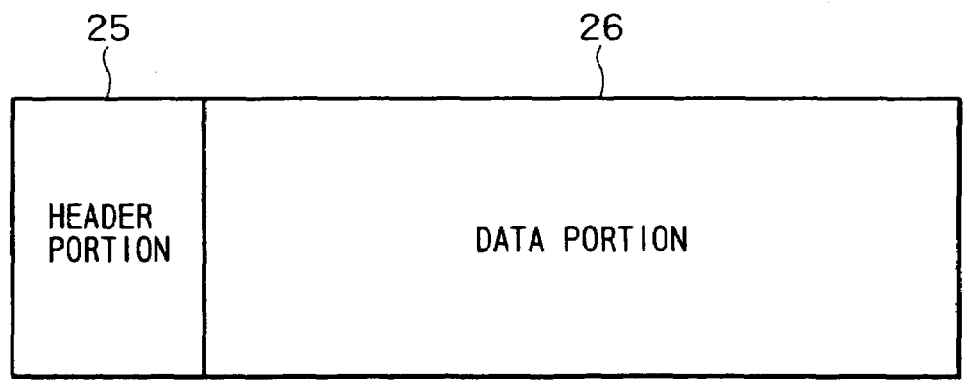
FIG. 11 is a schematic diagram illustrating a card data configuration.

As shown in FIG. 11, card data are also package data having a header portion 25 and a data portion 26.

In this example, as shown in FIG. 12, the header portion 25 of card data is adapted to store mail information including message identifier (hereafter referred to as message ID) based on mail format, sender mail address, one or more recipient mail addresses and subject, card management information including type (indicative of advertisement card data or message card data) of card data defined by XML for example, provision period of time, size of the card data, template identifier (hereafter referred to as template ID), and advertisement identifier (hereafter referred to as advertisement ID) to be described later, and card configuration information including card delimiter position defined by XML for example, delimiter position of material data, reference position of material data, and reference position of style data.

As shown in FIG. 13, the data portion 26 of card data is adapted to store, as the material data for the template image 16, the advertisement image 15, and the message images 18 and 20, the text data written in XML or HTML for example, the still image data compressed by JPEG (Joint Photographic Experts Group) or GIF (Graphics Interchange Format) for example, the moving image data compressed by Motion JPEG for example, the music data based on MIDI (Musical Instruments Digital Interface) and compressed by a predetermined compression algorithm, programs written in a predetermined makeup language, the template flag, and, if the message image 18 is inlaid in the template image 16 as superimposed on the advertisement image 15, the message flag for indicating the displaying of the message image 18 in preference to the advertisement image 15.

Further, the data portion 26 of advertisement card data is adapted to store the style data including layout information about material data defined by CSS format for example, font information, text information, background information, and visual effect information and other various data including calling card information such as names and addresses for calling cards defined by V-CARD or V-CALENDER format for example, schedule information, and card data hyper link information.

To use the above-mentioned card data for advertisement card data, the header portion 25 stores card management information and card configuration information except for mail information and the data portion 26 stores the material data and style data for the template image 16 and the advertisement image 15.

On the contrary, if the card data are used as message card data, the header portion 25 stores mail information, card management information, and card configuration information and the data portion 26 stores the material data, style data, and other various data for the template image 16, the advertisement information 15, the message images 18 and 20.

Thus, the card data may be used for both product advertisement and message transmission.

(2-3) Detailed Configuration of the Data Providing Apparatus 2

Figure 14:
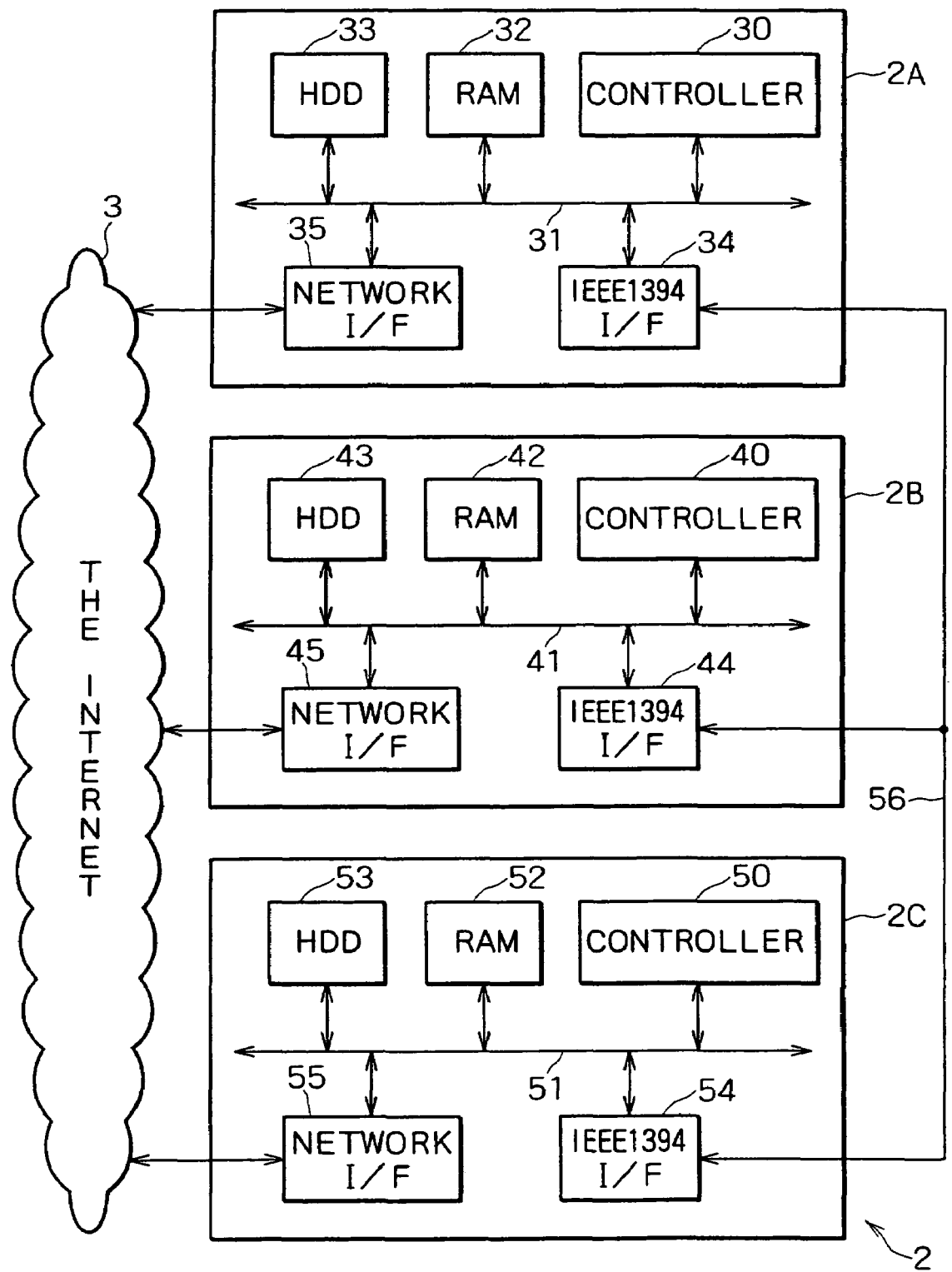
FIG. 14 is a block diagram illustrating a data providing apparatus circuit configuration.

Referring to FIG. 14, the data management server 2A of the data providing apparatus 2 which distributes card data over the Internet 3 includes a controller (hereafter referred to as a data management controller) 30 made up of a CPU (Central Processing Unit), a RAM (Random Access Memory) 32, a hard disk drive 33, an IEEE (Institute of Electrical and Electronics Engineers) 1394 interface 34, and a network interface 35, which are connected to the controller 30 via a bus 31.

Further, the send/receive management server 2B includes a CPU-based controller (hereafter referred to as a send/receive management controller) 40, a RAM 42, a hard disk drive 43, an IEEE 1394 interface 44, and a network interface 45, which are connected to the controller via a bus 41.

The fee-charge processing server 2C includes a CPU-based controller (hereafter referred to as a fee-charge processing controller) 50, a RAM 52, a hard disk drive 53, an IEEE 1394 interface 54, and a network interface 55, which are connected to the controller via a bus 51.

The data management server 2A, the send/receive management server 2B, and the fee-charge processing server 2C are interconnected at the IEEE interfaces 34, 44, and 55 via an IEEE 1394 cable 56, their network interfaces 35, 45, and 55 being connected to the Internet 3.

In this example, in the data management server 2A, the data management controller 30 reads an OS (Operating System), a data registration program, a data providing program, a data update program, and other application software stored in the hard disk of the hard disk drive 33 into the RAM 32 to totally control various functions of the data management server 2A, executing advertisement card data registration, card data provision, and card data update processes.

Figure 15:
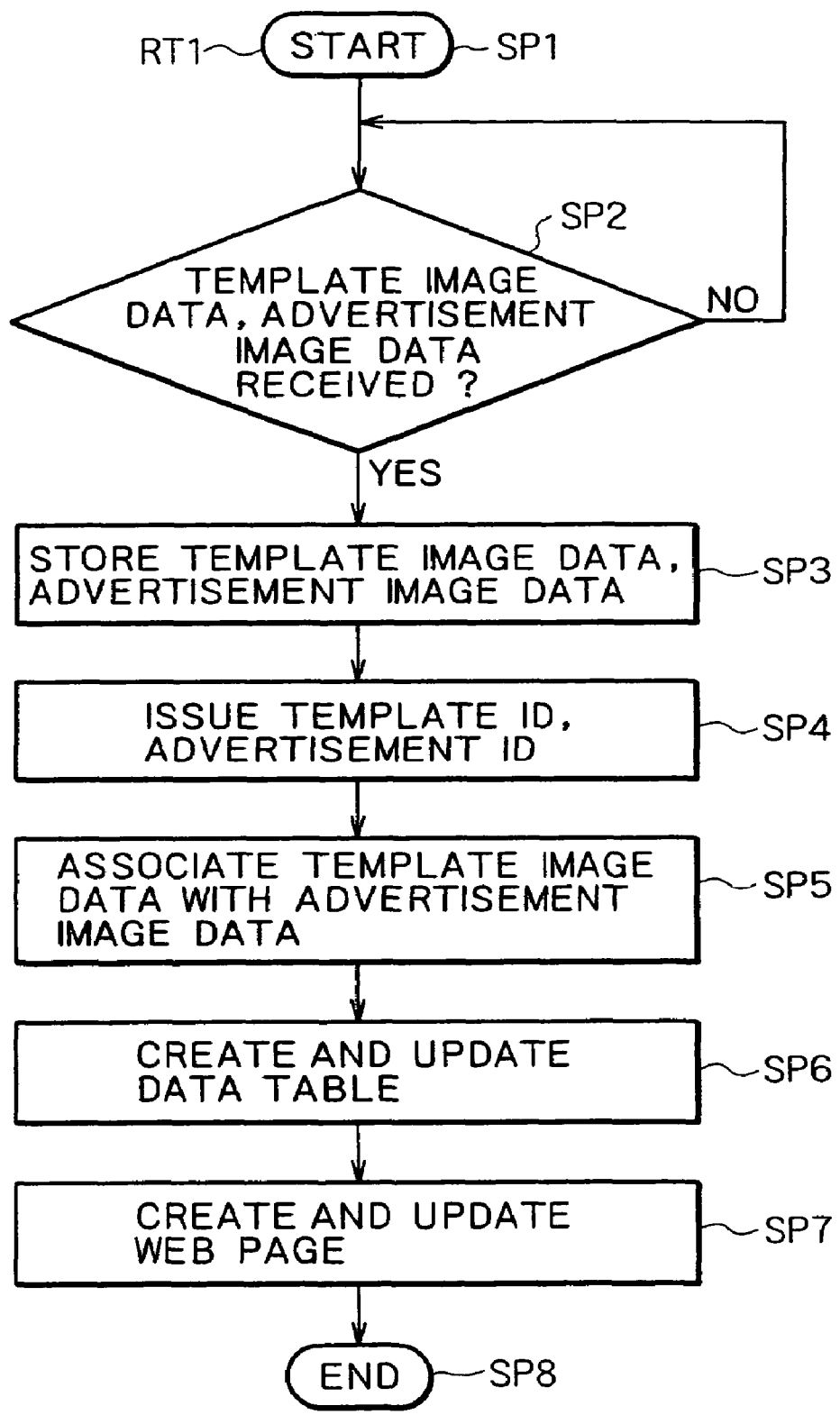
FIG. 15 is a flowchart describing an advertisement card data registration processing procedure.
Figure 16:
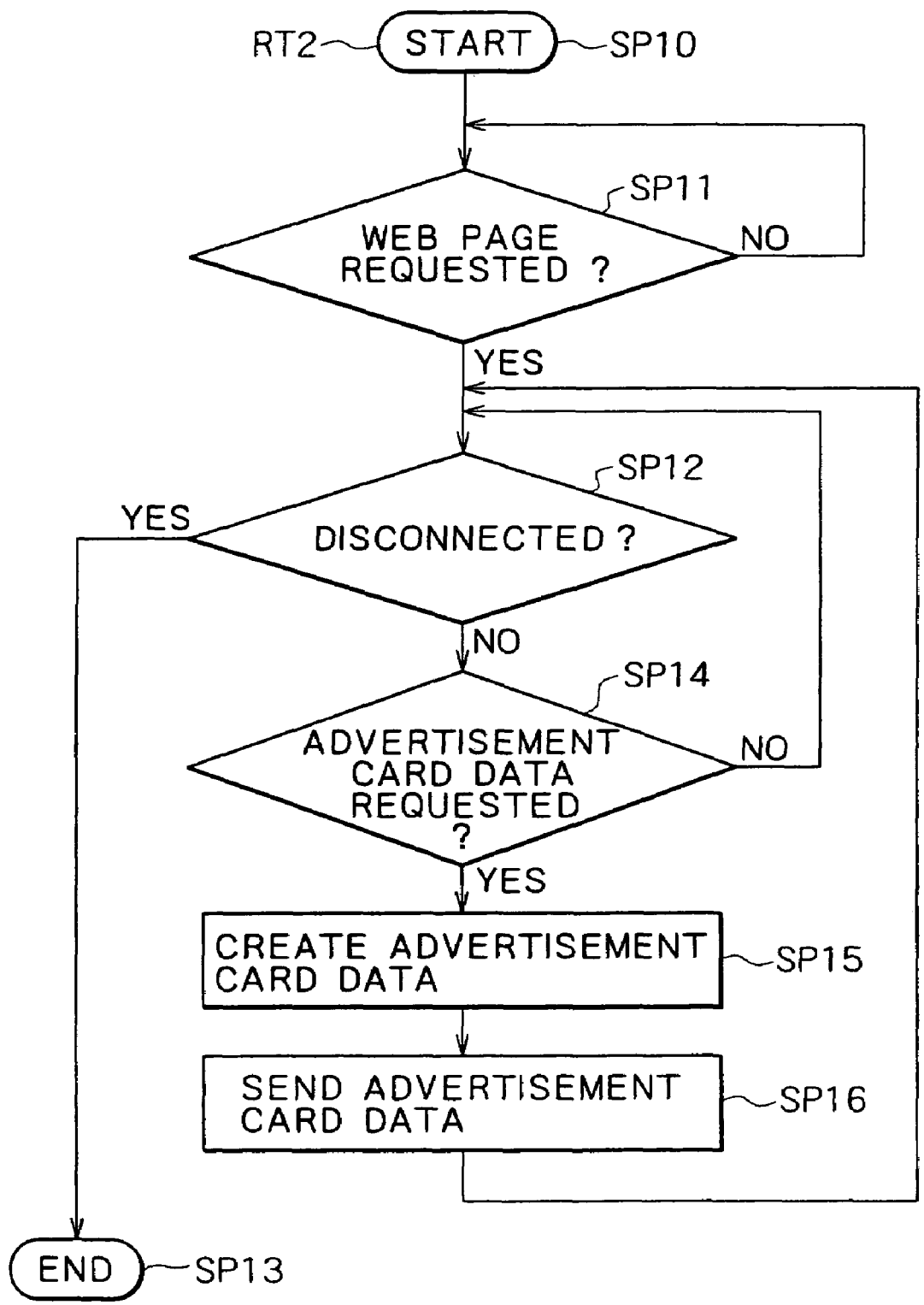
FIG. 16 a flowchart describing an advertisement card data providing processing procedure.

To be more specific, at registration of advertisement card data, the data management controller 30 enters an advertisement card data registration processing procedure RT1 shown in FIG. 15 from step SP1 in accordance with a data management program read into the RAM 32. In step SP2, the data management controller 30 waits for the template image data and/or advertisement image data to be transmitted from two or more data creating PCs 5A through 5N of design company and individuals via the Internet 3.

Upon reception of the template image data and/or advertisement image data from any of the data creating PCs 5A through 5N via the Internet 3 in step SP2, then the data management controller 30 goes to step SP3 to store the received template image data into the hard disk of the hard disk drive 33 to make a database thereof and the received advertisement image data into the hard disk of the hard disk drive 33 to a database thereof, upon which the data management controller 30 goes to step SP4.

In step SP4, the data management controller 30 issues a unique template ID to the template image data recorded on the hard disk and a unique advertisement ID to the advertisement image data recorded on the hard disk, associates these issued template ID and advertisement ID with the template image database and the advertisement image database, and records the these IDs to the hard disk, upon which the data management controller 30 goes to step SP5.

In step SP5, the data management controller 30 associates the template image data with the advertisement image data at the start of the provision based on the Internet 3 on the basis of the type information, specification information, and additional information stored in the header portions 22 of the template image data and/or the advertisement image data recorded to the hard disk this time and of those already stored in the hard disk, upon which the data management controller 30 goes to step SP6.

When the specification information is stored in the header portion 22 of the template image data and the advertisement image data, the data management controller 30 uses this specification information for the association of the template image data and the advertisement image data, thereby surely associating the template image data and the advertisement image data as intended by the advertiser or design company for example for one-to-one or one-to-many combination.

If the specification information is not stored in the header portion 22 of the template image data and the advertisement image data, the data management controller 30 uses the type information for the association of the template image data and the advertisement image data to surely prevent phrases such as "How about going out to eat this?" for foods described with reference to FIGS. 4 and 5 from being used for non-food advertisements, associating the template image data with the advertisement image data in accordance with their types.

In step SP6, the data management controller 30 creates an ID data table from the template ID and advertisement ID of the associated template image data and advertisement image data and stores the created ID data table into the hard disk, upon which the data management controller 30 goes to step SP7. If the data management controller 30 newly associates template image data and advertisement image data after creating the ID data table, the data management controller 30 adds the new template ID and advertisement ID to the ID data table for updating.

In step SP7, the data management controller 30 electronically lists into a table the names of products to be advertised obtained on the basis of the additional information of the advertisement image data associated with the template image data as the titles of the corresponding advertisement card data and, at the same time, embeds the advertisement ID of the advertisement image data constituting the advertisement card data for example into the created list as related to the title to create a card acquiring Web page, recording this Web page to the hard disk of the hard disk drive 33.

If the data management controller 30 newly associates template image data with advertisement image data after creating the card acquiring Web page, the data management controller 30 adds the advertisement ID corresponding to the new title of the advertisement card data to the card acquiring Web page and, when the provision period of the template image data and/or advertisement image data constituting the advertisement card data has passed, deletes and advertisement ID corresponding to the title of the expired advertisement card data from the card acquiring Web page.

Then, the data management controller 30 goes to step SP8 to end the advertisement card data registration procedure RT1.

Having created the card acquiring Web page, the data management controller 30 enters an advertisement card data providing procedure RT2 from step SP10 in accordance with the data providing program read into the RAM 32. In step SP11, the data management controller 30 waits for a request from the camera-mounted digital mobile phone 10 or 11 for the browsing of the card acquiring Web page via the Internet 3. When the request comes, the data management controller 30 goes to step SP12.

In step SP12, the data management controller 30 determines whether or not the line between the camera-mounted digital mobile phone 10 or 11 which has requested the browsing of the card acquiring Web page and the data management server 2A has been disconnected.

If the decision is YES in step SP12, it indicates that the line between the data management server 2A and the camera-mounted digital mobile phone 10 or 11 which requested the browsing of the card acquiring Web page has been disconnected and this request is only for the browsing of the card acquiring Web page. In this case, the data management controller 30 goes to step SP13 to end the advertisement card data providing procedure RT2.

If the decision is NO in step SP12, it indicates that the connection between the data management server 2A and the camera-mounted digital mobile phone 10 or 11 which requested the browsing of the card acquiring Web page is still connected, meaning that the camera-mounted digital mobile phone 10 or 11 may still request the browsing of the advertisement card data. In this case, the data management controller 30 goes to step SP14 to determine whether or not the browsing of the advertisement card data has been requested from the camera-mounted digital mobile phone 10 or 11.

If the decision is NO in step SP14, it indicates that the browsing of the advertisement card data has not been requested by the camera-mounted digital mobile phone 10 or 11 via the Internet 3, meaning that the user of the camera-mounted digital mobile phone 10 or 11 may be browsing the card acquiring Web page. In this case, the data management controller 30 returns to step SP12 determines whether or not the line between the data management server 2A and the camera-mounted digital mobile phone 10 or 11 which requested the browsing of the card acquiring Web page has been disconnected. If the connection is still on, the data management controller 30 repeats the processing loop of SP14 to SP12 to SP14, waiting for the request of advertisement card data browsing from the camera-mounted digital mobile phone 10 or 11 via the Internet 3.

If the decision is YES in step SP14, it indicates that the advertisement ID corresponding to the title of a desired advertisement card data among many advertisement IDs embedded in the card acquiring Web page is transmitted from the camera-mounted digital mobile phone 10 or 11 which requested the browsing of the card acquiring Web page to the network interface 35 via the Internet along with the request for browsing the desired advertisement card data.

In this case, the data management controller 30 goes to step SP15 to detect the corresponding template ID by searching the ID data table recorded on the hard disk of the hard disk drive 33 on the basis of the advertisement ID contained in the browsing request received at the network interface 35 and, at the same time, reads the corresponding advertisement image data and template image data from the hard disk of the hard disk drive 33 on the basis of the detected template ID and the advertisement ID contained in the browsing request, thereby generating advertisement card data by combining these advertisement image data and template image data, upon which the data management controller 30 goes to step SP16.

In step SP16, the data management controller 30 sends the generated advertisement card data to the requesting camera-mounted digital mobile phone 10 or 11 via the Internet 3 and returns to step SP12.

Thus, the data management controller 30 repeats a processing loop of SP12 to SP14 to SP15 to SP16 to SP12 while the connection is on between the camera-mounted digital mobile phone 10 or 11 which requested the browsing of the card acquiring Web page and the data management server 2A to provide the advertisement card data requested by the camera-mounted digital mobile phone 10 or 11. Then, when the connection between the camera-mounted digital mobile phone 10 or 11 and the data management server 2A is turned off, the data management controller 30 goes to step S13 to end this advertisement card data providing procedure RT2.

Meanwhile, with each of the camera-mounted digital mobile phones 10 and 11, if advertisement card data are used for message transmission, the header portion 24 stores the card management information having template ID and advertisement ID, while the data portion 25 only stores the material data, style data, and other data of message image data without storing the material data and style data of template image data and advertisement image data, thereby creating message card data (hereafter referred to as data reduced message card data).

Receiving data reduced message data card from the camera-mounted digital mobile phone 10 or 11, the send/receive management server 2B extracts the template ID from the header portion 25 of the received data reduced message card data and sends the extracted template ID to the data management server 2A to generate advertisement card data which become the source of the data reduced message card data. Then, the send/receive management server 2B sends the generated advertisement card data by attaching to the data reduced message card data to the camera-mounted digital mobile phone 10 or 11 of the message recipient as the original message card data.

Thus, in the data providing system 1 (FIG. 2), the transmission of data reduced message card data from the camera-mounted digital mobile phone 10 or 11 of the user who uses advertisement card data for message transmission (this user being referred hereafter to as a message sender) to the data providing apparatus 2 significantly reduces the amount of the data to be transmitted for message transmission from the camera-mounted digital mobile phone 10 of the message sender.

In the data providing system 1, while the message card data of the message card image 19 with the message image 18 inlaid in the template image 16 is sent to the message recipient, the message sender is billed for the transmission fee of the data reduced message card data for the message card data transmission fee, thus significantly reducing the transmission fee to be paid by the message sender.

Actually, in the send/receive management server 2B (FIG. 14), the send/receive management controller 40 reads the OS, send/receive management program, and other application software stored in the hard disk of the hard disk drive 43 into the RAM 42, thereby totally controlling the various features of the send/receive management server 2B.

Then, at the send/receive processing of message card data, the send/receive management controller 40 enters a message card data send/receive processing procedure RT3 from step SP20 in accordance with the send/receive management program read into the RAM 42. In step SP21, the send/receive management controller 40 waits for the data reduced message card data from the camera-mounted digital mobile phone 10 or 11 of the message sender via the Internet.

Upon reception of the data reduced message card data from the camera-mounted digital mobile phone 10 or 11 of the message sender through the network interface 45 in step SP21, the send/receive management controller 40 goes to step SP22.

In step SP22, the send/receive management controller 40 records the received data reduced message card data received through the network interface 45 to the hard disk of the hard disk drive 43 and then goes to step SP23.

In step SP23, the send/receive management controller 40 extracts the card management information from the header portion 25 of the data reduced message card data stored in the hard disk and sends the template ID contained in the extracted card management information to the data management server 2A from the IEEE 1394 interface 44 via the IEEE 1394 cable 56 for advertisement card data generation. At the same time, the send/receive management controller 40 sends the template ID and advertisement ID contained in the card management information to the fee-charge processing server 2C from the IEEE 1394 interface 44 via the IEEE 1394 cable 56.

In addition, the send/receive management controller 40 extracts the information about the size of the data reduced message card data from the header portion 25 of the data reduced message card data (hereafter, this information is referred to as message data size information) and sends the extracted message data size information to the fee-charge processing server 2C from the IEEE 1394 interface 44 via the IEEE 1394 cable 56 for fee-charge processing.

In step SP24, the send/receive management controller 40 waits for the advertisement card data to be attached to the data reduced message card data from the data management server 2A via the IEEE 1394 cable 56. Upon reception of the advertisement card data from the data management server 2A via the IEEE 1394 cable 56, the send/receive management controller 40 goes to step SP25.

In step SP25, the send/receive management controller 40 extracts the card management information and the card configuration information from the header portion 25 of the advertisement card data received from the data management server 2A and stores the extracted card management information and card configuration information for the advertisement card image 17 into the header portion 25 of the data reduced message card data.

At the same time, the send/receive management controller 40 extracts all martial data and style data from the data portion 26 of the advertisement card data and stores the extracted material data and style data into the data portion 26 of the data reduced message card data to generate the original message card data composed of the template image data, advertisement image data, and message image data to be transmitted to the message recipient, upon which the send/receive management controller 40 goes to step SP26.

In step SP26, the send/receive management controller 40 records the original message card data generated for transmission to the message recipient to the hard disk of the hard disk drive 43 and manages the stored message card data by the mail address of the message recipient stored in the header portion 25, going to step SP27.

In step SP27, the send/receive management controller 40 reads from the hard disk the original message card data to be transmitted to the message recipient and transmits the original message card data to the camera-mounted digital mobile phone 10 or 11 of the message recipient from the network interface 45 via the Internet 3.

In step SP28, the send/receive management controller 40 determines whether or not the message card data transmitted to the camera-mounted digital mobile phone 10 or 11 of the message recipient has been received by it.

If the decision of step SP28 is NO, it indicates that the camera-mounted digital mobile phone 10 or 11 of the message recipient may be powered off or the transmission may have failed because the recipient is located where it is difficult to respond to the transmission (namely, the recipient is outside communicable range). If this happens, the send/receive management controller 40 returns to step SP27 to repeat a processing loop of steps SP28 to SP27 to SP28 until the transmission of the message card data to the camera-mounted digital mobile phone 10 or 11 of the message recipient is successful, retransmitting the message card data to the camera-mounted digital mobile phone 10 or 11 of the message recipient.

If the decision of step SP28 is YES, it indicates that the message card data have been received by the camera-mounted digital mobile phone 10 or 11 of the message recipient, denoting a successful message card data transmission. In this case, the send/receive management controller 40 goes to step SP29 to end this message card data send/receive processing procedure RT3.

If the transmission of the message card data to the camera-mounted digital mobile phone 10 or 11 failed, the send/receive management controller 40 sends the message card data in response to the inquiry to the camera-mounted digital mobile phone 10 or 11 of the message recipient and goes to step SP29 to end the message card data send/receive processing procedure RT3 if an inquiry comes from the camera-mounted digital mobile phone 10 or 11 of the message recipient whether the message card data addressed thereto has arrived at the send/receive management server 2B before the retransmission of the message card data.

Figure 18:
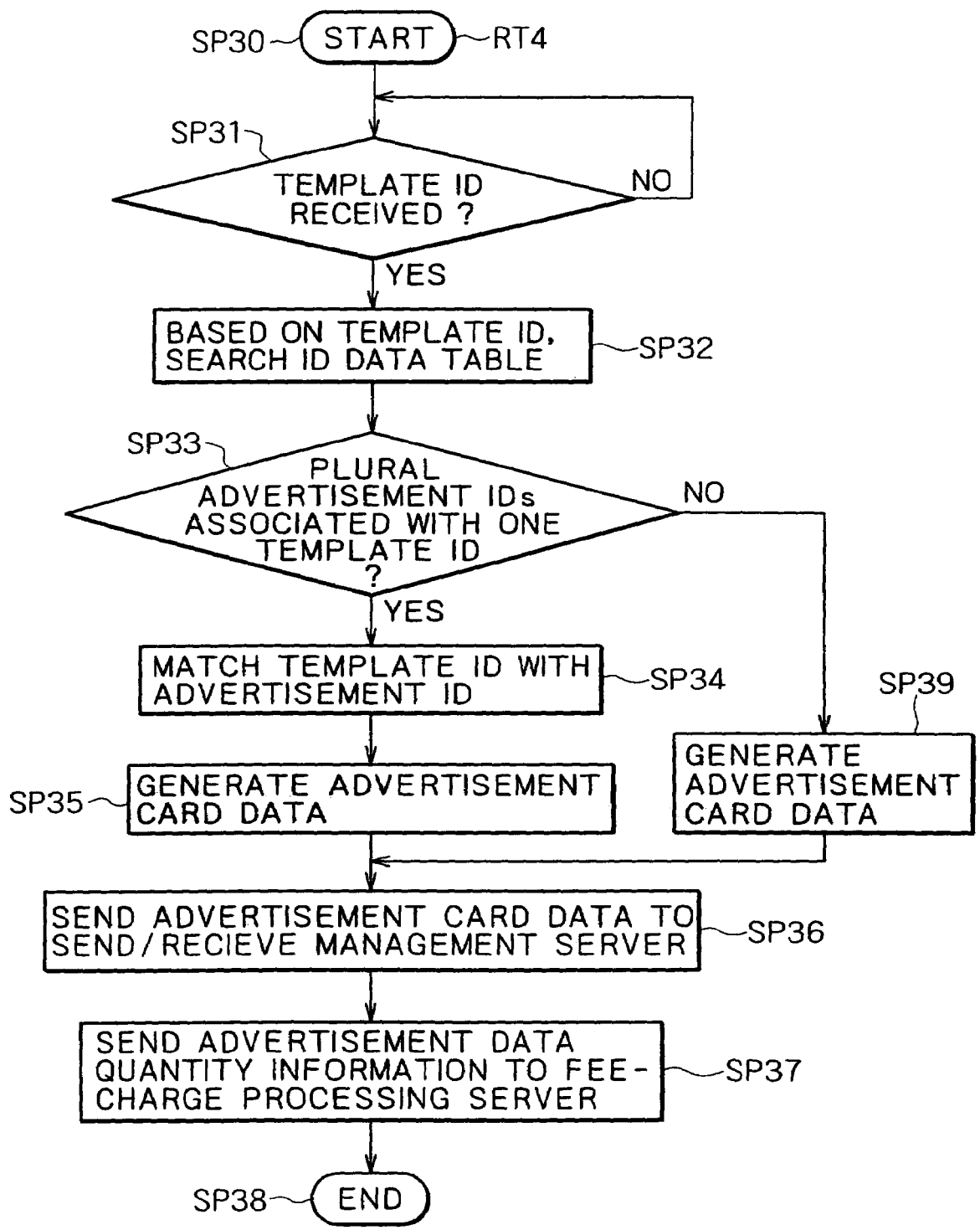
FIG. 18 is a flowchart describing an advertisement card data update processing procedure.

At the time of sending or receiving message card data, the data management controller 30 of the data management server 2A enters an advertisement card data update processing procedure RT4 from step SP30 shown in FIG. 18 in accordance with the data update program read into the RAM 32. In step SP31, the data management controller 30 waits for the template ID to be transmitted from the send/receive management server 2B via the IEEE 1394 cable 56.

Upon reception of the template ID from the send/receive management server 2B via the IEEE 1394 cable 56 at the IEEE 1394 interface 34, the data management controller 30 goes to step SP32.

In step SP32, the data management controller 30 searches the ID data table stored in the hard disk of the hard disk drive 33 for all advertisement IDs associated with this template ID on the basis of the template ID received via the IEEE 1394 interface 34, going to step SP33.

In step SP33, the data management controller 30 determines on the basis of the search result whether there are two or more advertisement IDs associated with the template ID.

Figure 19:
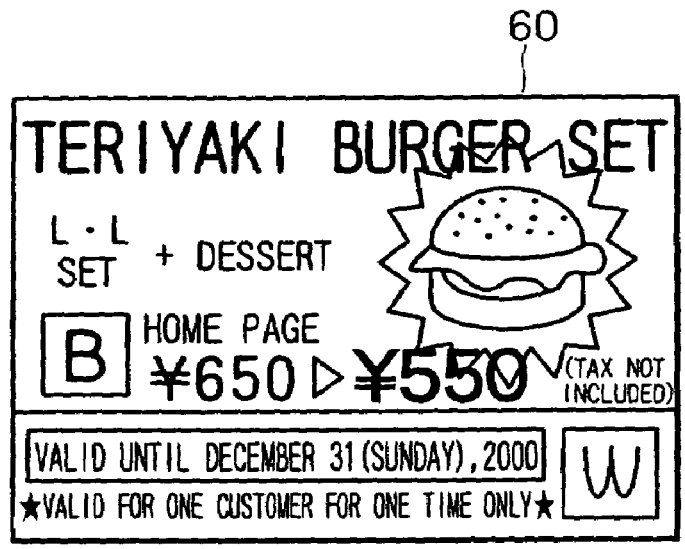
FIG. 19 is a schematic diagram illustrating a limited-time-offer product advertisement image configuration.
Figure 20:
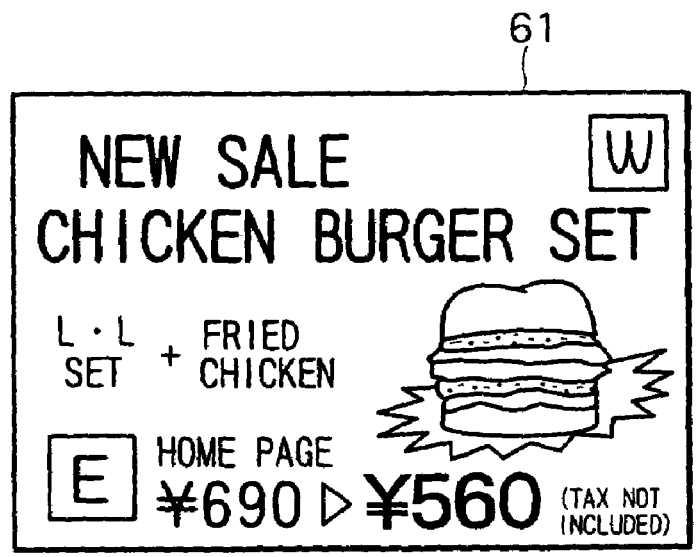
FIG. 20 is a schematic diagram illustrating a new-product advertisement image.

If the decision is YES in step SP33, it indicates that two or more advertisement IDs are associated with one template ID and therefore the advertisement image 15 inlaid at the start of the provision based on the Internet 3 described with reference to FIG. 3, an advertisement image 60 for a time-limited offer product shown in FIG. 19, and an advertisement image 61 of a new product shown in FIG. 20 are registered as the advertisement images capable of being inlaid into one template image 16, for example. In this case, the data management controller 30 goes to step SP34 and executes a matching process to be described later to select the advertisement ID of the advertisement image data (namely, the advertisement images 60 and 61 shown in FIGS. 19 and 20 respectively) which are different from the advertisement image data (namely, the advertisement image 15 shown in FIG. 3) at the time of the start of the provision from the plural advertisement IDs for one template ID. Then, the data management controller 30 goes to step SP35.

Figure 21:
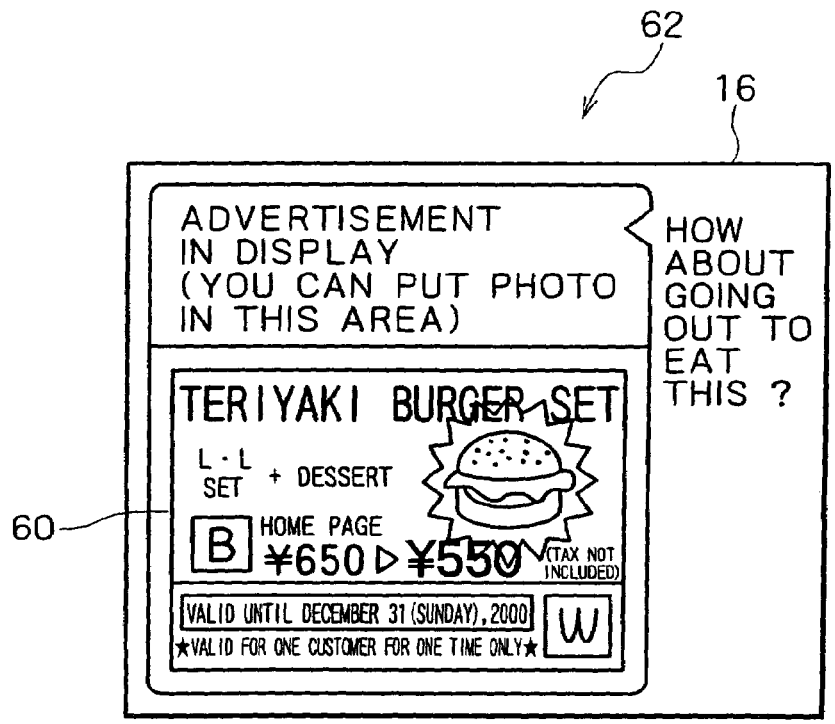
FIG. 21 is a schematic diagram illustrating the configuration of an advertisement card image updated to a limited-time-offer product advertisement image.
Figure 22:
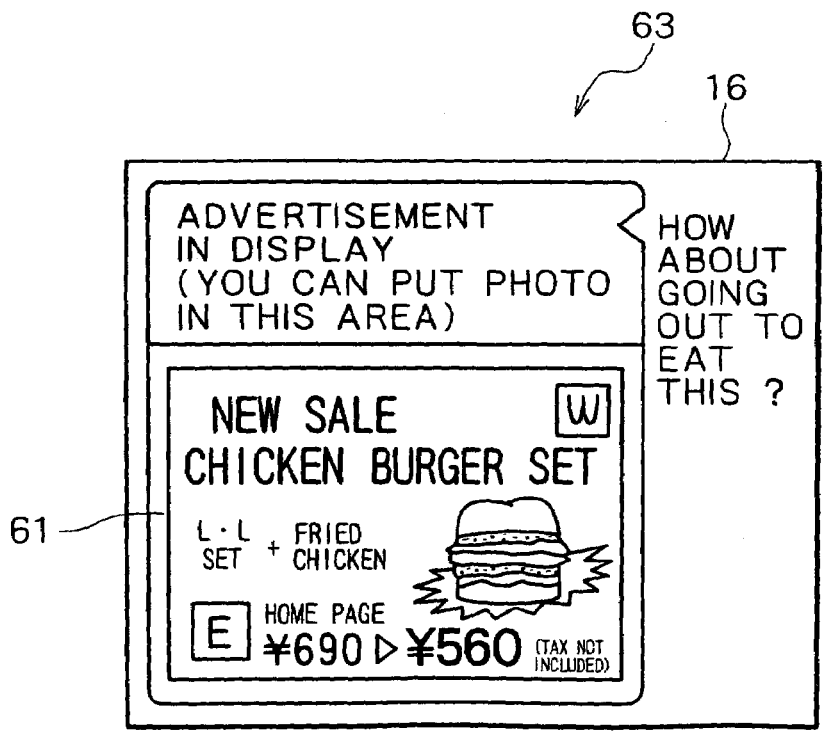
FIG. 22 is a schematic diagram illustrating the configuration of an advertisement card image updated to a new-product advertisement image.

In step SP35, on the basis of the template ID and one advertisement ID selected by the matching process, the data management controller 30 reads the corresponding advertisement image data and template image data from the hard disk of the hard disk drive 33 and generates advertisement images 62 and 63 shown in FIGS. 21 and 22 respectively obtained by updating the original advertisement image 15 to the advertisement images 60 and 61 by combining the retrieved advertisement image data and template image data, upon which the data management controller 30 goes to step SP36.

In step SP36, the data management controller 30 transmits the advertisement card data obtained by updating the advertisement images 60 and 61 to the send/receive management server 2B from the IEEE 1394 interface 34 via the IEEE 1394 cable 56 and goes to step SP37.

In step SP37, because the information (hereafter referred to as advertisement data size information) indicative of the size of the advertisement card data is stored in the header portion 25 of the advertisement card data obtained by updating the advertisement images 60 and 61, the data management controller 30 extracts the advertisement data size information from the header portion 25 of the advertisement card data, transmits the extracted advertisement data size information to the fee-charge processing server 2C from the IEEE 1394 interface 44 via the IEEE 1394 cable 56 for fee-charge processing, and goes to step SP38 to end the advertisement card data update processing procedure RT4.

If the decision is NO in step SP33, it indicates that the advertisement card data cannot be updated because only one advertisement image 15 described with reference to FIG. 3 is associated with one template image 16. In this case, the data management controller 30 goes to step SP39 to read the corresponding advertisement image data and template image data from the hard disk of the hard disk drive 33 on the basis of the template ID of the template image 16 and the advertisement ID of the advertisement image 15 and generates the original advertisement card data by combining the retrieved advertisement image data and template image data, upon which the data management controller 30 goes to step SP36.

Meanwhile, in associating two or more advertisement IDs with one template ID, the priority and conditions for selecting one of the advertisement images 15, 60 and 61 from each advertisement ID have already been provided by the advertiser and stored in the hard disk of the hard disk drive 33, so that the data management controller 30 selects one advertisement ID from the plural advertisement IDs in accordance with the matching information.

In the matching processing to be described below, an example in which the advertisement ID is selected in accordance with the matching information set to prioritize a limited-time-offer product.

Figure 23:
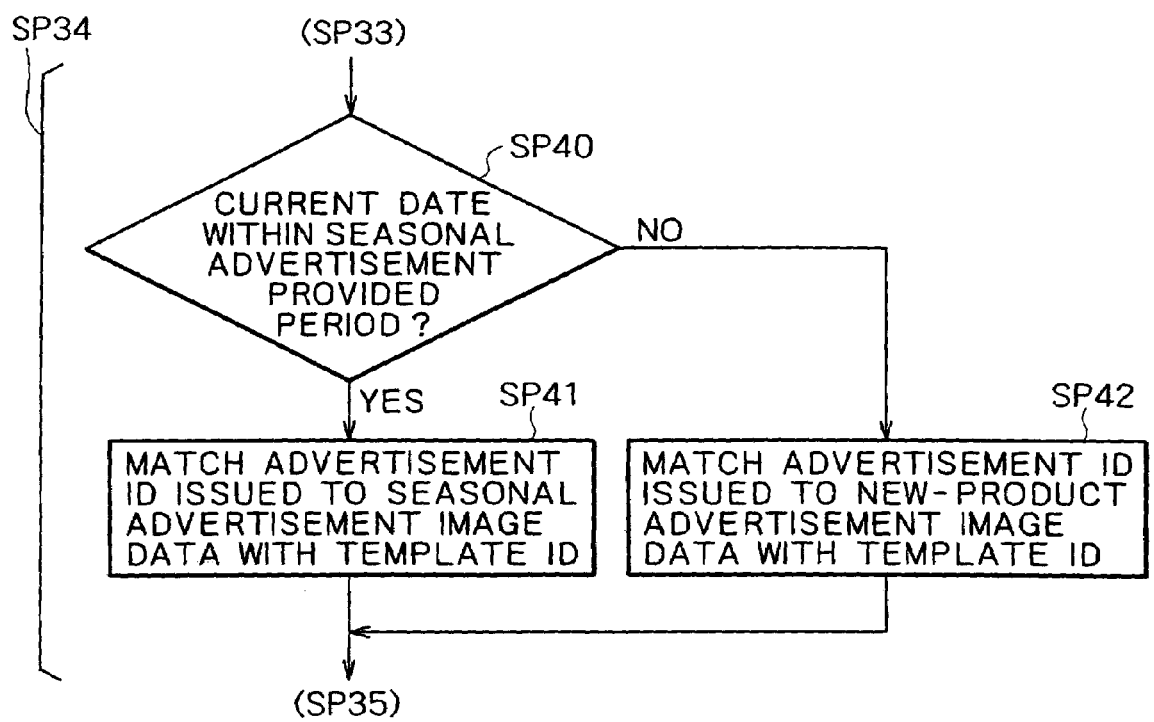
FIG. 23 is a flowchart describing an update processing procedure subroutine.

To be more specific, when executing the matching processing in step SP34, the data management controller 30 reads the corresponding matching information from the hard disk of the hard disk drive 33 to check the priority and conditions. In this state, the data management controller 30 starts the subroutine of a update processing procedure RT4 shown in FIG. 23. In step SP40, the data management controller 30 determines whether or not the current time counted by an internal RTC (Real-Time Clock) circuit is within the period in which the advertisement image data (namely, the advertisement image 60 shown in FIG. 19) for the limited-time-offer product is provided.

If the decision is YES in step SP40, it indicates that the current time is within the period in which the advertisement image data of the limited-time-offer product is provided. In this case, the data management controller 30 goes to step SP41 and selects the advertisement ID issued to the advertisement image data of the limited-time-offer product of the two pieces of the advertisement image data (namely, the advertisement images 60 and 61 shown in FIGS. 19 and 20 respectively) to match the selected advertisement ID with the template ID, upon which the data management controller 30 exits this subroutine to go to step SP35 (FIG. 18).

If the decision is NO in step SP40, it indicates that the current time is not within the period in which the advertisement image data of the limited-time-offer product are provided. In this case, the data management controller 30 goes to step SP42 and selects the advertisement ID issued to the advertisement image data (namely, the advertisement image 61 shown in FIG. 20) of the new product of the two pieces of advertisement image data (namely, the advertisement images 60 and 61 shown in FIGS. 19 and 20) to match the selected advertisement ID with the template ID, upon which the data management controller 30 exits this subroutine to go to step SP35.

Thus, when two or more advertisement IDs are associated with one template ID, the data management controller 30 generates the advertisement card data obtained by updating the advertisement image data in accordance with the matching information every time the advertisement card data having the template image data of this template ID are used for message transmission and sends the generated advertisement card data to the send/receive management server 2B.

Consequently, the send/receive management server 2B can provide for the message recipient the advertisement image data of limited-time-product or new product along with the message of the message sender at the time of advertisement.

On the other hand, in the fee-charge processing server 2C (FIG. 14), a fee-charge processing controller 50 appropriately reads the OS, an advertisement fee-charge processing program, a message send/receive fee-charge processing program, and other application software from the hard disk of the hard disk drive 53 into the RAM 52 to totally control the capabilities of the fee-charge processing server 2C.

Figure 24:
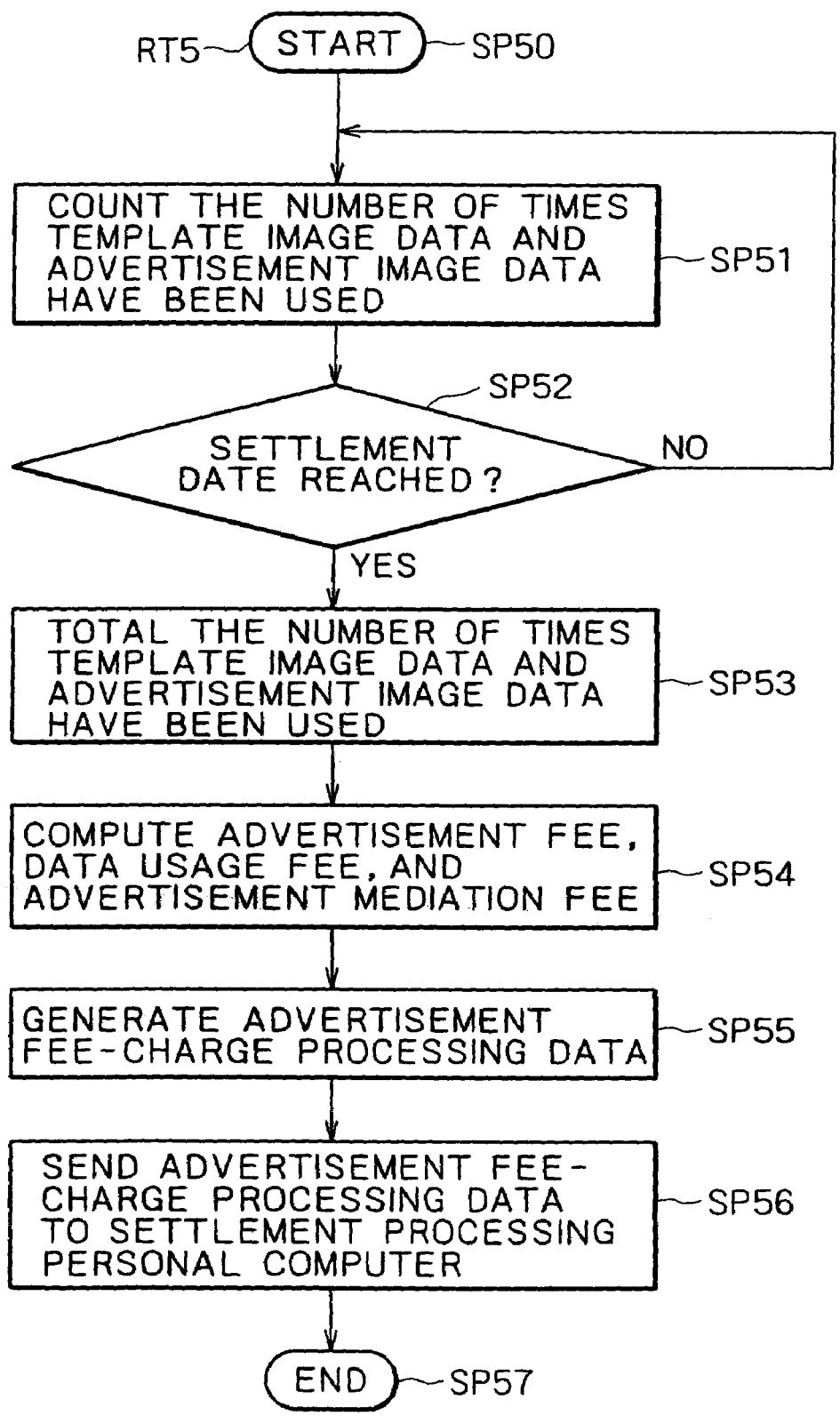
FIG. 24 is a flowchart describing a procedure of product advertisement fee-charging processing.

Actually, when executing fee-charge processing on product advertisements, the fee-charge processing controller 50 enters a fee-charge processing procedure RT5 from step SP50 shown in FIG. 24 in accordance with the advertisement fee-charge processing program, on the RAM 52. In step SP51, the fee-charge processing controller 50 receives the template ID and advertisement ID for fee-charge processing (namely, the template ID and advertisement ID to be transmitted from the send/receive management server 2B to the fee-charge processing server 2C via the IEEE 1394 cable 56 in step SP23 of the send/receive processing procedure RT3 described with reference to FIG. 17) from the send/receive management server 2B via the IEEE 1394 cable 56 at the IEEE 1394 interface 54. Then, the fee-charge processing controller 50 increments the counters of the received template ID and advertisement ID of the internally arranged counters for these IDs and goes to step SP52.

In step SP52, the fee-charge processing controller 50 determines whether or not the current time counted by the internal RTC circuit has reached a preset periodic settlement date (for example, the end of each month).

If the decision is NO in step SP52, it indicates that the current time has not yet reached the settlement date, upon which the fee-charge processing controller 50 returns to step SP51 to repeat a processing loop of steps SP52 to SP51 to SP52 until the current time reaches the settlement date.

In generating data reduced message card data on the basis of advertisement card data, if the camera-mounted digital mobile phone 10 or 11 of the message sender has already acquired the advertisement card data directly from the data management server 2A, it indicates that the advertisement card image 17 based on the advertisement card data has been presented to the user before generating the message card data and the template ID and advertisement ID of the template image 16 and the advertisement image 15 constituting the advertisement card image 17 presented to the user have been transmitted to the send/receive management server 2B as stored in the header portion 25 of the data reduced card data.

Also when generating new data reduced message card data on the basis of the message card data received from another camera-mounted digital mobile phone 10 or 11, the camera-mounted digital mobile phone 10 or 11 of the message sender once returns the message card data to the advertisement card data to present the advertisement card images 62 and 63 to the user as described with reference to FIG. 2 and sends the template ID and advertisement ID of the template images 16 and advertisement images 60 and 61 constituting the advertisement card images 62 and 63 presented to the user to the send/receive management server 2B as stored in the header portion 25 of the new data reduced card data.

Figure 17:
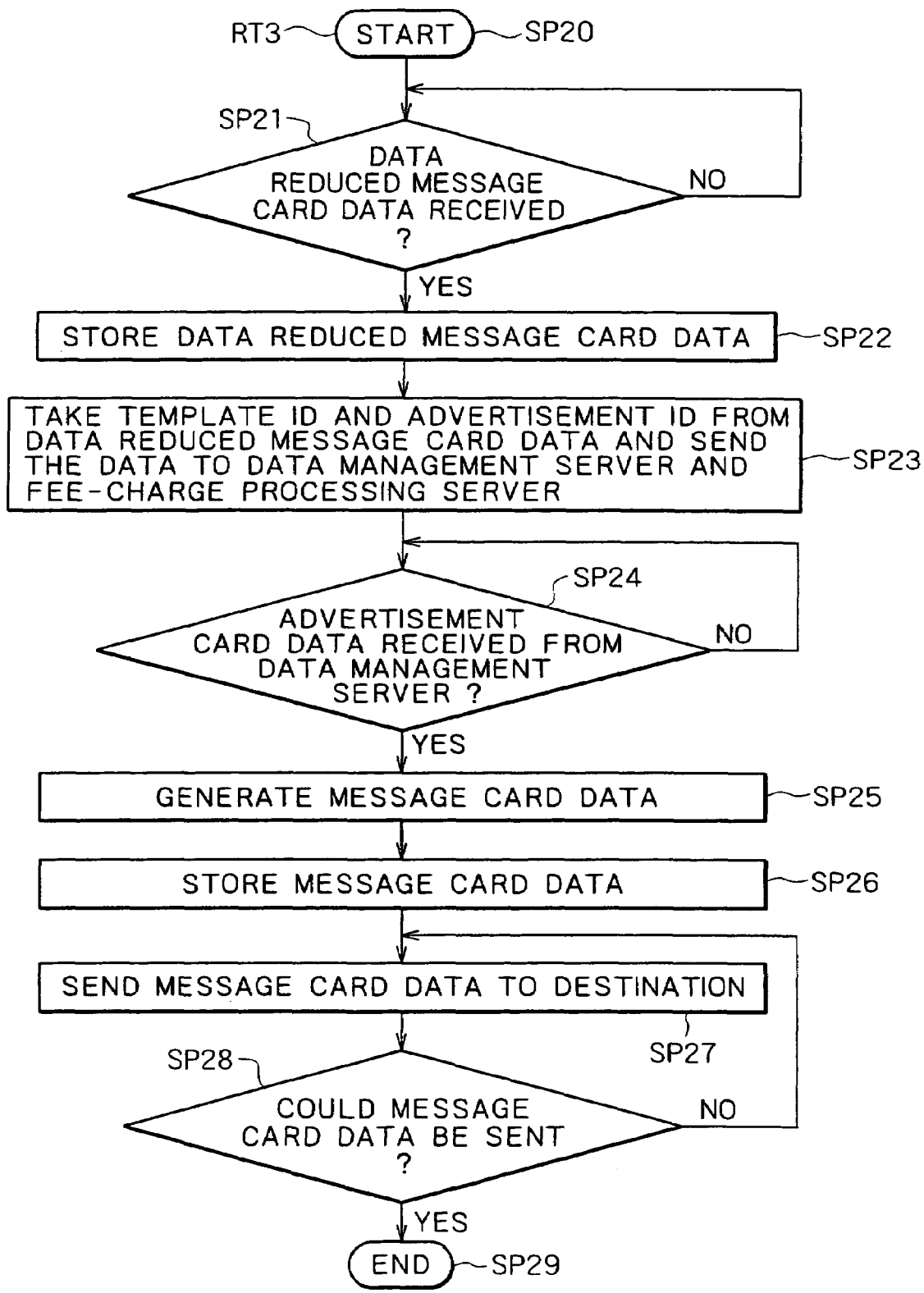
FIG. 17 is a flowchart describing a message card data send/receive processing procedure.

Then, in step SP23 of the above-mentioned send/receive processing procedure RT3 shown in FIG. 17, the send/receive management server 2B extracts the template ID and the advertisement ID from the header portion 25 of the data reduced message card data received from the camera-mounted digital mobile phone 10 or 11 of the message sender and sends the extracted IDs to the fee-charge processing server 2C.

Therefore, fee-charge processing controller 50 repeats a processing loop of steps SP52 to SP51 to SP52 until the current time reaches the settlement date to surely count, by the internal counter, the number of times the template image 16 and the advertisement images 15, 60 and 61 constituting the advertisement card images 17, 62, and 63 have been presented to the user for product advertisement.

If the decision is YES in step SP52, it indicates that the current time has reached the settlement date and settlement processing is to be executed. In this case, the fee-charge processing controller 50 goes to step SP53 totals, on the basis of the value of each internal counter, the number of times the individual registered template image data and advertisement image data have been used for product advertisement and goes to step SP54.

In step SP54, the fee-charge processing controller 50 computes the advertisement fee to be billed to the corresponding advertiser for the product advertisement in accordance with the totaled usage count of individual advertisement image data. At the same time, in accordance with the totaled usage count of individual template image data and advertisement image data, the fee-charge processing controller 50 computes the data usage fee to be paid to the design company or individuals who created template image data and advertisement image data.

In addition, in accordance with the totaled usage count of individual advertisement image data, the fee-charge processing controller 50 computes the advertisement mediation fee, which is a commission to be paid to the data providing company which mediated the product advertisement, and goes to step SP55.

In step SP55, the fee-charge processing controller 50 reads, from the hard disk of the hard disk drive 53, the registered information including the banks of account and account numbers of registered advertisers, design companies, individuals who have created template image data, and service providing companies and generates the advertisement fee-charge processing data from the retrieved registered information, the advertisement fee, the data usage fee, and the advertisement mediation fee, upon which the fee-charge processing controller 50 goes to step SP56.

In step SP56, the fee-charge processing controller 50 sends the generated advertisement fee-charge processing data to the settlement processing PC 6 from the network interface 55 via the Internet 3 and goes to step SP57 to end the fee-charge processing procedure RT5 for product advertisement.

Thus, by sending the advertisement fee-charge processing data to the settlement processing PC 6 via the Internet 3, the fee-charge processing controller 50 can cause the settlement processing PC 6 to execute the electronic settlement processing on the basis of the advertisement fee-charge processing data as described with reference to FIG. 2.

Further, the fee-charge processing controller 50 is adapted to execute fee-charge processing on the transfer of message card data in a predetermined timed relation such as when the message card data are sent or received.

Figure 25:
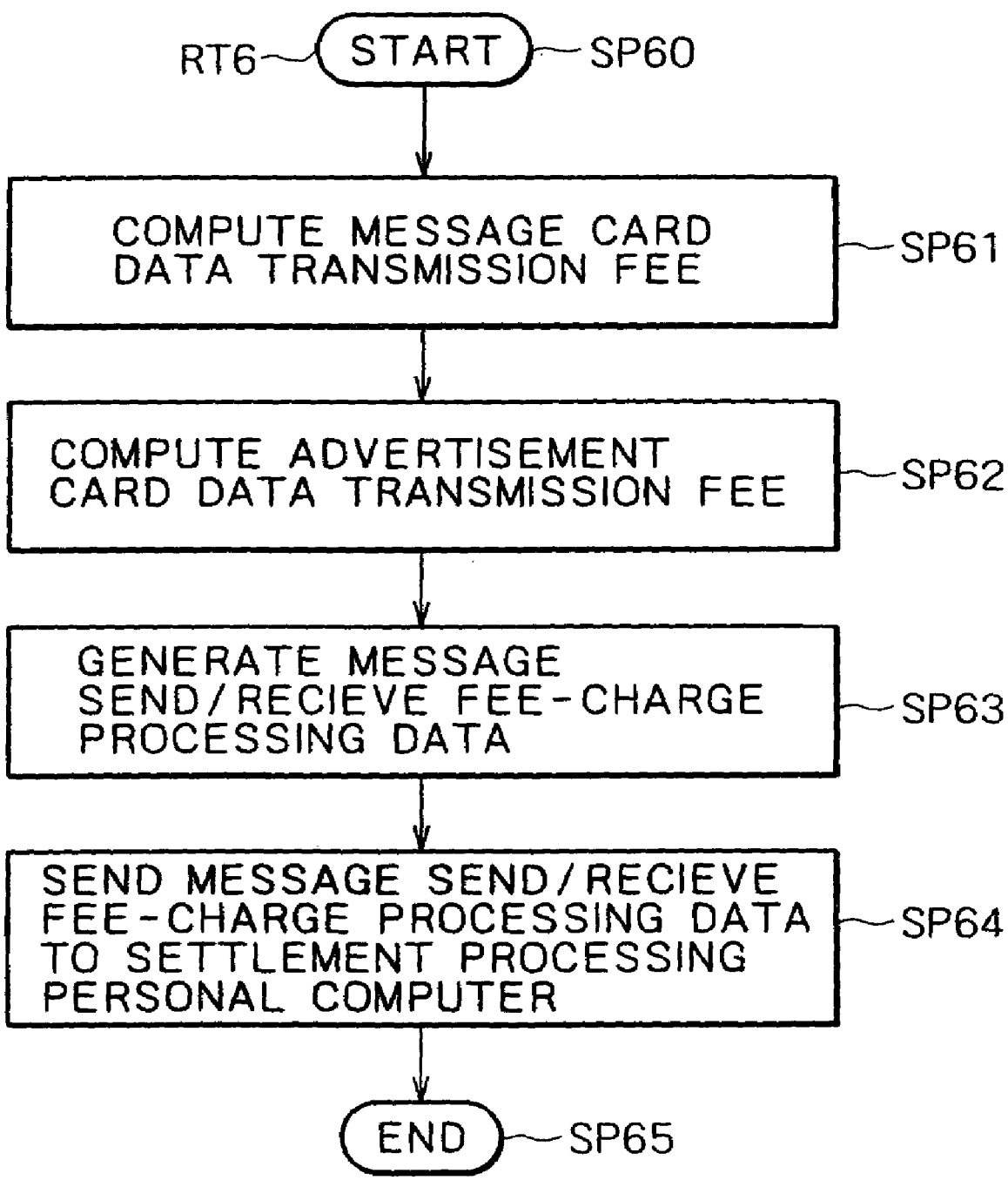
FIG. 25 is a flowchart describing a procedure of message card data send/receive fee-charging processing.

In this case, the fee-charge processing controller 50 enters a fee-charge processing procedure RT6 shown in FIG. 25 from step SP60 in accordance with the message send/receive fee-charge processing program read into the RAM 52. In step SP61, the fee-charge processing controller 50 computes the transmission fee of the data reduced message card data to be billed to the message sender on the basis of the message data size information received at the IEEE 1394 interface 54 from the send/receive management server 2B via the IEEE 1394 cable 56 (namely, the message data size information transmitted from the send/receive management server 2B to the fee-charge processing server 2C via the IEEE 1394 cable 56 in step SP23 of the send/receive processing procedure RT3 described with reference to FIG. 17).

While the camera-mounted digital mobile phone 10 or 11 of the message recipient downloads the original message card data composed of template image data, advertisement image data, and message image data from the send/receive management server 2B, it is possible that the message recipient himself view the advertisement card images 17, 62, and 63.

Therefore, the fee-charge processing controller 50 causes the advertiser to pay the transmission fee for the advertisement card data of the combination of the advertisement card data and the data reduced message card data which constitutes the original message card data to be transmitted to the message recipient and bills the advertiser. For the message recipient, the fee-charge processing controller 50 computes the transmission fee only for the data reduced message card data on the basis of the message data size information and goes to step SP62.

In step SP62, by causing the advertiser to pay the transmission fee for the advertisement card data constituting the message card data, the fee-charge processing controller 50 computes the transmission fee of the advertisement card data constituting the message card data to be billed to the advertiser on the basis of the advertisement data size information received at the IEEE 1394 interface 54 via from the data management server 2A via the IEEE 1394 cable 56 (namely, the advertisement data size information transmitted from the data management server 2A to the fee-charge processing server 2C via the IEEE 1394 cable 56 in step SP37 of the update processing procedure RT4 described with reference to FIG. 18) and goes to step SP63.

In step SP63, the fee-charge processing controller 50 reads the registered information including the banks of account and account numbers of the registered message sender, message recipient, advertiser, and service providing company from the hard disk of the hard disk drive 53 and generates message send/receive fee-charge processing data from the retrieved registered information, the transmission fee to be billed to the message sender computed in steps SP61 and SP62, the transmission fee to be billed to the message recipient, and the transmission fee to be paid by and billed to the advertiser, upon which the fee-charge processing controller 50 goes to step SP64.

In step SP64, the fee-charge processing controller 50 sends the generated message send/receive fee-charge processing data to the settlement processing PC 6 from the network interface 55 via the Internet 3 and goes to step SP65 to end the fee-charge processing procedure RT6 for the transfer of message card data.

Thus, by sending the message send/receive fee-charge processing data to the settlement processing PC 6 via the Internet 3, the fee-charge processing controller 50 can cause the settlement processing PC 6 to execute electronic settlement processing by drawing the transmission fees from the banks of account of the message sender, the message recipient, and the advertiser on the basis of the message send/receive fee-charge processing data and remitting the drawn transmission fees to the bank account of the service providing company.

In the above-described embodiment, upon reception of data reduced message card data, the send/receive management controller 40 of the send/receive management server 2B sends the sender mail address, recipient mail address, and advertisement ID stored in the header portion 25 to the data management server 2A from the IEEE 1394 interface 44 via the IEEE 1394 cable 56.

Then, the data management controller 30 receives at the IEEE 1394 interface 34 the sender mail address, the recipient mail address, and the advertisement ID from the send/receive management server 2B via the IEEE 1394 cable 56 and, on the basis of the received advertisement ID and the already received corresponding template ID, detects the type information of the template image data and advertisement image data of the advertisement card data used by the message sender for message transmission.

The data management controller 30 associates the type information thus detected with the sender mail address and the recipient mail address to form a database. On the basis of the database of the type information and sender and recipient mail addresses, the data management controller 30 determines which type of advertisement image data and template image data are used for message transmission over which route.

Consequently, the data management controller 30 can accumulate the information about the users who often use advertisement and their preferences only on the basis of the results of the above-mentioned determination without requesting the message senders and recipients to provide their personal information, as well as the information about the determination of the targets of the advertisement card data of particular product advertisements which brings about the best advertisement effects.

Therefore, the data management controller 30 can not only provide advertisement card data on demand from users but also provide any advertisement card data to any users like direct mail on the basis of the information accumulated as described above.

(2-4) Configuration of Camera-Mounted Digital Mobile Phones 10 and 11

(2-4-1) External Configuration of Camera-Mounted Digital Mobile Phones 10 and 11

Figure 26:
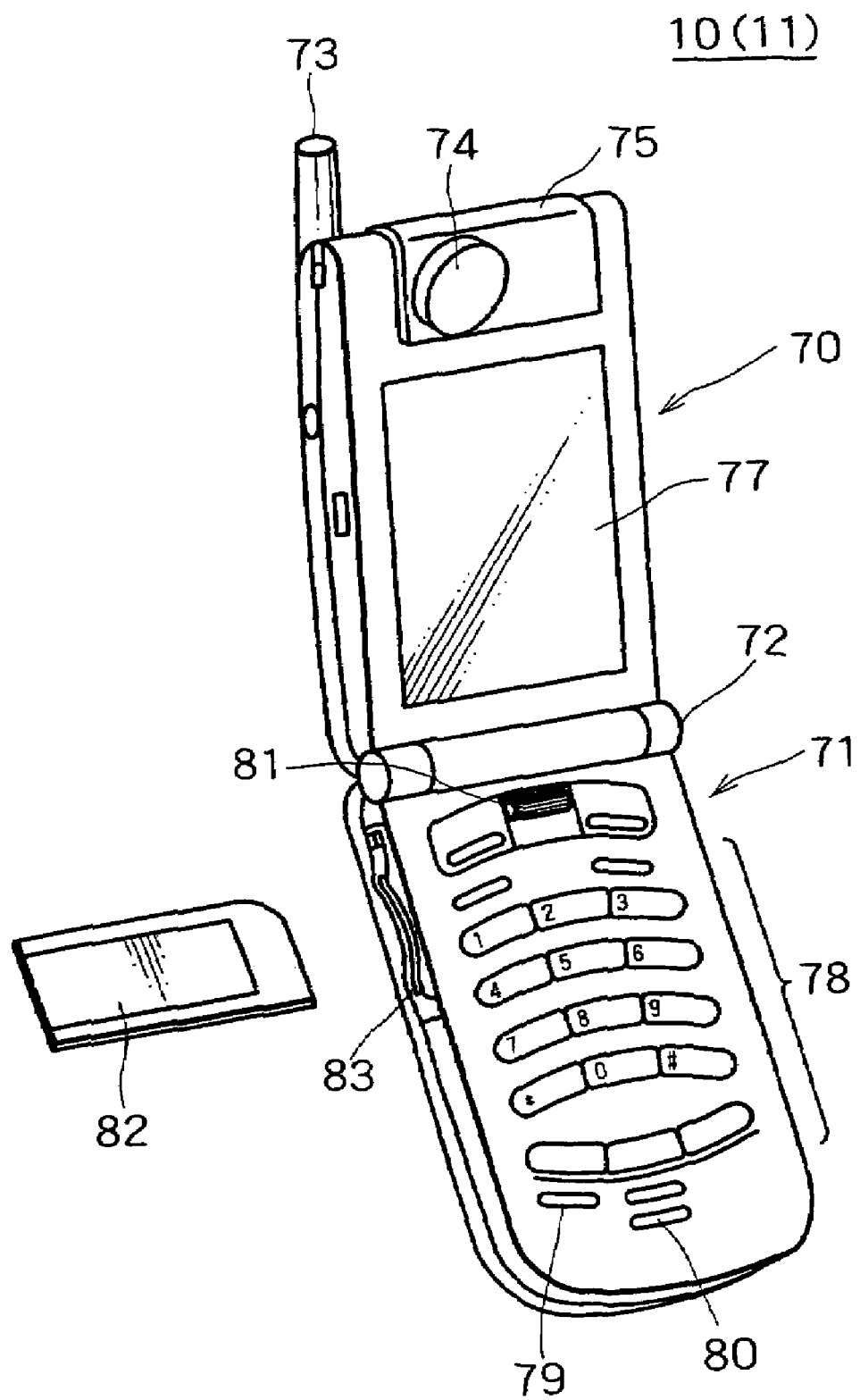
FIG. 26 is a perspective view illustrating an external configuration of a camera-mounted digital mobile phone.

Referring to FIG. 26, each of the camera-mounted digital mobile phones 10 and 11 is composed of a display section 70 and a main body 71 which are foldable to each other around a hinge 72 in between.

The display section 70 has a retractable send/receive antenna 73 at its upper left corner. The mobile phone 10 or 11 transmits and receives signals to and from the base station 7 or 8 (FIG. 2) via the antenna 73.

The display section 70 has, on its top center, a camera section 75 which is pivotable within an angular range of about 180 degrees. The camera-mounted digital mobile phone 10 or 11 takes pictures by a CCD camera 74 incorporated in the camera section 75.

Figure 27:
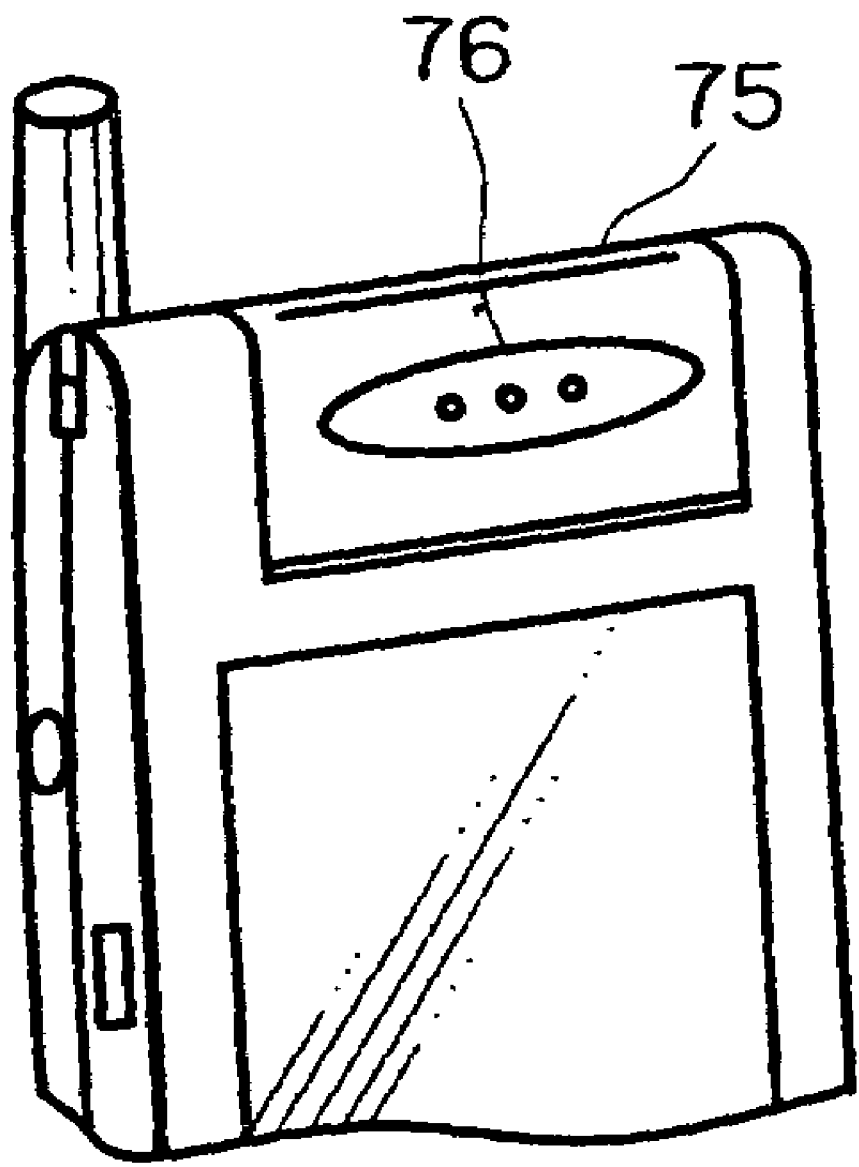
FIG. 27 is a partial perspective view of the camera-mounted digital mobile phone with its camera section swiveled.

When the camera section 75 is rotated by the user about 180 degrees, the display section 70 is positioned with a speaker 76 arranged at the rear center of the camera section 75 faced to the front side as shown in FIG. 27. Thus, the camera-mounted mobile phone 10 or 11 gets in the normal talk mode.

In addition, the display section 70 has a liquid crystal display 77 at the front center section. The liquid crystal display 77 displays the contents of electronic mail, a simplified home page, and an image taken by the CCD camera 74 of the camera section 75 in addition to radio wave reception status, battery remaining amount, and names and numbers of phones and call log registered as a telephone directory.

On the other hand, the main body 71 has numeric keys "0" through "9", a call key, a redial key, a clear/power key, and other operator keys 78 on the front surface various commands are inputted from these operator keys 78 into the digital mobile phone 10 or 11.

Below the operator keys 78 of the main body 71, a memo button 79 and a microphone 80 are arranged. When the memo button 79 is pressed, the digital mobile phone 10 or 11 records the voice of the other party. The digital mobile phone 10 or 11 picks up the voice of the user in the talk mode through the microphone 80.

In addition, a rotatable jog dial 81 is arranged over the operator keys 78 on the main body 71 in a manner in which the jog dial 81 is slightly projecting from the surface of the main body 71. In accordance with the rotary operation of the jog dial 81, the digital mobile phone 10 or 11 executes the scrolling of a telephone directory list, a mail address list or electronic mail messages displayed on the liquid crystal display 77, the turning of the displayed pages of simplified home page, and the feeding of displayed images, for example.

For example, the main body 71 is configured to select a desired telephone number from among those in a telephone directory list displayed on the liquid crystal display 77 by the rotation of the jog dial 81 by the user and, when the jog dial 81 is pressed into the main body 71, enter the selected telephone number, thereby automatically originating a call to the party at the selected telephone number.

Also, the main body 71 is configured to select a desired mail address from among those in a mail address list displayed on the liquid crystal display 77 by the rotation of the jog dial 81 by the user when the mail address list is displayed on the liquid crystal display 77 in a state in which an electronic mail message has been created. When the jog dial 81 is pressed into the main body 71, the main body 71 is configured to enter the selected mail address, thereby automatically sending electronic mail to the party at the selected mail address.

It should be noted that a battery pack, not shown, is loaded in the main body 71 at the rear side. When the clear/power key is turned on, power is supplied from the battery pack to each circuit, making the digital mobile phone 10 or 11 ready for operation.

The main body 71 also has a Memory Stick slot 83 at the upper left side in which the detachable Memory Stick 82 is loaded. When the memo button 79 is pressed, the digital mobile phone 10 or 11 records the voice of the other party into the loaded Memory Stick 82. In accordance with the operation of the user, the digital mobile phone 10 or 11 records an electronic mail message, a simplified home page, an image taken by the CCD camera 74 into the loaded Memory Stick 82, advertisement card data, or message card data.

The Memory Stick 82 is a kind of flash memory card developed by Sony Corporation, the applicant hereof. The Memory Stick 82 incorporates a flash memory device, one kind of EEPROM (Electrically Erasable and Programmable Read Only Memory), which is a nonvolatile memory capable of electrically rewriting and erasing data, and is housed in a plastic case having dimensions of 21.5 mm×50 mm×2.8 mm. The Memory Stick 82 allows writing and reading of various data such as images, voices, and music via a 10-pin terminal.

The Memory Stick 82 uses a proprietary serial protocol which guarantees compatibility with the devices in which it is used even if the specifications of the incorporated flash memory have been changed due to the increase in its capacity for example, realizes the high-speed performance of maximum write rate of 1.5 MB/S and maximum read rate of 2.45 MB/S, and ensures the high reliability by the provision of an erroneous deletion preventing switch.

Consequently, the digital mobile phones 10 and 11, configured to detachably load the Memory Stick 82, can share data with other electronic devices via the Memory Stick 82.

(2-4-2) Circuit Configuration of Camera-Mounted Digital Mobile Phones 10 and 11

Figure 28:
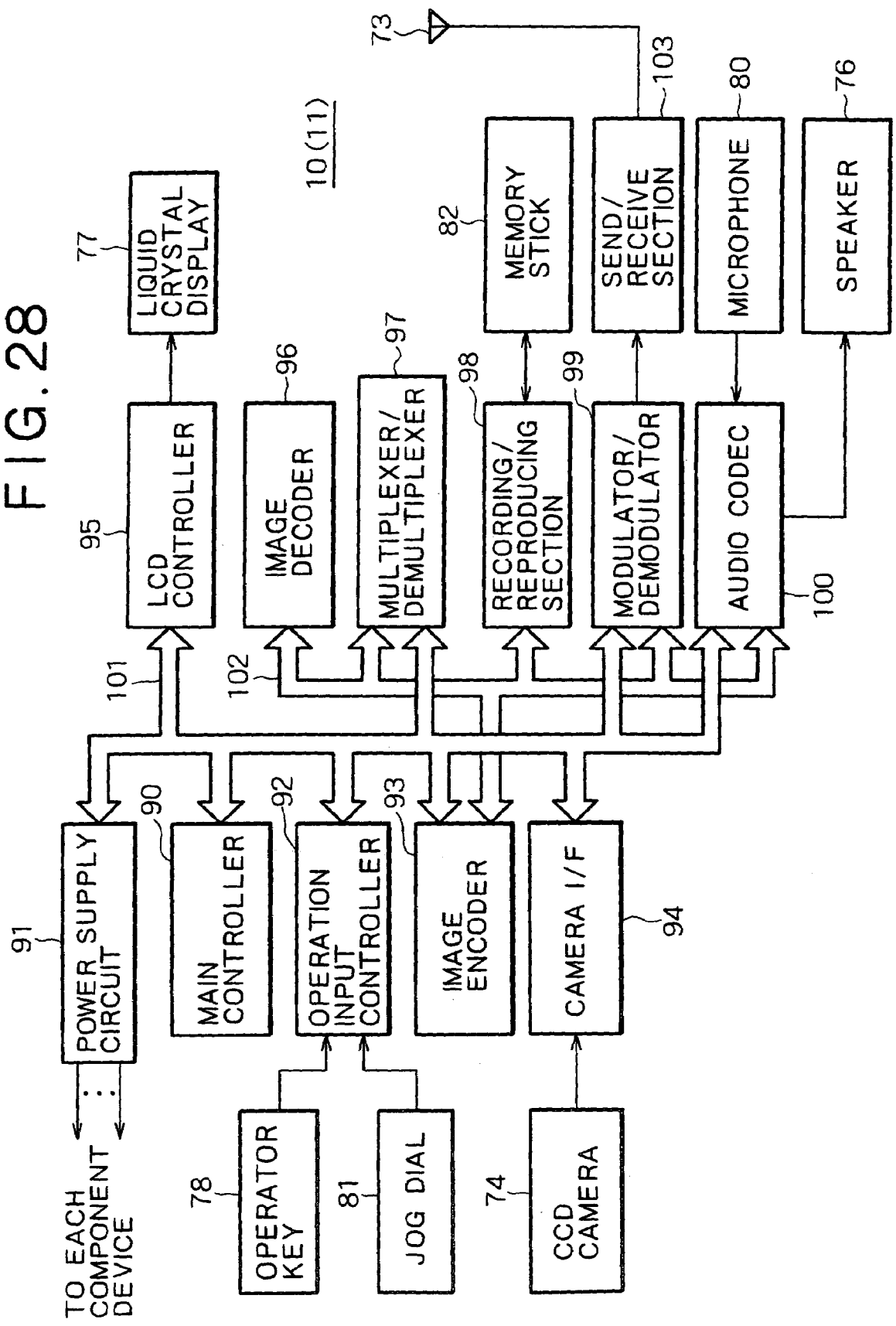
FIG. 28 is a block diagram illustrating a circuit configuration of the camera-mounted digital mobile phone.

Referring to FIG. 28, each of the digital mobile phones 10 and 11 is configured so that a main controller 90 for centrally controlling each portions of the display section 70 and the main body 71 is connected to a power supply circuit 91, an operation input controller 92, an image encoder 93, a camera interface 94, an LCD (Liquid Crystal Display) controller 95, an image decoder 96, a multiplexer/demultiplexer 97, a recording/reproducing section 98, a modulator/demodulator 99, and an audio codec 100 via a main bus 101, and the image encoder 93, the image decoder 96, the multiplexer/demultiplexer 97, a recording/reproducing section 98, the modulator/demodulator 99, and the audio codec 100 are interconnected by a synchronous bus 102.

The power supply circuit 91, when the clear/power key is turned on by the user, supplies power from the battery pack to each component circuit, thereby making the digital mobile phone 10 or 11 ready for operation.

Under the control of the main controller 90 composed of a CPU, a ROM (Read Only Memory), and a RAM for example, the digital mobile phone 10 or 11 converts an audio signal picked up by the microphone 80 in the talk mode into digital audio data through the audio codec 100. The digital mobile phone 10 or 11 performs spread spectrum on the digital audio data through a modulator/demodulator 99 and performs digital-to-analog conversion and then frequency conversion on the digital audio data through the a send/receive circuit 103, sending the resultant digital audio data to the base station 7 or 8 (shown in FIG. 2) via the antenna 73.

The digital mobile phone 10 or 11 amplifies by the send/receive circuit 103 a receive signal received at the antenna 73 in the talk mode, performs frequency conversion and analog-to-digital conversion on the amplified receive signal, performs de-spread spectrum on the converted signal through the modulator/demodulator 99, and converts the resultant signal into an analog audio signal through the audio codec 100. The digital mobile phone 10 or 11 outputs a sound corresponding to this analog audio signal from the speaker 76.

Further, in the data communication mode, when sending electronic mail, the digital mobile phone 10 or 11 sends the text data of electronic mail inputted from the operator keys 78 and the jog dial 81 to the main controller 90 via the operation input controller 92.

The main controller 90 performs spread spectrum on the text data through the modulator/demodulator 99 and then digital-to-analog conversion and frequency conversion through the send/receive circuit 103, sending the resultant text data to the base station 7 or 8 via the antenna 73.

In the data communication mode, when receiving electronic mail, the digital mobile phone 10 or 11 amplifies the receive signal received from the base station 7 or 8 via the antenna 73 to perform frequency conversion and analog-to-digital conversion on the amplified signal and then de-spread spectrum on the resultant signal to restore the original data and displays the original data on the liquid crystal display 77 through the LCD controller 95 as an electronic mail message.

Then, the mobile phone 10 or 11 can also record the electronic mail message received in accordance with user operation to the Memory Stick 82 via the recording/reproducing section 98.

In the data communication mode, when sending image data, the digital mobile phone 10 or 11 supplies the image data taken by the CCD camera 74 to the image encoder 93 via the camera interface 94.

When not sending image data, the digital mobile phone 10 or 11 can also display the image data taken by the CCD camera 74 onto the liquid crystal display 77 via the camera interface 94 and the LCD controller 95.

The image encoder 93 converts the image data supplied from the CCD camera 74 into coded image data by coding and compressing based on MPEG2 (Moving Picture Experts Group 2) or JPEG for example and sends the coded image data to the multiplexer/demultiplexer 97.

At this moment, the digital mobile phone 10 or 11 sends an audio signal picked up by the microphone 80 while taking the image by the CCD camera 74 to the multiplexer/demultiplexer 97 via the audio codec 100 as audio data.

The multiplexer/demultiplexer 97 multiplexes the coded image data supplied from the image encoder 93 with the audio data supplied from the audio codec 100 by a predetermined algorithm, performs spread spectrum on the resultant multiplex data through the modulator/demodulator 99, and performs digital-to-analog conversion and frequency conversion through the send/receive circuit 103, outputting the resultant data to the base station 7 or 8 via the antenna 73.

In the data communication mode, when receiving the image data of a simplified home page for example, the digital mobile phone 10 or 11 amplifies by the send/receive circuit 103 the receive signal received from the base station 7 or 8 via the antenna 73, and performs frequency conversion and analog-digital conversion on the resultant data. Then, the digital mobile phone 10 or 11 performs de-spread spectrum on the obtained data through the modulator/demodulator 99 and sends the resultant multiplex data to the multiplexer/demultiplexer 97.

The multiplexer/demultiplexer 97 divides the multiplex data into coded image data and audio data, supplying the coded image data to the image decoder 96 and the audio data to the audio codec 100 via the synchronous bus 102.

The image decoder 96 generates reproduced image data by decoding the coded image data by the corresponding predetermined decoding algorithm such as MPEG2 or JPEG for example and supplies the reproduced image data to the liquid crystal display 77 via the LCD controller 95. Consequently, the digital mobile phone 10 or 11 displays on the liquid crystal display 77 the image data contained in a simplified home page for example.

At the same time, the audio codec 100 converts the audio data into an analog audio signal and supplies it to the speaker 76 as the reproduced audio of the simplified home page.

In this case, as with electronic mail, the digital mobile phone 10 or 11 also can record the image data linked with the received simplified home page into the Memory Stick 82 via the recording/reproducing section 98 as operated by the user.

In addition to the above-mentioned configuration, the camera-mounted digital mobile phones 10 and 11 each store in the ROM of the main controller 90 an advertisement card data acquisition processing program, a message card data acquisition processing program, a card data manipulation transmission program, and other application software.

Figure 29:
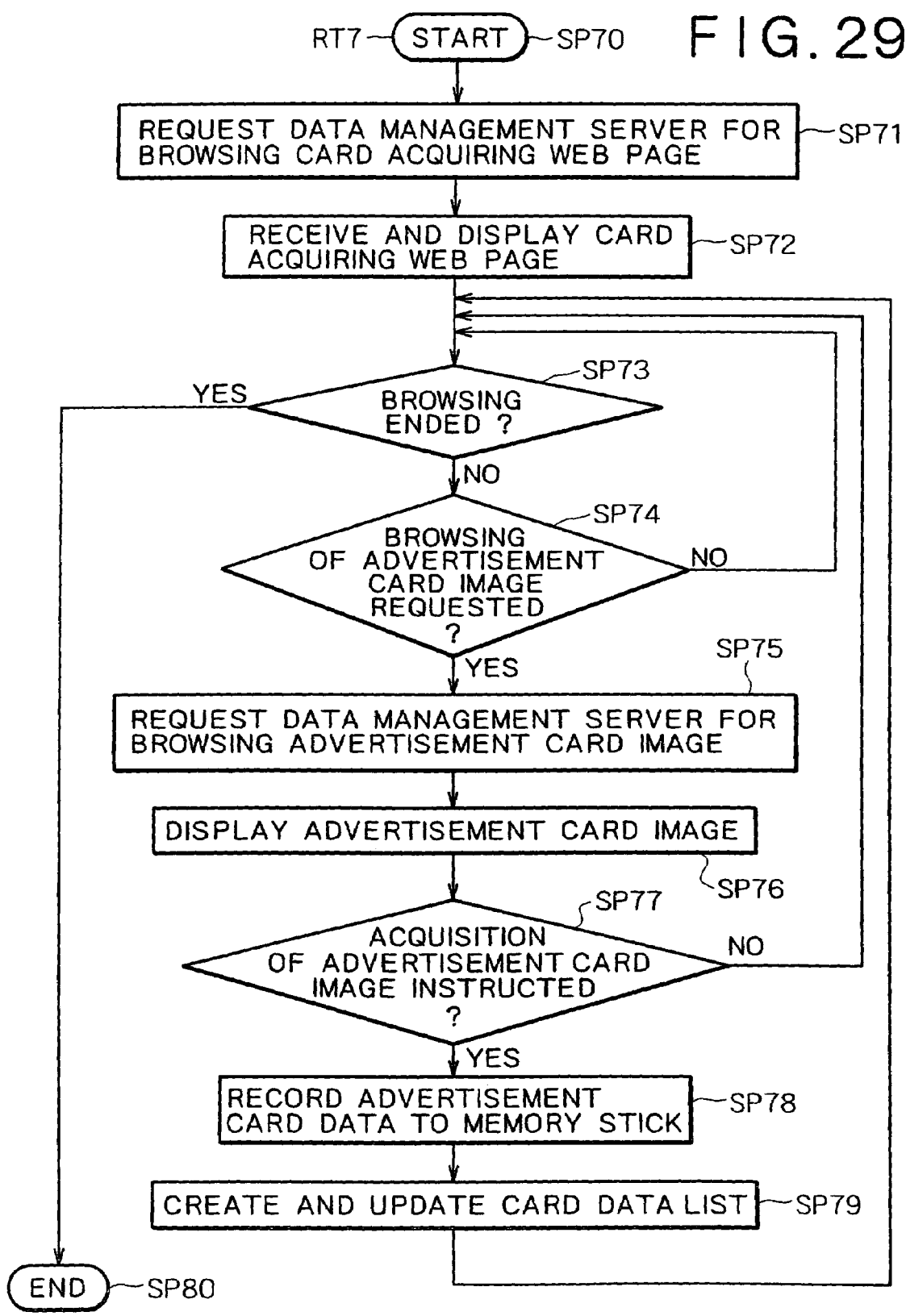
FIG. 29 is a flowchart describing a procedure of advertisement card data acquisition processing.
Figure 30:
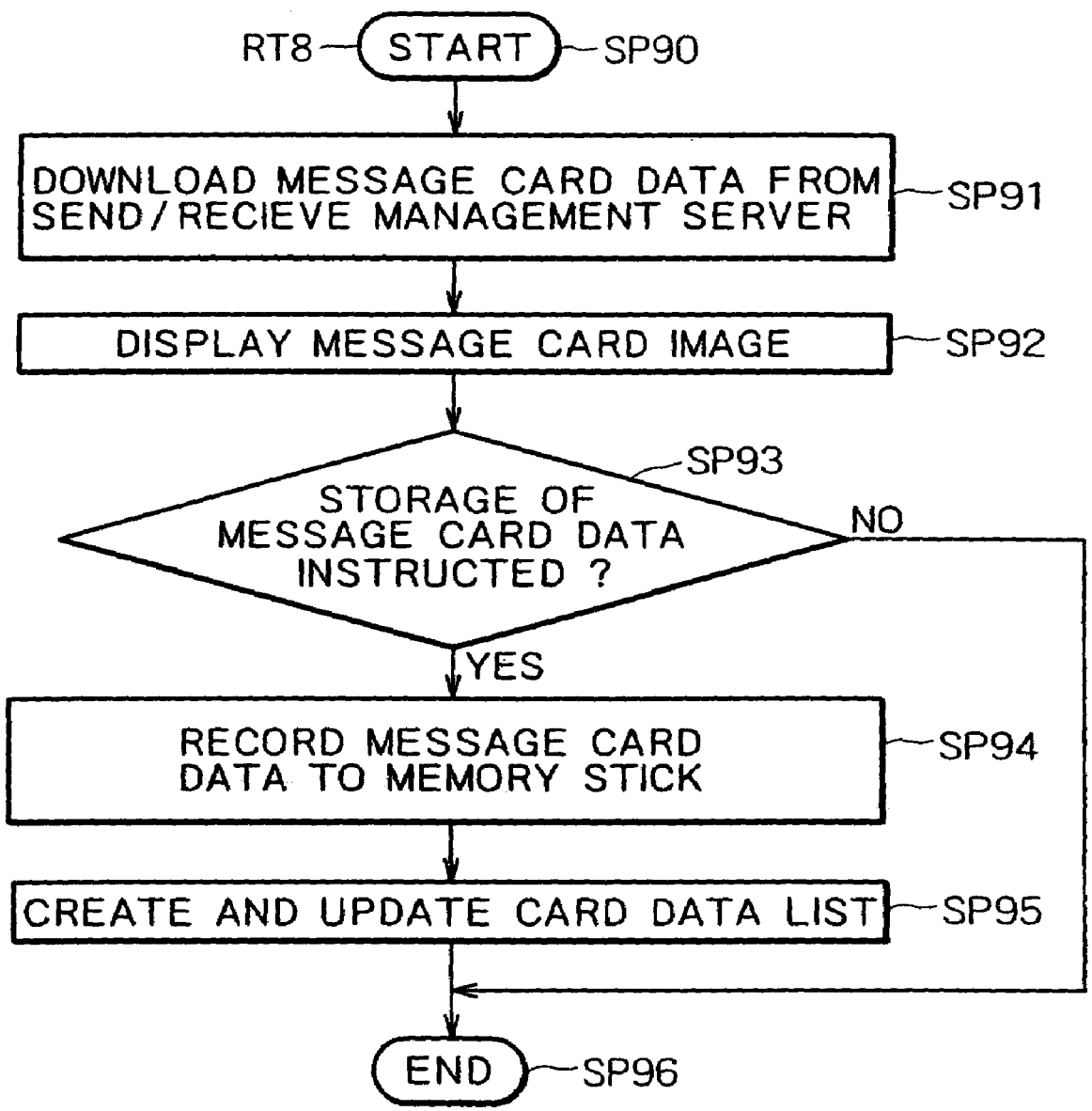
FIG. 30 is a flowchart describing a procedure of message card data acquisition processing.

When acquiring advertisement card data in the data communication mode, the main controller 90 enters an advertisement card data acquisition processing procedure RT7 from step SP70 shown in FIG. 29 in accordance with the advertisement card data acquisition processing program read into the RAM. In step SP71, the main controller 90 generates browsing request data in response to a request for browsing a card acquiring Web page specified by the user.

Then, the main controller 90 performs spread spectrum on the browsing request data by the modulator/demodulator 99 and digital-to-analog conversion and frequency conversion on the browsing request data by the send/receive circuit 103 to transmit the resultant data to the base station 7 or 8 via the antenna 73, thereby requesting the data management server 2A (FIG. 2) for the browsing of the card acquiring Web page from the base station 7 or 8 via the Internet 3, upon which the main controller 90 goes to step SP72.

In step SP72, as a result of requesting the data management server 2A for the browsing of a card acquiring Web page, the main controller 90 receives the signal of the requested card acquiring Web page from the data management server 2A via the Internet 3 and the base station 7 or 8 via the antenna 73, amplifies the received signal by the send/receive circuit 103, performs frequency conversion and analog-to-digital conversion on the amplified signal, performs de-spread spectrum on the converted signal by modulator/demodulator 99, and sends the resultant data of the card acquiring Web page to the liquid crystal display 77 via the LCD controller 95 to display the card acquiring Web page for the user, upon which the main controller 90 goes to step SP73.

In step SP73, the main controller 90 determines whether or not the end of the browsing of the card acquiring Web page has been specified by the user.

If the decision is NO in step SP73, it indicates that the end of the browsing of the card acquiring Web page has not been specified by the user and it is possible that the browsing of the advertisement card image 17 be requested by the user. In this case, the main controller 90 goes to step SP74 to determine whether or not the user has selected a desired title to request the browsing of the advertisement card image 17.

If the decision is NO in step SP74, it indicates that, because the browsing of the advertisement card image 17 has not been requested by the user, it is possible that the browsing of the card acquiring Web page be also ended without browsing the advertisement card image 17. In this case, the main controller 90 returns to step SP73 to repeat a processing loop of steps SP74 to SP73 to SP74 while checking if the end of the browsing of the card acquiring Web page is specified by the user, thereby waiting for the request for the browsing of the advertisement card image 17 specified by the user.

If the decision is YES in step SP74, it indicates that a title has been selected by the user to request the browsing of the advertisement card image 17. In this case, the main controller 90 goes to step SP75 to extract the advertisement ID corresponding to the selected title of many advertisement IDs embedded in the card acquiring Web page, generating the browsing request data for the advertisement card image 17 on the basis of the extracted advertisement ID.

The main controller 90 performs spread spectrum on the advertisement card data browsing request data by the modulator/demodulator 99, performs digital-to-analog conversion and frequency conversion on the data by the send/receive circuit 103, and sends the resultant data to the base station 7 or 8 via the antenna 73, thereby requesting the data management server 2A (FIG. 2) for the browsing of the advertisement card image 17 from the base station 7 or 8 via the Internet 3, upon which the main controller 90 goes to step SP76.

In step SP76, as a result of requesting the data management server 2A for the browsing of the advertisement card image 17, the main controller 90 receives the signal of the corresponding advertisement card data transmitted from the data management server 2A via the Internet 3 and the nearby base station 7 or 8 via the antenna 73, amplifies the received signal by the send/receive circuit 103, performs frequency conversion and analog-to-digital conversion on the amplified signal, performs de-spread spectrum on the resultant signal by the modulator/demodulator 99, and stores the resultant advertisement card data into the RAM of the main controller 90.

Then, the main controller 90 sends the advertisement card data stored in the RAM to the liquid crystal display 77 via the LCD controller 95 to display the advertisement card image 17 based on the advertisement card data onto the display 77 for the user to browse, upon which the main controller 90 goes to step SP77.

At this moment, in accordance with the card management information and card configuration information stored in the header portion 25 of the advertisement card data, the main controller 90 extracts the compressed still image data and audio data from the data portion 26, decodes the extracted data by the image decoder 96 and the audio codec 100, and, in accordance with the style data and so on stored in the header portion 26, displays the resultant still image data into the advertisement card image 17, at the same time outputting the audio data from the speaker 76.

In step SP77, the main controller 90 determines whether or not the acquisition of the advertisement card image 17 in browsing has been specified by the user.

If the decision is NO in step SP77, it indicates that the user has actually browsed the advertisement card image 17 and, as a result, canceled its acquisition, meaning that it is possible for the user to end the browsing of the advertisement card image 17 or request the browsing of another advertisement card image 17. In this case, the main controller 90 displays the card acquiring Web page onto the display 77 instead of the advertisement card image 17, upon which the main controller 90 returns to step SP73.

If the decision is YES in step SP77, it indicates that the user, having actually browsed the advertisement card image 17, has specified the acquisition of the advertisement card image 17. In this case, the main controller 90 goes to step SP78 to record the advertisement card data stored in the RAM to the Memory Stick 82 through the recording/reproducing section 98 and display the card acquiring Web page onto the liquid crystal display 77 instead of the advertisement card image 17, upon which the main controller 90 goes to step SP79.

In step SP79, having acquired the advertisement card data into the Memory Stick 82, the main controller 90 generates a card data list for listing the titles of the acquired advertisement card data and records the generated card data list into the Memory Stick 82 through the recording/reproducing section 98, upon which the main controller 90 returns to step SP73.

If the advertisement card data and the card data list have already been stored in the Memory Stick 82, the main controller 90 reads the card data list from the Memory Stick 82 through the recording/reproducing section 98 in step SP79, adds the title of the newly acquired advertisement card data to the retrieved card data list to update the same, and records the updated card data list to the Memory Stick 82 through the recording/reproducing section 98.

Thus, the main controller 90 can acquire the advertisement card data selected by the user by recording the selected advertisement card data into the Memory Stick 82.

If the decision is YES in step SP73, it indicates that the end of browsing the card acquiring Web page has been specified by the user after the acquisition of the advertisement card data or without acquiring the advertisement card data. In this case, the main controller 90 goes to step SP80 to end the advertisement card data acquisition processing procedure RT7.

When downloading message card data in the data communication mode, the main controller 90 enters a message card data acquisition processing procedure RT8 from step SP90 in accordance with the message card data acquisition processing program read into the RAM and goes to step SP91.

In step SP91, the main controller 90 periodically accesses the send/receive management server 2B via the Internet 3 to read the message card data addressed to the message recipient, thereby receiving the signal of the message card data from the nearby base station 7 or 8 via the antenna 73. The main controller 90 then amplifies the received signal by the send/receive circuit 103, performs frequency conversion and analog-to-digital conversion, performs de-spread spectrum on the resultant signal through the modulator/demodulator 99, and stores the resultant message card data into the RAM of the main controller 90, upon which the main controller 90 goes to step SP92.

In step SP92, the main controller 90 sends the message card data stored in the RAM to the liquid crystal display 77 through the LCD controller 95 to display the message card image 19 based on the message card data onto the liquid crystal display 77, presenting the message card image 19 to the user, upon which the main controller 90 goes to step SP93.

At this moment, in accordance with the card management information and card configuration information stored in the header portion 25 of the message card data, the main controller 90 extracts the compressed still image data and audio data from the data portion 26, decodes the extracted data by the image decoder 96 and the audio codec 100, and, in accordance with the style data and so on stored in the header portion 26, displays the resultant still image data into the advertisement card image 19, at the same time outputting the audio data from the speaker 76.

In step SP93, the main controller 90 determines whether the user has specified the storage of the message card data received from the send/receive management server 2B.

If the decision is YES in step SP93, it indicates that the user has specified the storage of the message card image for future browsing. In this case, the main controller 90 goes to step SP94 records the message card data stored in the RAM to the Memory Stick 82 through the recording/reproducing section 98, upon which the main controller 90 goes to step SP95.

In step SP95, having stored the message card data into the Memory Stick 82, the main controller 90 generates a card data list by the title of the advertisement card data for these message card data and records the generated card data list into the Memory Stick 82 through the recording/reproducing section 98, upon which the main controller 90 goes to step SP96 to end the message card data acquisition processing procedure RT8.

If the card data list has already been stored in the Memory Stick 82 in response to the acquisition of advertisement card data and other message card data, the main controller 90 reads the card data list from the Memory Stick 82 through recording/reproducing section 98 in step SP95, adds the title of the advertisement card data for the newly acquired message card data to the retrieved card data list to update the same, and records the updated card data list to the Memory Stick 82 through the recording/reproducing section 98 again.

If the decision is NO in step SP93, it indicates that the user has browsed the message card image 19 only once and specified not to store the same. In this case, the main controller 90 goes to step SP96 to end the message card data acquisition processing procedure RT8.

Figure 31:
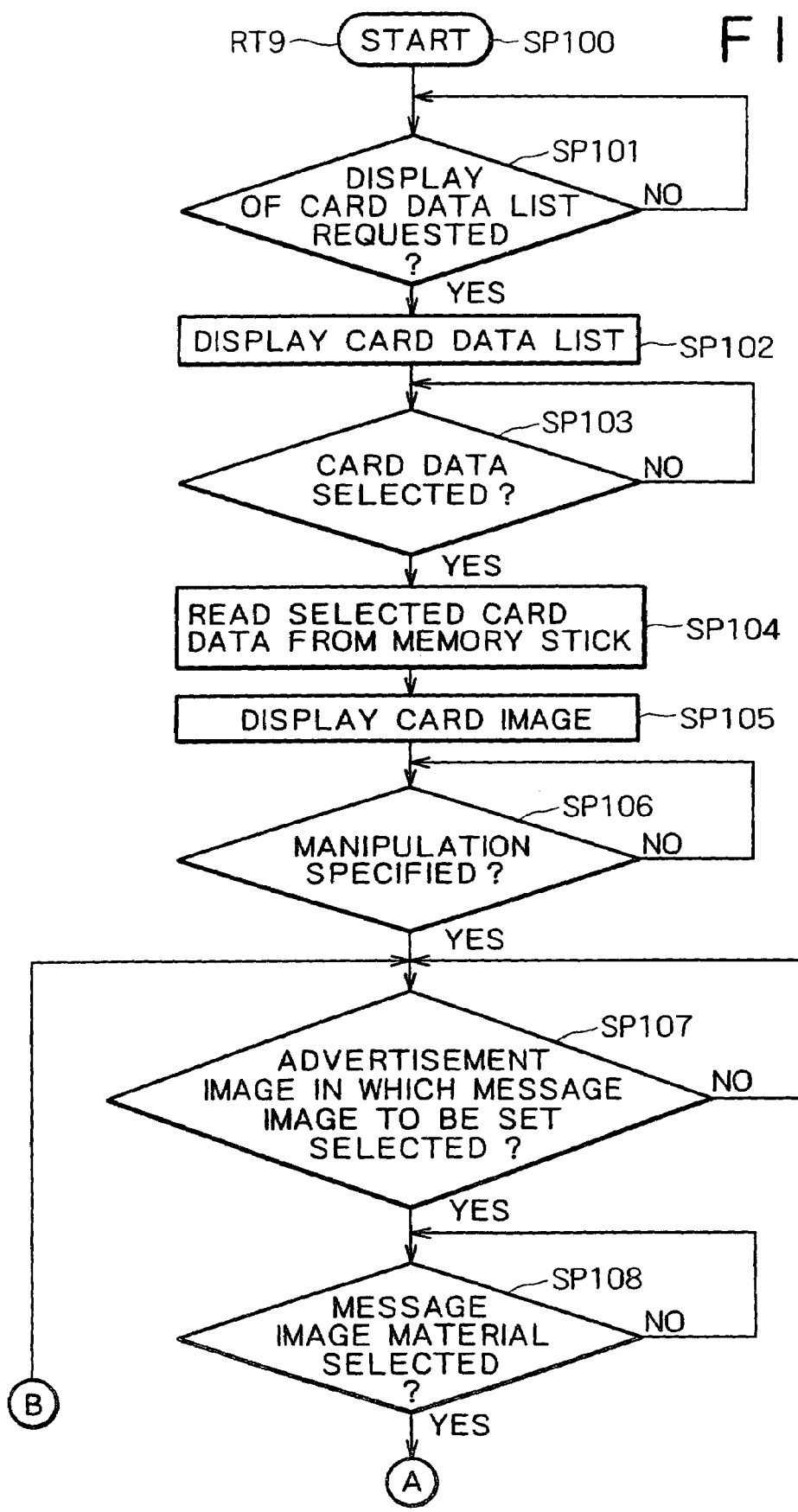
FIG. 31 is a flowchart describing a procedure of card data manipulating processing.
Figure 32:
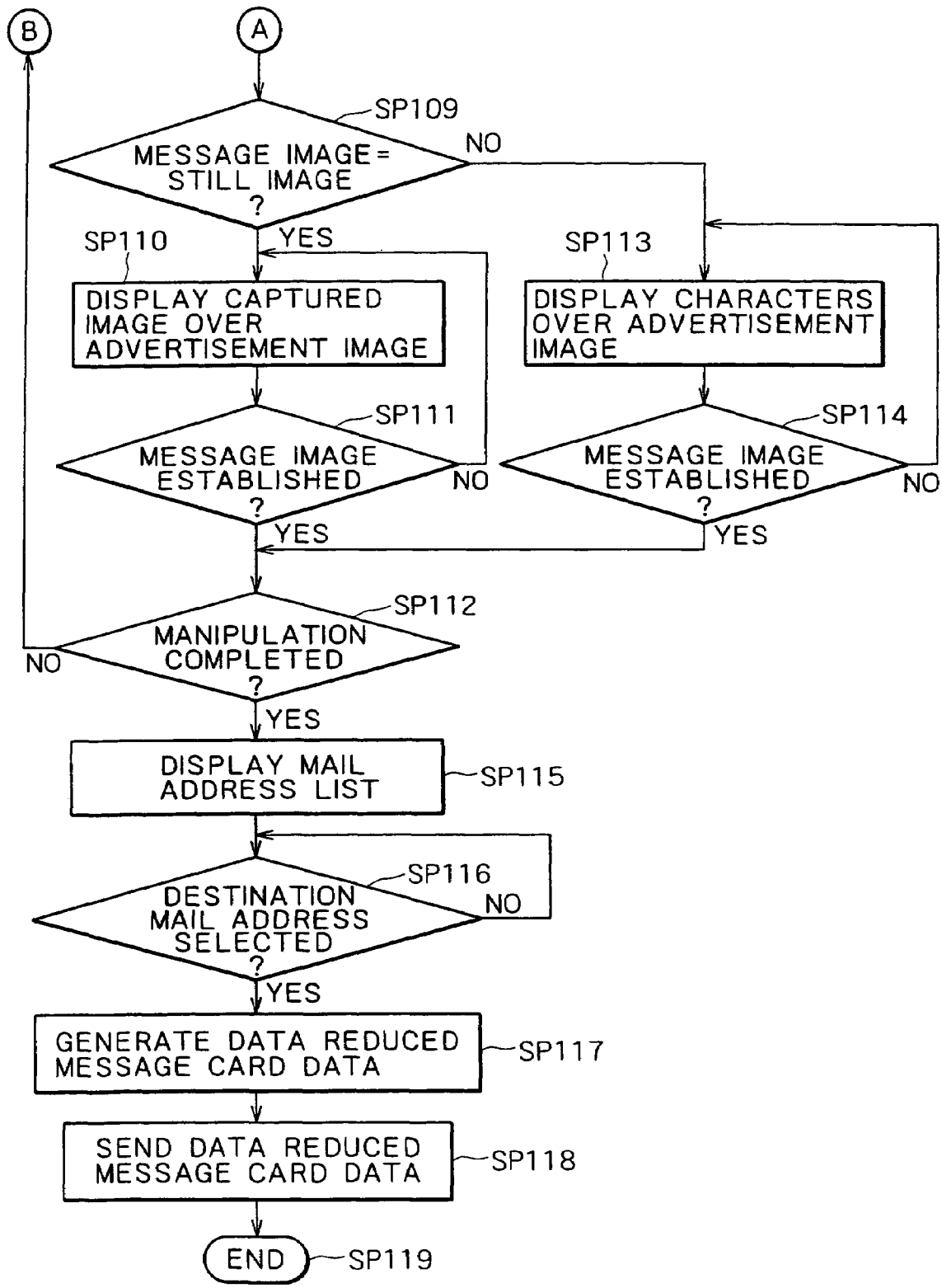
FIG. 32 is a flowchart continued from the flowchart shown in FIG. 31.

On the other hand, when using the acquired advertisement card data and message card data for message transmission, the main controller 90 enters a card data manipulation transmission processing procedure RT9 shown in FIGS. 31 and 32 from step SP100 in accordance with the card data manipulation transmission program read into the RAM. In step SP101, the main controller 90 waits for a request by the user for displaying the card data list.

In step SP101, if the request for displaying the card data list is made by the user, the main controller 90 goes to step SP102 to read the requested card data list from the Memory Stick 82 through the recording/reproducing section 98 and, at the same time, send the retrieved card data list to the liquid crystal display 77 through the LCD controller 95 to display the list on the liquid crystal display 77, upon which the main controller 90 goes to step SP103.

In step SP103, the main controller 90 waits for the title of the advertisement card data to be used for message transmission to be selected by the user on the card data list displayed on the liquid crystal display 77. When the title of the advertisement card data is selected on the card data list, the main controller 90 goes to step SP104.

In step SP104, the main controller 90 reads the advertisement card data or message card data corresponding to the selected title from the Memory Stick 82 through the recording/reproducing section 98 and goes to step SP105, in which the main controller 90 sends the retrieved advertisement card data or message card data to the liquid crystal display 77 through the LCD controller 95 to display the advertisement card image 17 based on the advertisement card data or the message card image 19 based on the message card data onto the liquid crystal display 77, upon which the main controller 90 goes to step SP106.

In step SP106, the main controller 90 waits for the user to specify the manipulation of the advertisement card image 17 or the message card image 19 for message transmission.

If the advertisement card image 17 is being displayed on the liquid crystal display 77 for the image to be manipulated for message transmission in step SP106, then the main controller 90 goes to step SP107 upon the specification of the manipulation of the advertisement card image 17.

On the contrary, if the message card image 19 is being displayed on the liquid crystal display 77 for the image to be manipulated for message transmission in step SP106, the main controller 90 extracts the message image 18 from the message card image 19 upon specification of the manipulation, displaying the advertisement card image 17 for the message card image 19 on the liquid crystal display 77, upon which the main controller 90 goes to step SP107.

In step SP107, the main controller 90 waits for the selection of the advertisement image 15 in which a message image 20 is inlaid as superimposed on the advertisement card image 17 displayed on the liquid crystal display 77, of one or more advertisement images 15. Upon selection of the advertisement image 15, the main controller 90 goes to step SP108.

In step SP108, the main controller 90 waits for the selection by the user of the material (for example, in the present embodiment, a still image captured by the CCD camera 74 and characters (text) are used separately) forming the message image 20. Upon selection of the material, the main controller 90 goes to step SP109.

In step SP109, the main controller 90 determines whether or not the selected material of the message image 20 is a still image.

If the decision is YES in step SP109, it indicates that the selection of a still image for the material of the message image 20 results in the use of a still image of desired scene from an image (namely, a moving image) captured by the user with the CCD camera 74. In this case, the main controller 90 goes to step SP110 and sends the image data captured by the CCD camera 74 to the liquid crystal display 77 via the camera interface 94 and the LCD controller 95, thereby inlaying the captured image based on the transmitted image data into the template image 16 inside the advertisement card image 19 as superimposed upon the advertisement image 15 selected in step SP107. The main controller 90 then goes to step SP111.

In step SP111, the main controller 90 determines whether or not a still image of desired scene has been selected by the user for determining the message image 20.

If the decision is NO in step SP111, it indicates that the message image 20 has not yet been determined due to incomplete structural outline of the object for example. In this case, the main controller 90 returns to step SP110 to repeat a processing loop of steps SP111 to SP110 to SP111 until the message image 20 is determined.

Then, when the message image 20 is determined by the selection by the user of a still image of desired scene in step SP111, namely the decision in step SP111 is YES, the main controller 90 goes to step SP112 to determine whether the manipulation of the advertisement card image 17 has been completed.

If the decision is NO in step SP112, it indicates that there still may be another advertisement image 15 to be manipulated as inlaid in such a manner as to be superimposed on the message image 20 in addition to the advertisement image 15 inlaid with the message image 20 on the advertisement card image 17 displayed on the liquid crystal display 77. In this case, the main controller 90 returns to step SP107.

If the decision is NO in step SP109, it indicates that characters (text) have been selected as the material of the message image 20. In this case, the main controller 90 goes to step SP113 and sends the text data inputted from the operator keys 78 to the liquid crystal display 77 via the operation input controller 92 and the LCD controller 95, in which the characters based on the text data are sequentially superimposed upon the advertisement image 15 selected in step SP107 inside the advertisement card image 17. The main controller 90 then goes to step SP114.

In step SP114, the main controller 90 determines whether or not the inputting of text data by the user has been completed and a message image formed by a text image to be inlaid into the template image 16 as superimposed upon the advertisement image 15 has been determined.

If the decision is NO in step SP114, it indicates that the text data are still inputted by the user through the operator keys 78. In this case, the main controller 90 returns to step SP113 to repeat a processing loop of steps SP114 to SP113 to SP114 until the inputting of the text data is completed and the message image is determined.

Then, when the decision in step SP114 is YES upon completion of the inputting of the text data and the determination of the message image, the main controller 90 goes to step SP112.

If the decision is YES in step SP112, it indicates that the end of the manipulation of the advertisement card image 17 has been specified by the user. In this case, the main controller 90 stores the message flag for displaying the message image 18 in preference to the advertisement image 15 superimposed with the message image 18 into the data portion 26 of the original advertisement card data and then goes to step SP115. In step SP115, the main controller 90 reads the mail address list from the Memory Stick 82 through the recording/reproducing section 98 and sends this mail address list to the liquid crystal display 77 via the LCD controller 95 to display the mail address list, upon which the main controller 90 goes to step SP116.

In step SP116, the main controller 90 waits for the selection of the mail address of the destination of message transmission on the mail address list displayed on the liquid crystal display 77. Upon selection of this mail address, the main controller 90 goes to step SP117.

In step SP117, the main controller 90 generates the address information of one or more destination mail addresses selected by the user and stores the generated address information into the header portion 25. At the same time, the main controller 90 generates the data reduced message card data by storing the message image data of the message image 20 determined by the user into the data portion 26 along with the style data and then goes to step SP118.

In step SP118, the main controller 90 performs spread spectrum on the data reduced message card data by the modulator/demodulator 99, performs digital-to-analog conversion and frequency conversion on the resultant data reused message card data by the send/receive circuit 103, and sends the resultant data to the base station 7 or 8 via the antenna 73, sending the data reduced message card data from the base station 7 or 8 to the send/receive management server 2B. Then, the main controller 90 goes to step SP119 to end the card data manipulation transmission processing procedure RT9.

When transmitting message card data to the message recipient, because the advertisement card data from which the message card data were generated are stored in the Memory Stick 82, the main controller 90 can generate new message card data by use of this advertisement card data again.

(2-4-3) Configuration of Operator Screen of the Camera-Mounted Digital Mobile Phones 10 and 11

Figure 33:
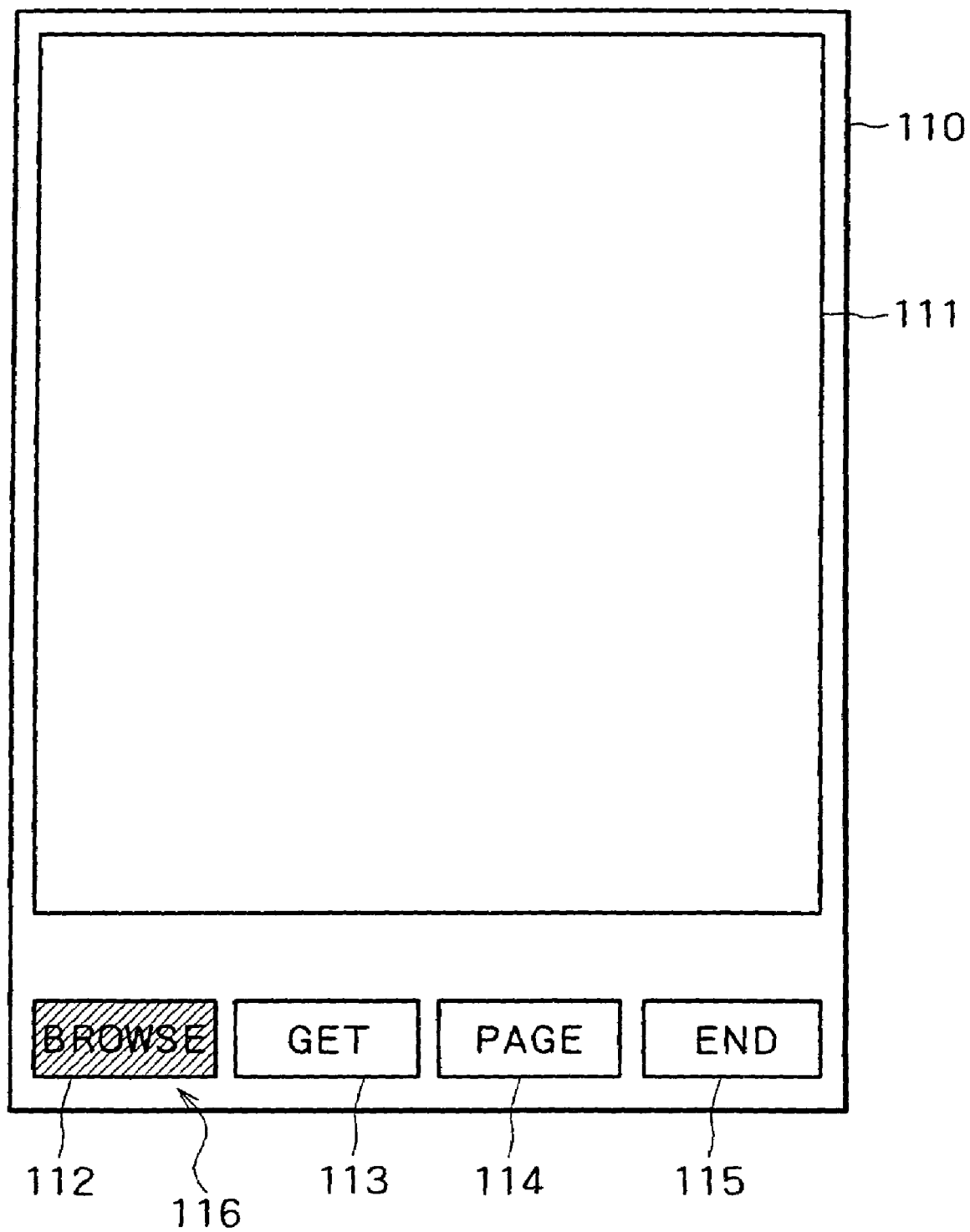
FIG. 33 is a schematic diagram illustrating an advertisement data acquisition screen.

When acquiring advertisement card data, the main controller 90 displays on the liquid crystal display 77 an advertisement data acquisition screen 110 shown in FIG. 33 selected from a predetermined menu screen.

The advertisement data acquisition screen 110 has an image display area 111, a browse button 112, a get button 113, a page button 114, and an end button 115.

In response to the rotary operation of the jog dial 81 by the user, the main controller 90 displays a cursor 116 which moves over the get button 113, the page button 114, and the end button 115, and highlights one of the buttons and characters thereof in reverse video. When the jog dial 81 is pressed into the main body 71 by the user with the cursor 116 positioned to one of the get button 113, the page button 114, and the end button 115, the main controller 90 determines that the button pointed by the cursor 116 has been selectively specified by the user and executes the processing allocated to the cursor 116.

Figure 34:
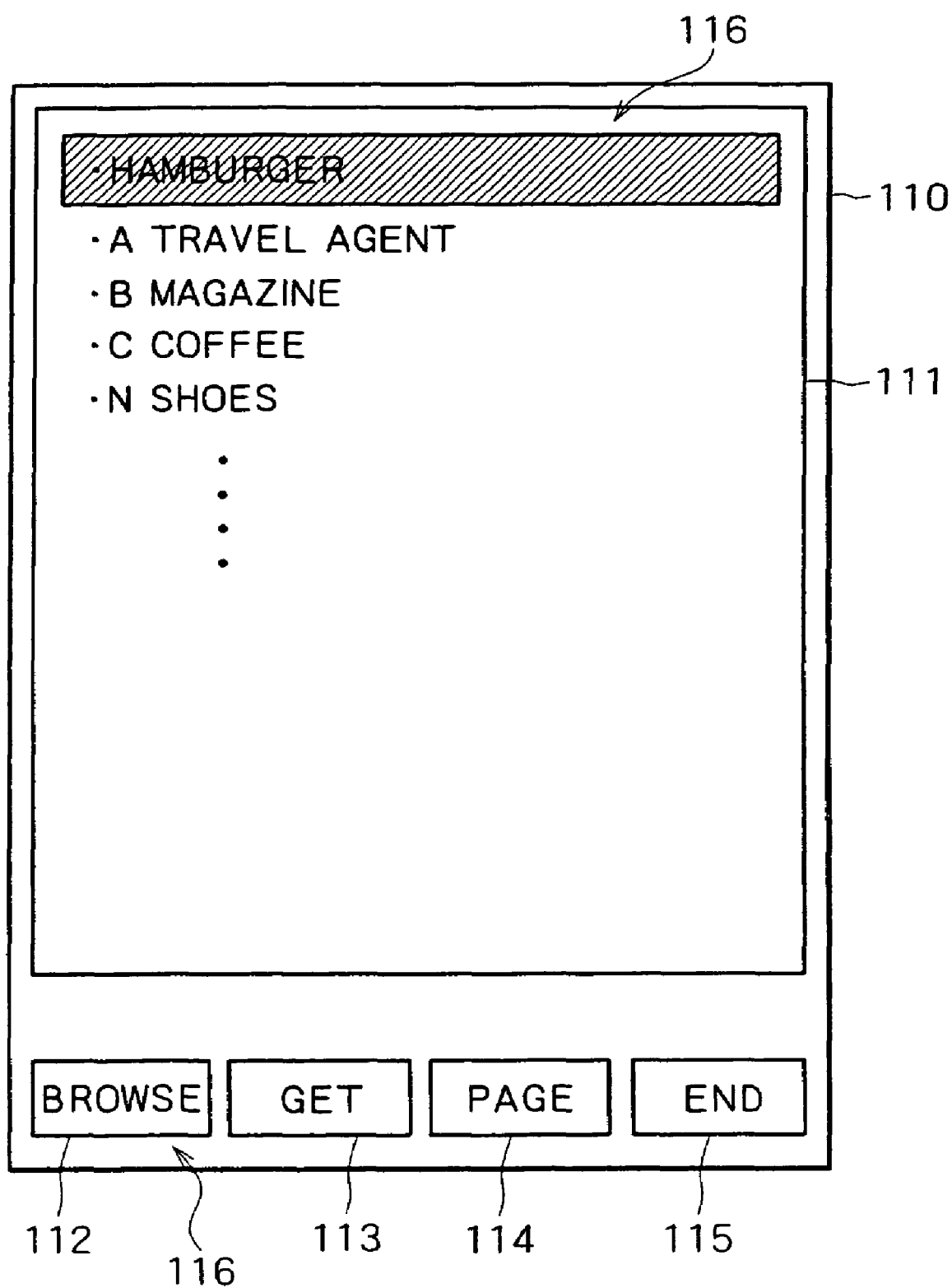
FIG. 34 is a schematic diagram illustrating a configuration of an advertisement data acquisition screen with a card acquiring web page displayed.

To be more specific, when the browse button 112 is selected by the user on the advertisement data acquisition screen 110, the main controller 90 downloads the card acquiring Web page from the data management server 2A and displays the downloaded Web page in the image display area 111 of the advertisement data acquisition screen 110 as shown in FIG. 34.

Figure 35:
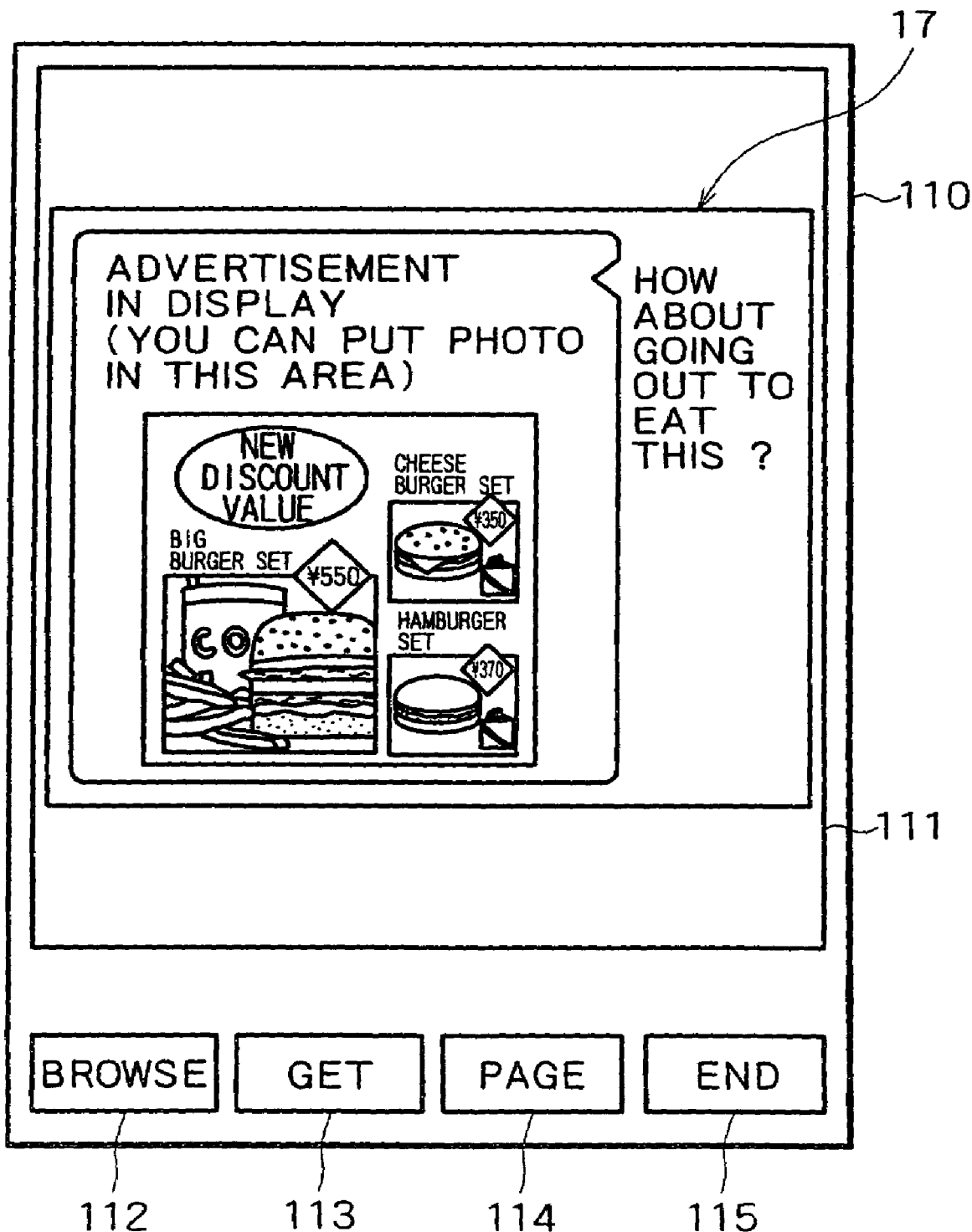
FIG. 35 is a schematic diagram illustrating a configuration of an advertisement data acquisition screen with an advertisement card image displayed.

Having displayed the card acquiring Web page in the image display area 111 of the advertisement data acquisition screen 110, the main controller 90 displays the cursor 116 over the get button 113, the page button 114, and the end button 115 and, further, each title of the card acquiring Web page in a sequentially moving manner in response to the rotation operation of the jog dial 81 by the user. When one of the titles is selectively specified by the user, the main controller 90 downloads the advertisement card data corresponding to the selected title from the data management server 2A as shown in FIG. 35 and displays the advertisement card image 17 based on the downloaded advertisement card data into the image display area 111 of the advertisement data acquisition screen 110 instead of the card acquiring Web page.

When, in this state, the get button 113 is operated by the user on the advertisement data acquisition screen 110, the main controller 90 records the advertisement card data of the advertisement card image 17 displayed in the image display area 111 of the advertisement data acquisition screen 110 into the Memory Stick 82. When the page button 114 is operated by the user, the main controller 90 displays the card acquiring Web page into the image display area 111 of the advertisement data acquisition screen 110 instead of the advertisement card image 17.

Then, when the end button 115 is operated by the user on the advertisement data acquisition screen 110, the main controller 90 closes the advertisement data acquisition screen 110 to end the acquisition of the advertisement card data, displaying the menu screen (not shown) for example on the liquid crystal display 77.

Thus, the main controller 90 allows the user to browse the card acquiring Web page by use of the advertisement data acquisition screen 110 and browse and acquire the desired advertisement card image 17 with ease.

Figure 36:
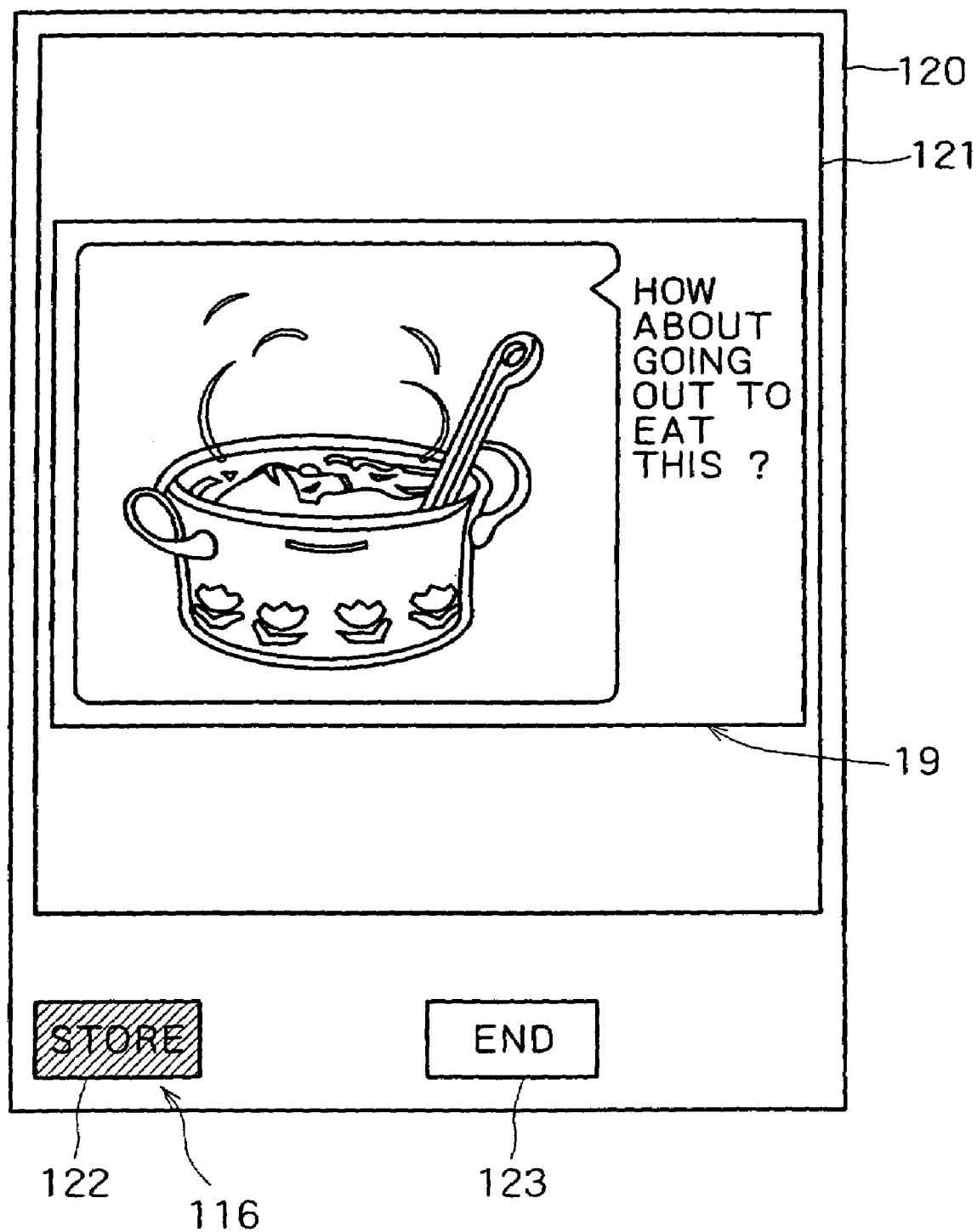
FIG. 36 is a schematic diagram illustrating a configuration of a message data acquisition screen.

When message card data have been acquired, the main controller 90 displays a message data acquisition screen 120 shown in FIG. 36 onto the liquid crystal display 77.

The message data acquisition screen 120 has an image display area 121 for displaying message card image 19 based on the message card data, a store button 122, and an end button 123. In response to the operation (rotation or pushing) of the jog dial 81, the main controller 90 displays the cursor 116 on the store button 122 and the end button 123 in a sequentially moving manner as with the advertisement data acquisition screen 110 described with reference to FIGS. 33 through 35, letting the user select one of these buttons.

Then, when the store button 122 is operated by the user on the message data acquisition screen 120, the main controller 90 records the message card data of the message card image 19 displayed in the image display area 121 of the message data acquisition screen 120 into the Memory Stick 82. When the end button is operated by the user, the main controller 90 ends the message card data acquisition processing, displaying the menu screen (not shown) for example on the liquid crystal display 77.

Figure 37:
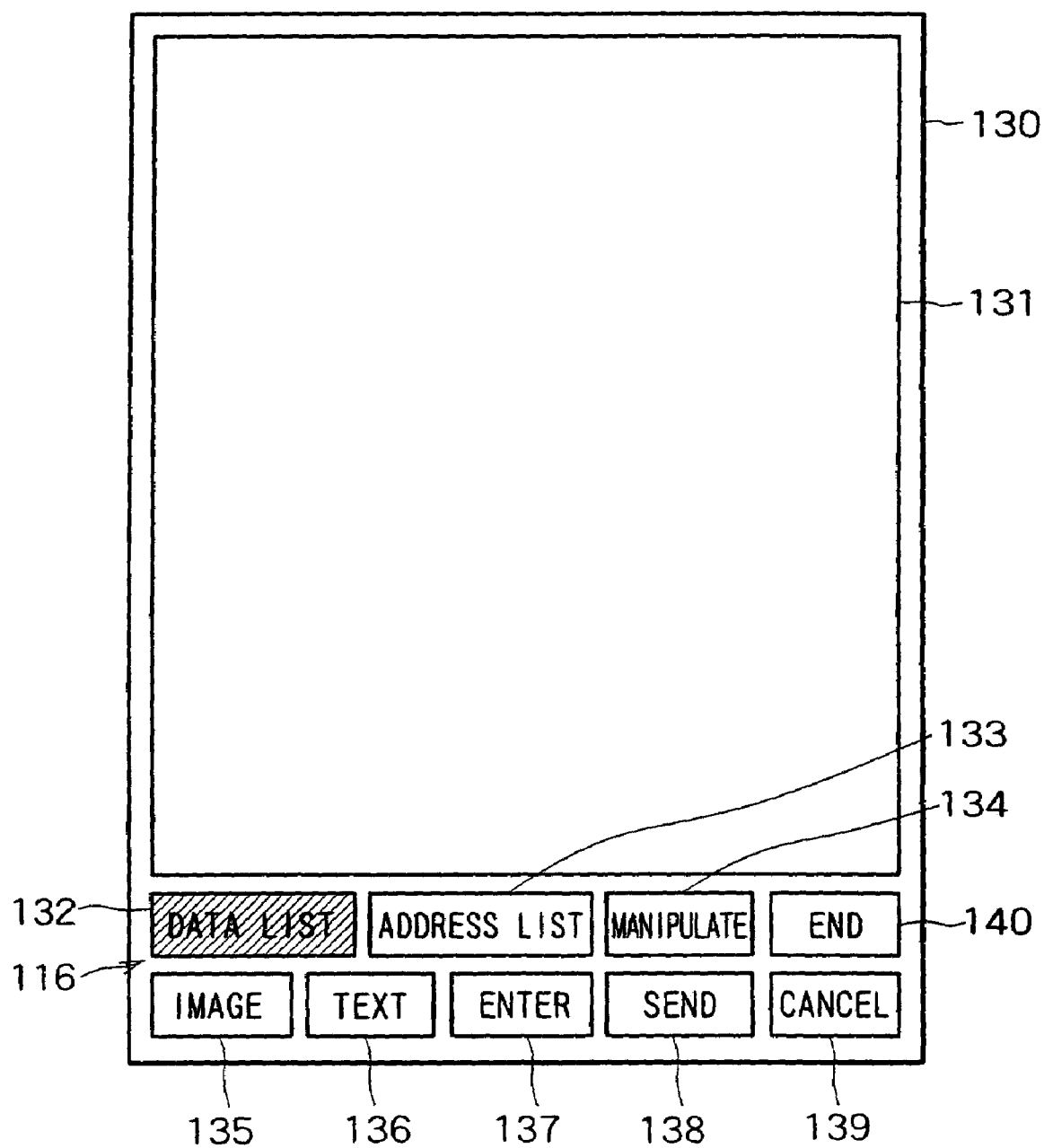
FIG. 37 is a schematic diagram illustrating a configuration of a card manipulation screen.

On the other hand, when manipulating advertisement card data for message transmission, the main controller 90 displays a card manipulation screen 130 shown in FIG. 37 selected from a predetermined menu screen onto the liquid crystal display 77.

The card manipulation screen 130 has an image display area 131, a data list button 132, an address list button 133, a manipulate button 134, an image select button 135, a text select button 136, an enter button 137, a send button 138, a cancel button 139, and an end button 140.

In this case, in response to the operation (rotation or pushing) of the jog dial 81 by the user, the main controller 90 displays the cursor 116 over the data list button 132, the address list button 133, the manipulate button 134, the image select button 135, the text select button 136, the enter button 137, the send button 138, the cancel button 139, and the end button 140 in a sequentially moving manner as with the advertisement data acquisition screen 110 described with reference to FIGS. 33 through 35, letting the user select required buttons.

Figure 38:
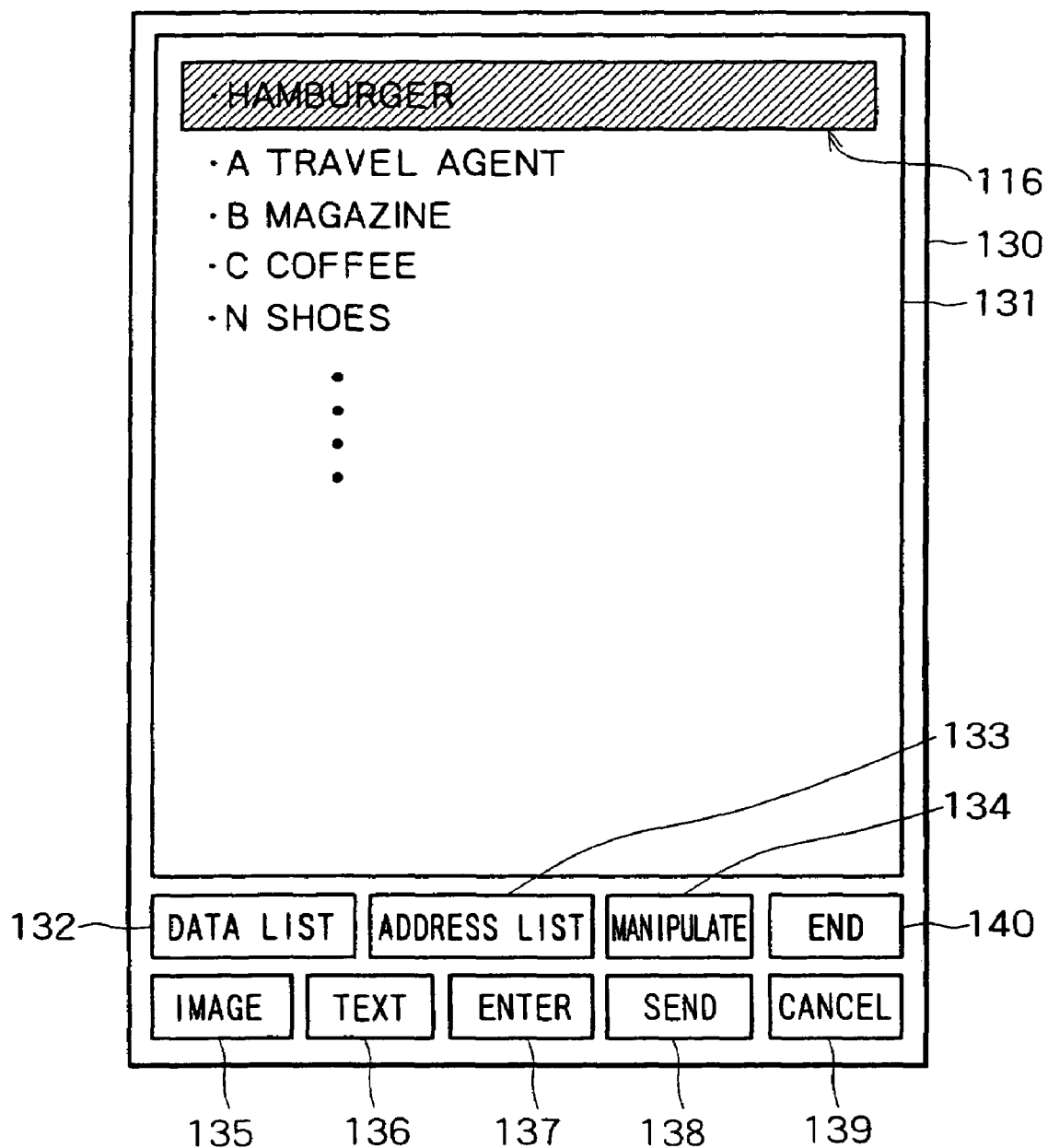
FIG. 38 is a schematic diagram illustrating a configuration of a card manipulation screen with a card data list displayed.

When the data list button 132 is operated by the user on the card manipulation screen 130, the main controller 90 reads the card data list from the Memory Stick 82 as shown in FIG. 38 and displays the retrieved card data list into the image display area 131 of the card manipulation screen 130.

When the card data list has been displayed in the image display area 131 of the card manipulation screen 130, the main controller 90 can let the user select desired one of the titles in the card data list by moving the cursor 116 as with the advertisement data acquisition screen 110 described with reference to FIG. 34. When one of the titles has been selected, the main controller 90 reads the advertisement card data or message card data corresponding to the selected title from the Memory Stick 82 and sends the retrieved advertisement card data or message card data to the liquid crystal display 77 to display the advertisement card image 17 or the message card image 19 in the image display area 131 of the card manipulation screen 130 instead of the card data list.

Figure 39:
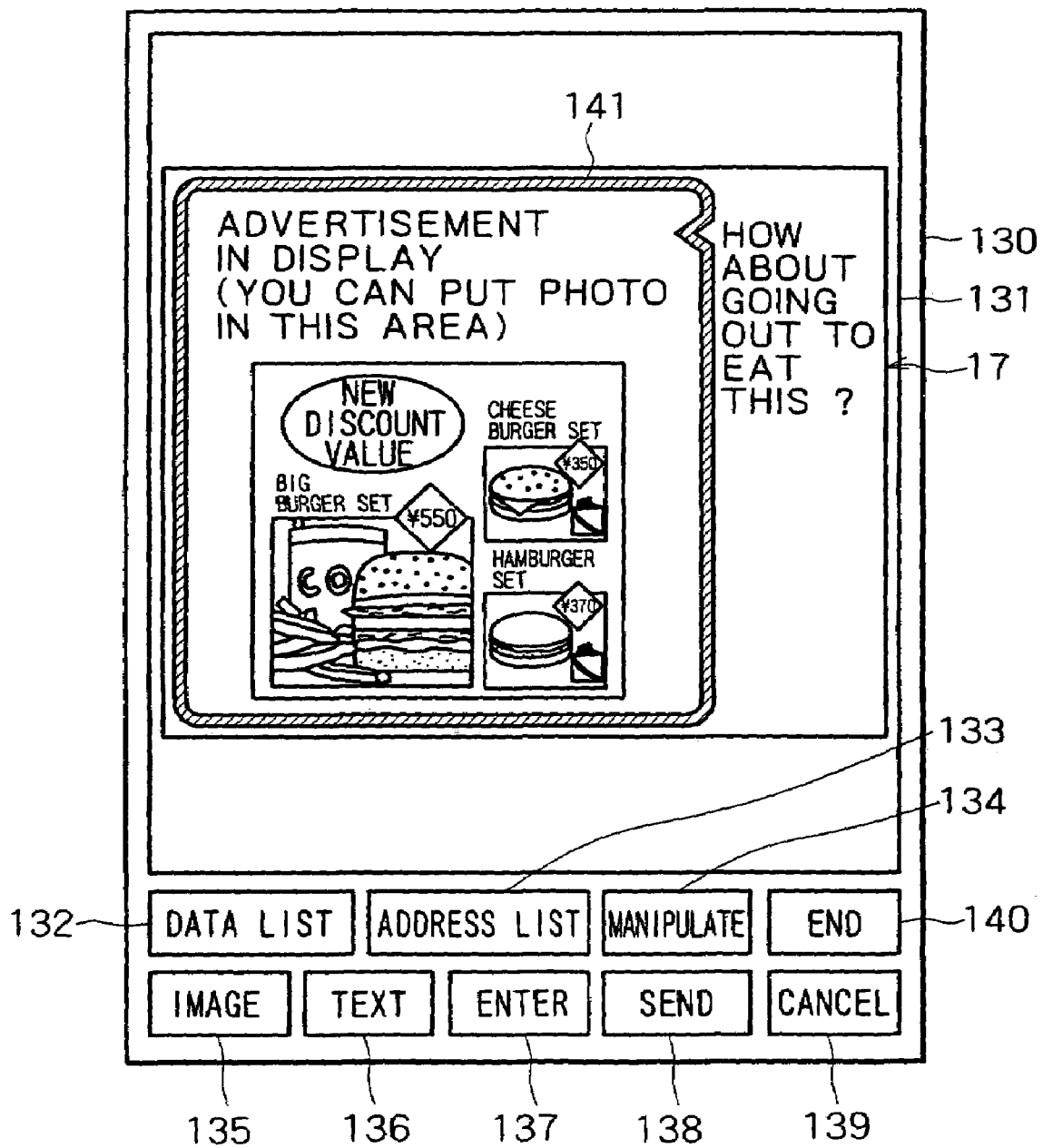
FIG. 39 is a schematic diagram illustrating a configuration of a card manipulation screen with a manipulable advertisement image framed.
Figure 40:
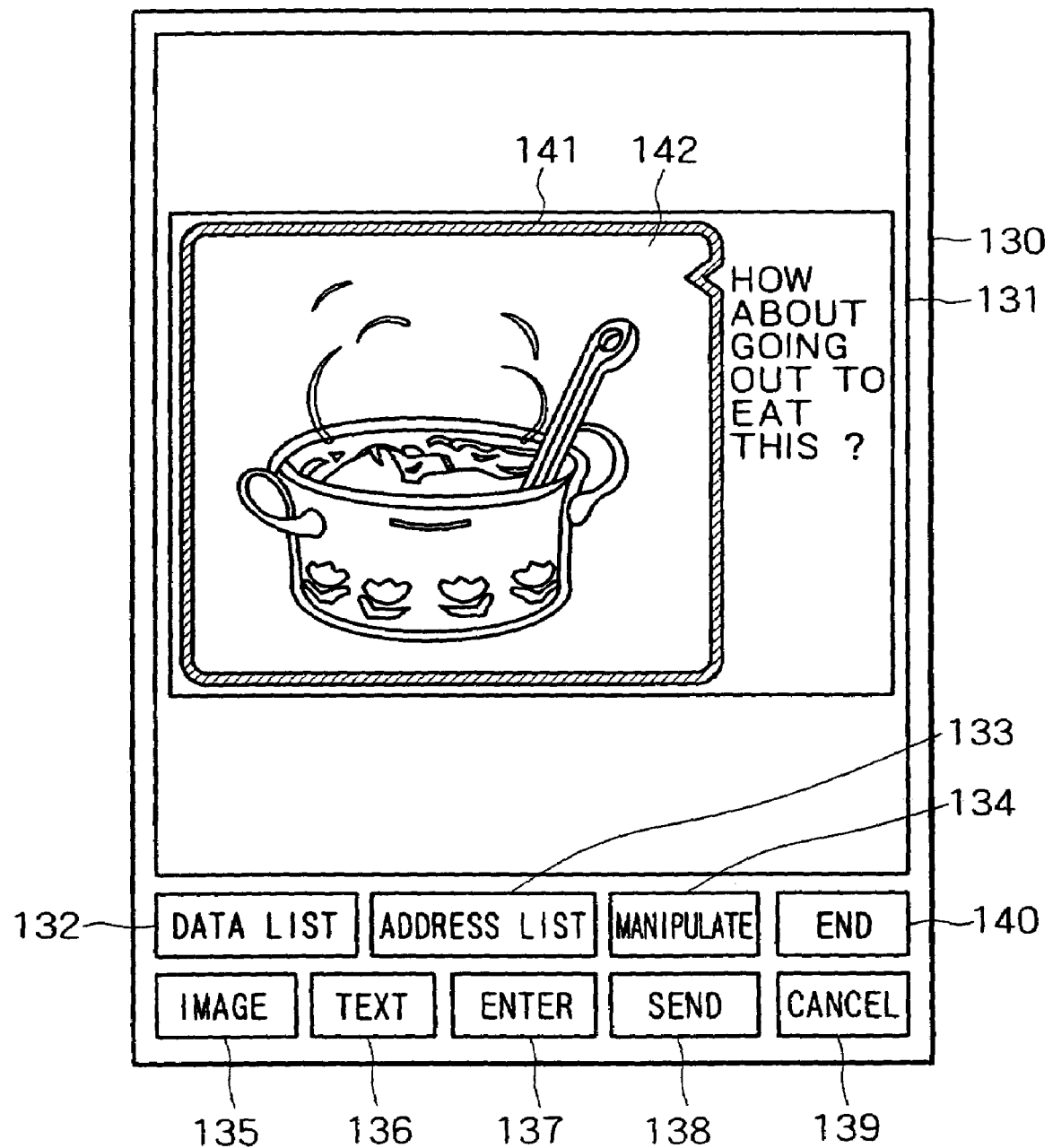
FIG. 40 is a schematic diagram illustrating a configuration of a card manipulation screen with a captured image superimposed on an advertisement image.

For example, when the manipulate button 134 is operated by the user on the card manipulation screen 130, with the advertisement card image 17 displayed in the image display area 131 of the card manipulation screen 130, the main controller 90 visually presents a manipulative portion to the user by enclosing the advertisement image 15 with a frame 141 which can be inlaid with the message image 18 as superimposed on the advertisement card image 17 as shown in FIG. 39 on the basis of the template flag stored in the data portion 26 of the advertisement card data.

If there are two or more advertisement images 15 in which the message image 18 can be inlaid as superimposed inside the advertisement card image 17, the main controller 90, in response to the rotary operation of the jog dial 81 by the user, sequentially moves the frame 141 to sequentially enclose the advertisement images 15 with the frame and, at the same time, when the jog dial 81 is pushed by the user with any of the advertisement images enclosed with the frame, determines the enclosed advertisement image 15 as a portion in which the message image 18 is inlaid.

When the manipulate button 134 is operated by the user on the card manipulation screen 130 with the message card image 19 displayed in the image display area 131 of the card manipulation screen 130, the main controller 90 detaches the message image 18 from the message card image 19 to display the advertisement image 15 so far hidden behind. In this state, the main controller 90 encloses the advertisement image 15 with the frame 141 as described with reference to FIG. 39.

When the advertisement image 15 in which the message image 18 is inlaid as superimposed thereon has been determined and then the image select button 135 is operated by the user on the card manipulation screen 130, the main controller 90 displays the captured image 142 (a moving image) obtained by the CCD camera 74 inlaid in the advertisement image 15 selected for manipulation as superimposed thereon. Then, when the enter button 137 is operated on the card manipulation screen 130, the main controller 90 stops the captured image 14 upon the operation of the enter button, thereby determining the captured image as the still image for the message image 18.

If the text select button 136 is operated by the user on the card manipulation screen 130, the main controller 90 sequentially displays the characters according to the text data inputted from the operator keys 78 by inlaying them into the advertisement image 15 selected for manipulation as superimposed thereon. Then, when the enter button 137 is operated by the user on the card manipulation screen 130, the main controller 90 determines as the message image 18 a text image composed of the character string (text) displayed inlaid in the advertisement image 15 as superimposed thereon.

If, when the message image 18 entered inside the advertisement card image 17 is displayed as described above, the cancel button 139 is operated by the user on the card manipulation screen 130 with this message image 18 enclosed with the frame 141, the main controller 90 detaches this message image 18 to expose the advertisement image 15 so far hidden behind.

Figure 41:
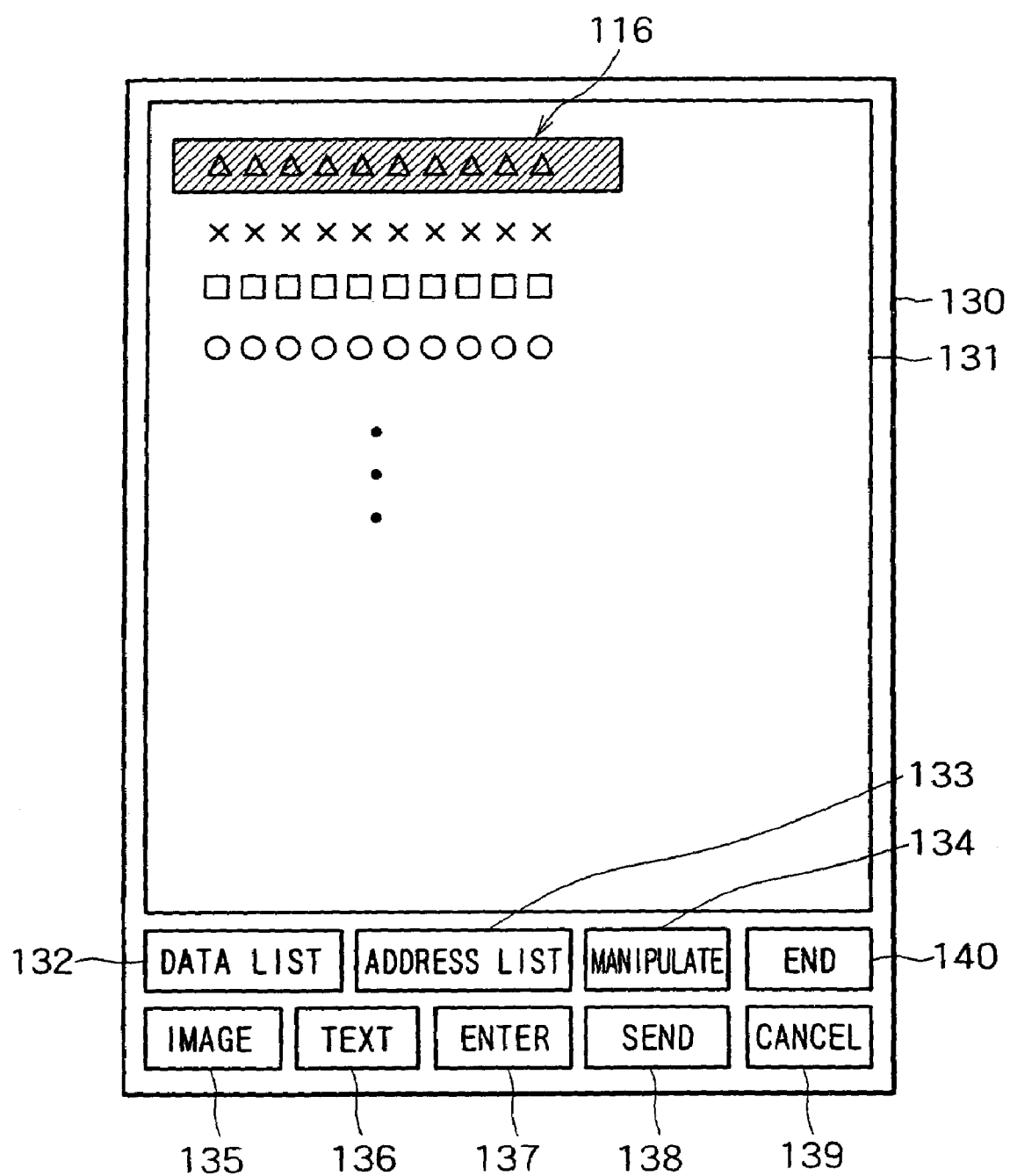
FIG. 41 is a schematic diagram illustrating a configuration of a card manipulation screen with a mail address list displayed.

If the address list button 133 is operated by the user on the card manipulation screen 130 after generating the message card image 19 by displaying the message image 18 inside the advertisement card image 17 on the card manipulation screen 130 as described above, the main controller 90 generates the data reduced message card data on the basis of the message card image 19 on the card manipulation screen 130 and, at the same time, reads the mail address list from the Memory Stick 82 to display the retrieved mail address list into the image display area 131 of the card manipulation screen 130 instead of the message card image 19 as shown in FIG. 41.

When the mail address list has been displayed in the image display area 131 of the card manipulation screen 130, the main controller 90 lets the user move the cursor 116 to a desired mail address in the mail address list as with the advertisement data acquisition screen 110 described with reference to FIG. 34 to select the desired mail address. When the desired mail address has been selected, the main controller 90 stores the selected mail address into the header portion 25 of the data reduced message card data from which this mail address was generated.

Then, when the send button 138 is operated by the user on the card manipulation screen 130, the main controller 90 sends the generated data reduced message card data to the send/receive management server 2B.

After the selection of the mail address (before the send button 138 is operated), if the cancel button 139 is operated by the user on the card manipulation screen 130, the main controller 90 takes the selected mail address out of the data reduced message card data, letting the user select another mail address.

When the end button 140 is operated by the user on the card manipulation screen 130, the main controller 90 closes the card manipulation screen 130 to end the card data manipulation processing, displaying a menu screen (not shown) for example on the liquid crystal display 77.

Thus, the main controller 90 facilitates the generation of the message card image 19 from the advertisement image 15 by use of the card manipulation screen 130 and, at the same time, facilitates the transmission of the data reduced message card data of the generated message card image 19 to the send/receive management server 2B.

(2-5) Link Processing by Card Data

The advertisement card data to be distributed by the data providing system 1 include linkable advertisement card data which, while advertising products between the data management server and the camera-mounted digital mobile phones 10 and 11 or at least between two camera-mounted digital mobile phones 10 and 11, reflect on their images the results of responses to inquiries based on a link processing program used as material data.

The following describes these linkable advertisement card data as message card data which are used for message transmission.

Figure 42A:
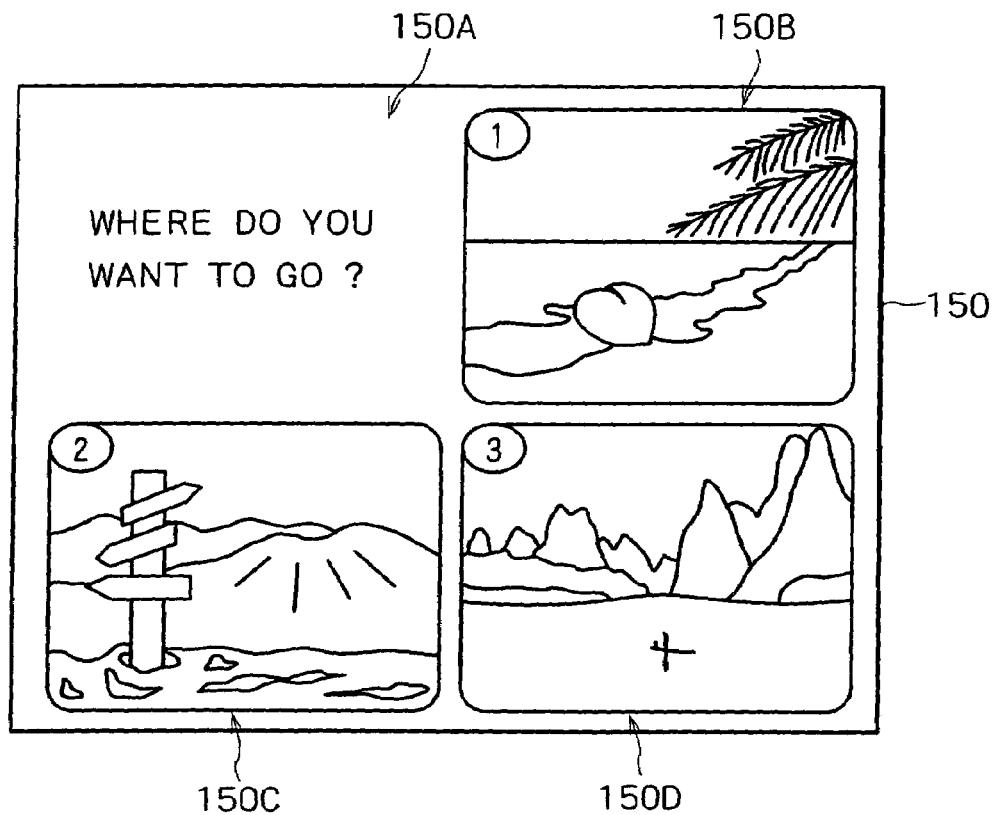
FIGS. 42A and 42B are schematic diagrams illustrating a configuration of a linkable message card image.
Figure 42B:
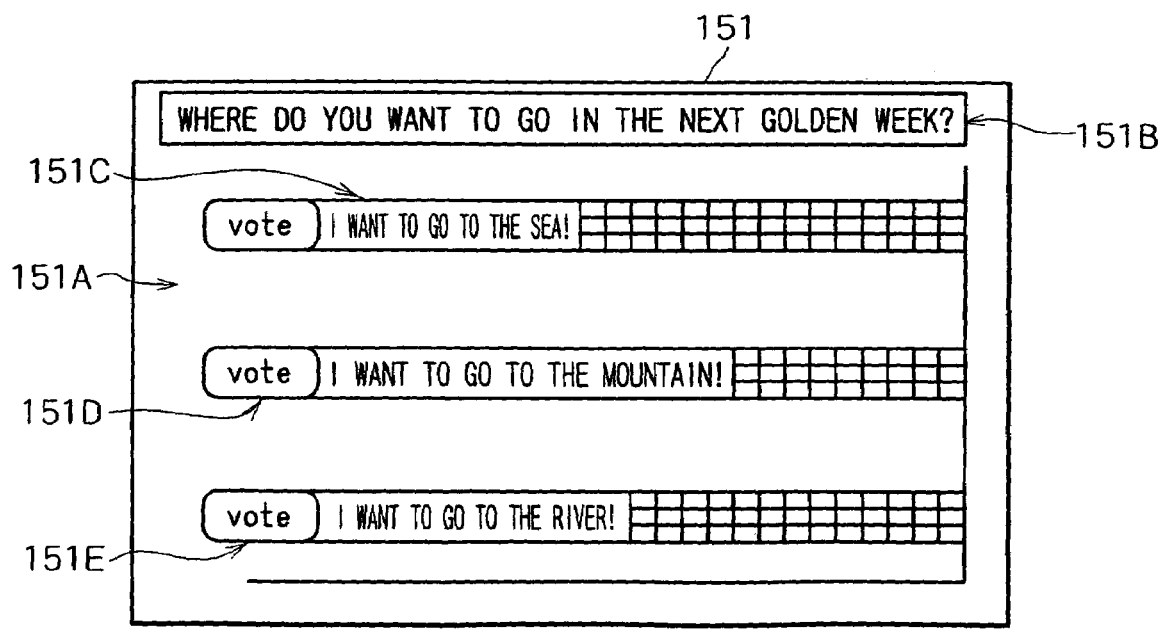

For example, the above-mentioned message card data are composed of two card-shaped message card images 150 and 151 as shown in FIGS. 42A and 42B.

In this example, the message card image 150 (FIG. 42A) is for asking a question. To be more specific, three scenic images 150B through 150D are inlaid in a template image 150A which is a background image displaying a question "Where do you want to go?"

In the question message card image 150, the scenic images 150B through 150D are inlaid as superimposed upon the advertisement images (not shown) for travel spots presented by an advertiser.

The message card image 151 displays a reply to the question presented by the question message card image 150. In the message card image 151, a template image 151A providing a background image is inlaid with a message text image 151B such as "Where do you want to go in the next golden week?" for example created by the message sender displaying a question in a character string corresponding to the scenic images 150B through 150D of the question message card image 150 and three bar graphs 151C through 151E presenting the results of the reply to the question.

In the message card image 151 for displaying the results of reply to question (hereafter referred to as a reply result message card image), the text image 151B and the bar graph images 151C through 151E are inlaid as superimposed upon an advertisement image (not shown) formed by the text image having a phrase (a character string) for product advertisement presented by an advertiser and an advertisement image (not shown) representing in bar graphs the results of reply to the question presented by this advertiser.

Actually, the main controller 90 of each of the camera-mounted digital mobile phones 10 and 11 of the message sender generates the above-mentioned message card data from the original advertisement card data in accordance with the manipulation processing procedure RT9 described with reference to FIGS. 31 and 32, stores two or more message recipient mail addresses for example into the header portion 25 of the generated message card data, and sends these message card data to the send/receive management server 2B via the Internet 3.

As a result, when the message card data have been transmitted to the camera-mounted digital mobile phone 10 or 11 of the message recipient from the send/receive management server 2B via the Internet 3, the main controller 90 displays the question message card image 150 and the reply result message card image 151 described with reference to FIGS. 42A and 42B onto the liquid crystal display 77.

In this case, the message card data contain a link processing program 155 defined by a predetermined makeup language having first and second image display subprograms 155A and 155B and a reply processing subprogram 155C.

In each of the camera-mounted digital mobile phones 10 and 11 of message recipients, the main controller 90 displays the scenic images 150B through 150D in the question message card image 150 in accordance with the first image display subprogram 155A of the link processing program as described with reference to FIG. 42A and the bar graph images 151C through 151E in the reply result message card image 151 in accordance with the second image display subprogram 155B as described with reference to FIG. 42B.

When the question reply processing is started by the user for the message card data, the main controller 90, in response to the rotary operation of the jog dial, sequentially moves the frame 141 on the scenic images 150B through 150D on the question message card image 150 as described with reference to FIG. 39.

When one of the scenic images 150B through 150D enclosed with the frame 141 is selected by pressing the jog dial by the user on the question message card image 150, the main controller 90 jumps from the first image display subprogram 155A to the reply processing subprogram 155C.

The reply processing subprogram 155C has the mail addresses of other message recipients and message senders who hold this message card data. In accordance with the reply processing subprogram 155C, the main controller 90 generates question reply data by adding the selection result information indicative of the selected one of the scenic images 150B through 150D and the template ID (or advertisement ID) captured in the link processing program 155 to the mail addresses of other message recipients and message senders and sends the generated question reply data to the camera-mounted digital mobile phones 10 and 11 corresponding to other message recipients and message senders.

The main controller 90 executing the question reply processing on the message card data extends, by one unit, the bar graphs 151C through 151E corresponding to the selected one of the scenic images 150B through 150D and displays the extended bar graphs.

On the other hand, the main controller 90 of the camera-mounted digital mobile phone 10 or 11 which has received the question reply data searches for the corresponding message card data by use of the template ID (or advertisement ID) in the question reply data.

Then, if the corresponding message card data are stored in the Memory Stick 82 for example, the main controller 90 reads the message card data from this Memory Stick 82 into the RAM through the recording/reproducing section 98. In accordance with the reply processing subprogram 155C of the link processing program 155 stored in the data portion 26 of the message card data, the main controller 90 extends, by one unit, the bar graphs 151C through 151E corresponding to the selection result information in the question reply data to link the reply result message card image 151 with the reply result message card image 151 held by the message recipient who has replied to the question.

Thus, having extended the bar graphs 151C through 151E, the main controller 90 records the resultant message card data into the Memory Stick 82 through the recording/reproducing section 98.

Then, by executing the reply processing for the question, the main controller 90 of each of the camera-mounted digital mobile phones 10 and 11 which hold the message card data let the owners (the message sender and many message recipients) of these digital mobile phones share the reply result in approximately real time.

Therefore, when the message card data are subsequently read by the user from the Memory Stick 82 through the recording/reproducing section 98, the main controller 90 displays the question message card image 150 on the liquid crystal display 77 on the basis of the retrieved message card data and, at the same time, displays the reply result message card image 151 with the bar graphs 151C through 151E extended by one unit. Consequently, the main controller 90 can present the updated reply result message card image 151 as with the other message recipients and message sender holding these message card data.

If, upon reception of question reply data, the main controller 90 is displaying on the liquid crystal display 77 the question message card 150 and the reply result message card image 151 based on the corresponding message card data, the main controller 90 extends the bar graphs 151C through 151E by one unit corresponding to the selection result information in the question reply data on the displayed reply result message card image 151 in accordance with the reply processing subprogram 155C of the link processing program 155 stored in the data portion 26 of these message card data, displaying the resultant bar graphs.

Thus, the camera-mounted digital mobile phones 10 and 11, by use of linkable advertisement card data for message transmission, can easily generate and send the message card data of which question contents are accurately understandable to the message recipients by use of a user's own question image.

Also, the camera-mounted digital mobile phones 10 and 11 can easily get the replies without having message recipients generate the data for replies to questions or make telephone calls with respect to questions for example.

Once advertisement card data are generated by use of the linking capability described above, the data providing system 1 can provide not only the questions and replies of the questionnaire type described above with reference to FIGS. 42A, 42B and 43 for example, but also the advertisement card data letting users return text image data such as comments to questions and the advertisement card data letting users return attendance to a party for example as message card data.

In addition, by inputting parameters which can be selected arbitrarily by the user in generating message card data from advertisement card data, the partial use of the link processing program described with reference to FIG. 43 allows the data providing system 1 also to provide the advertisement card data and so on having graphs which are updated in accordance with these parameters inside a message card image based on the generated message card data.

(2-6) Operations and Effects of the Present Embodiment

In the above-described configuration, according to the data providing system 1, the data providing apparatus 2 provides, to each of the camera-mounted digital mobile phones 10 and 11, the advertisement card data for the advertisement card image 17 generated by inlaying the advertisement image 15 into the template image 16 by associating with this advertisement image 15 and the template image 16 in which the message image 18 can be inlaid as superimposed upon the advertisement image 15.

If the advertisement card data preferred by the user is used for message transmission, the camera-mounted digital mobile phone 10 or 11 displays the advertisement card image 17 based on these advertisement card data onto the liquid crystal display 77 for presentation to the user and then generates the message card data by inlaying the message image 17 formed by still image and/or text image into the template image 16 in the advertisement card image 17 as superimposed upon the advertisement image, sending the generated message card data to the recipient.

Therefore, the data providing system 1 can let the users of the camera-mounted digital mobile phones 10 and 11 browse the advertisement image 15 in the advertisement card image 17 and then provide the service of allowing the users to use these advertisement card data for message transmission.

As described, because the data providing system 1 provides the advertisement card data to be used for message transmission, use of these advertisement card data facilitates the generation of the message card data which can accurately transmit the contents of messages as intended by the user by means of texts and still images for example along with the template image 16.

Hence, as compared with the simple provision of advertisement images to users, the data providing system 1 enhances the desire of the user to acquire advertisement card data, thereby more effectively advertising products.

In addition, the data providing system 1 facilitates the use of advertisement card data by displaying the attribute information clearly indicative of a manipulative advertisement image inside the advertisement card image 17, further enhancing the desire of the user to acquire advertisement card data.

According to the above-mentioned configuration, the data providing apparatus 2 provides to the camera-mounted digital mobile phones 10 and 11 the advertisement card data generated by associating the template image 16 in which the message image 18 can be inlaid as superimposed upon the advertisement image 15 with this advertisement image 15. The camera-mounted digital mobile phones 10 and 11 display the advertisement card image 17 based on the advertisement card data onto the liquid crystal display 77 for presentation to the users and then generate the message card data by use of these advertisement card data to provide a service of letting only those users who have browsed the advertisement image 15 use the advertisement card data for message transmission, thereby realizing a data providing system capable of accurately providing services.

(3) Other Embodiments

In the above-mentioned embodiment, the advertisement card data generated from the advertisement image data and template image data which are preset with a predetermined provision period of time are provided to users. Alternatively, the card data not preset with a predetermined provision period of time or the card data preset with reuse date or a usage count may be provided to users.

In the above-mentioned embodiment, the original advertisement card data are stored in the camera-mounted digital mobile phone 10 or 11 which has transmitted message card data. Alternatively, the original advertisement card data may be deleted from the camera-mounted digital mobile phone 10 or 11. In this case, the number of times the user wanting to use advertisement card data for message transmission acquires the advertisement card data from the data providing apparatus 2 can be increased, thereby increasing the opportunities for product advertisement.

In the above-mentioned embodiment, when message card data are transferred by the send/receive management server 2B, the fee-charge processing for the transfer of message card is executed by the fee-charge processing server 2C. Alternatively, the fee-charge processing by the fee-charge processing server 2C for the transfer of message card data may be executed on a periodical basis (for example, at the end of every month).

In the above-mentioned embodiment, the advertisement image data of the original advertisement card data are updated at the transfer of message card data in accordance with the period of providing new limited-time-offer products. Alternatively, the advertisement image data of the original advertisement card data may be updated at the time of transfer to advertisement image data having various kinds of contents in accordance with the transmission date and location (namely, the nearby base station 7 or 8 of the camera-mounted digital mobile phone 10 or 11 which has transmitted message card data).

In the above-mentioned embodiment, the data management server 2A provides advertisement card data to users. Alternatively, although the data management server 2A issues a template ID and an advertisement ID to template image data and advertisement image data respectively for associating them, the advertisement card data may be provided from the server of the advertiser to users.

In the above-mentioned embodiment, data reduced message card data are transmitted from the camera-mounted digital mobile phone 10 or 11 of the message sender to the send/receive management server 2B. Alternatively, if it can be confirmed that the camera-mounted digital mobile phone 10 or 11 of the message recipient stores the advertisement card data on the basis of which the data reduced message card data are generated, the data reduced message card data may be transmitted from the camera-mounted digital mobile phone 10 or 11 of the message sender to the camera-mounted digital mobile phone 10 or 11 of the message recipient through the send/receive management server 2B to match the advertisement card data with the data reduced message card data at the camera-mounted digital mobile phone 10 or 11 of the message recipient, thereby generating message card data.

In the above-mentioned embodiment, message card data are generated by inlaying a still image captured by the CCD camera 74 as the message image 18 into the template image 16 of the advertisement card image 17 as superimposed upon the advertisement image 15 in the camera-mounted digital mobile phone 10 or 11. Alternatively, a predetermined image stored in the Memory Stick 82 in advance may be used as a message image in the camera-mounted digital mobile phone 10 or 11 and this message image may be inlaid into the template image 16 of the advertisement card image 17 as superimposed upon the advertisement image 15, thereby generating message card data.

In the above-mentioned embodiment, the data management controller 30 of the data management server 2A is applied as provision image data generating means for generating the provision image data for a reusable provision image by inlaying a predetermined advertisement image into a template image in which a predetermined user image can be inlaid as superimposed upon the predetermined advertisement image. Alternatively, various other provision image data generating means may be applied such as microcomputers as long as provision image data for a reusable provision image can be generated by inlaying a predetermined advertisement image into a template image in which a predetermined user image can be inlaid as superimposed upon the predetermined advertisement image.

In the above-mentioned embodiment, the advertisement card data for an advertisement card image are applied as the provision image data for a provision image which is reusable by inlaying a predetermined advertisement image into a template image in which a predetermined user image can be inlaid as superimposed upon the predetermined advertisement image. Alternatively, the provision image data for other various kinds of provision images can be applied, such as the card data generated by inlaying images of photographs and predetermined content into a predetermined template image instead of advertisement images, as long as these provision image data can be distributed on networks by generating them reusable by inlaying a predetermined advertisement image into a template image in which a predetermined user image can be inlaid as superimposed upon the predetermined advertisement image.

In the above-mentioned embodiment, the network interface 35 of the data management server 2A is applied for the provision side transmitting means for transmitting provision image data over a network. Alternatively, if the provision image data can be transmitted over a network, other various kinds of provision side transmitting means may be applied such as send/receive circuits and antennas corresponding to the type of a network used.

In the above-mentioned embodiment, the antenna 73 and the send/receive circuit 103 of each of the camera-mounted digital mobile phones 10 and 11 are applied to the acquiring-side receiving means for receiving the provision image data transmitted from the data providing apparatus via a network. Alternatively, various other kinds of acquiring-side receiving means may be widely applied such as network interfaces corresponding to networks used as long as other acquiring-side receiving means can receive the provision image data from the data providing apparatus over a network.

In the above-mentioned embodiment, the main controller 90 of each of the camera-mounted digital mobile phones 10 and 11 is applied as transmission image data generating means which displays the provision image based on provision image data onto predetermined display means, and inlays a user image into the template image of this provision image as superimposed upon an advertisement image to generate the transmission image data of a transmission image which display the user image along with the template image in preference to this advertisement image until this user image is detached. Alternatively, various other kinds of transmission image data generating means may be widely applied as long as they display the provision image based on provision image data onto predetermined display means and inlay a user image into the template image of this provision image as superimposed upon an advertisement image to generate the transmission image data of a transmission image which display the user image along with the template image in preference to this advertisement image until this user image is detached from the template image.

In the above-mentioned embodiment, the send/receive circuit 103 of each of the camera-mounted digital mobile phones 10 and 11 is applied as acquiring-side transmitting means for transmitting transmission image data to predetermined destinations via a network. Alternatively, various other acquiring-side transmitting means may be widely applied such as a network interface and so on as long as they can transmit transmission image data to predetermined destinations.

In the above-mentioned embodiment, the data providing system according to the present invention is applied to the data providing system described with reference to FIG. 2. Alternatively, data providing systems of various other configurations may be widely applied such as transferring data with the data providing apparatus 2 by advertisers, design companies, individuals who create template image data, or settlement institutions in postal mail for example.

In the above-mentioned embodiment, the data providing apparatus according to the present invention is applied to the data providing system in which the data management server 2A, the send/receive management server 2B, and the fee-charge processing server 2C are interconnected through the IEEE 1394 cable 56 described with reference to FIGS. 2 and 14 through 25. Alternatively, data providing system of various other configurations may be widely applied such as those in which the data management server 2A, the send/receive management server 2B, and the fee-charge processing server 2C are unitized or interconnected via the Internet for example.

In the above-mentioned embodiment, the data acquisition apparatus and the data receiving apparatus according to the present invention are applied to the camera-mounted digital mobile phones 10 and 11 described with reference to FIGS. 26 through 41. Alternatively, data acquisition apparatuses of various other configurations may be widely applied such as personal computers and PDAs (Personal Digital Assistants) as long as they can acquire data from the data providing apparatus.

In the above-mentioned embodiment, the data management controller 30 of the data management server 2A registers, provides, and updates advertisement card data on the basis of the data registration program, the data providing program, and the data update program stored in the hard disk of the hard disk drive 33. Alternatively, these above-mentioned series of processing operations may be executing by installing these programs from a program storage medium loaded in the data management server 2A.

In the above-mentioned embodiment, the main controller 90 of each of the camera-mounted digital mobile phones 10 and 11 acquires advertisement cards and message card data and manipulates the card data on the basis of the advertisement card data acquisition processing program, the message card data acquisition processing, and the card data manipulation processing program stored in the ROM. Alternatively, these series of processing operations may be executed by these programs installed from a program storage medium loaded into each of the camera-mounted digital mobile phones 10 and 11.

The program storage media for installing the data registration program, the data providing program, and the data update program for executing the above-mentioned series of processing operations into the data management server 2A to make these programs ready for operation and the program storage media for installing the advertisement card data acquisition processing program, the message card data acquisition processing program, and the card data manipulation processing program into each of the camera-mounted digital mobile phones 10 and 11 to make these programs ready for operation are not only package media such as a floppy disk, CD-ROM (Compact Disc Ready Only Memory), DVD (Digital Video Disc), but also a semiconductor memory, magnetic disk and so on in which the programs are stored temporarily or permanently. The storing means for storing these programs into these program storage media may be wired or wireless media such as local area networks, the Internet, and digital satellite broadcasting or various communication interfaces based on a router or a modem.

While a preferred embodiment of the present invention has been described using specific terms, such description is for illustrative purposes only, and it is to be understood that changes and variations may be made without departing from the spirit or scope of the following claims.

What is claimed is:

1. A data providing system, comprising:
   a data providing apparatus, including:
      provision image data generating means for generating provision image data of a provision image that is reusable by inlaying a predetermined advertisement image into a predetermined template image into which a predetermined user image can be inlaid as superimposed upon said predetermined advertisement image, and
      providing-side transmitting means for transmitting said provision image data via a network; and
   a data acquisition apparatus, including:
      acquiring-side receiving means for receiving said provision image data from said data providing apparatus via said network,
      transmission image data generating means for generating transmission image data of a transmission image for displaying said provision image based on said provision image data onto predetermined display means, inlaying said predetermined user image as superimposed upon said predetermined advertisement image into said template image of said provision image, and displaying said predetermined user image together with said template image in preference to said predetermined advertisement image until said predetermined user image is detached from said template image, and
      acquiring-side transmitting means for transmitting said transmission image data to a predetermined destination via said network.

2. The data providing system according to claim 1, wherein said acquiring-side receiving means of said data acquisition apparatus receives said transmission image data from another device and said transmission image data generating means of said data acquisition apparatus generates new transmission image data of a new transmission image for displaying said transmission image based on said transmission image data onto said display means, displaying said provision image after detaching said user image from said transmission image, inlaying a new user image into said template image of said provision image as superimposed upon said advertisement image, and displaying said new user image along with said template image in preference to said advertisement image until said new user image is detatched from said template image.

3. A data acquisition apparatus, comprising:
   acquiring-side receiving means for receiving provision image data of a provision image in which a predetermined advertisement image is inlaid into a template image into which a predetermined user image can be inlaid as superimposed upon said predetermined advertisement image, said provision image data being received from a predetermined data providing apparatus via a network;
   transmission image data generating means for generating transmission image data of a transmission image for displaying said provision image based on said provision image data onto predetermined display means, inlaying said predetermined user image as superimposed upon said predetermined advertisement image into said template image of said provision image, and displaying said predetermined user image together with said template image in preference to said predetermined advertisement image until said predetermined user image is detached from said template image; and
   acquiring-side transmitting means for transmitting said transmission image data to a predetermined destination via said network,
   wherein said acquiring-side receiving means receives said transmission image data from another device and said transmission image data generating means of said data acquisition apparatus generates new transmission image data of a new transmission image for displaying said transmission image based on said transmission image data onto said display means, detaches said predetermined user image from said transmission image to display said provision image, inlaying said new user image as superimposed upon said predetermined advertisement image into said template image of said provision image, and displaying a new user image together with said template image in preference to said predetermined advertisement image until said new user image is detached from said template image.

4. The data acquisition apparatus according to claim 3 wherein said acquiring-side receiving means receives, from said data providing apparatus via said network, said provision image data in which attribute information for indicating said predetermined advertisement image is displayed inside said provision image.

5. A data acquisition method, comprising:
   receiving provision image data of a provision image in which a predetermined advertisement image is inlaid into a template image into which a predetermined user image can be inlaid as superimposed upon said predetermined advertisement image, said provision image data being received from a predetermined data providing apparatus via a network;
   generating transmission image data of a transmission image for displaying said provision image based on said provision image data onto predetermined display means, inlaying said predetermined user image as superimposed upon said predetermined advertisement image into said template image of said provision image, and displaying said predetermined user image together with said template image in preference to said predetermined advertisement image until said predetermined user image is detached from said template image; and
   transmitting said transmission image data to a predetermined destination via said network;
   wherein said step of receiving provision image data receives said tranmission image data from another device, and said step of generating transmission image data generates new transmission image data of a new transmission image for displaying said transmission image based on said transmission image data onto said display means, detaches said predetermined user image from said transmission image to display said provision image, inlays said new user image as superimposed upon said predetermined advertisement image into said template image of said provision image, and displays a new user image together with said template image in preference to said predetermined advertisement image until said new user image is detached from said template image.

6. A data providing system, comprising:
a data providing apparatus, including:
associating means for issuing an identifier to each of a template image in which a predetermined user image can be superimposed upon a predetermined inlay image and said inlay image to associate them with each other,
provision image data generating means for generating provision image data of a provision image that is reusable by inlaying said predetermined inlay image into said associated template image, and
providing-side transmitting means for transmitting said provision image data via a network; and
a data acquisition apparatus, including:
transmitting-side receiving means for receiving said provision image from said data providing apparatus via said network,
transmission image data generating means for generating transmission image data of a transmission image for inlaying said predetermined user image as superimposed upon said predetermined inlay image into said template image of said provision image based on said provision image data, and displaying said predetermined user image in preference to said predetermined inlay image until said predetermined user image is detached from said template image, and
acquiring-side transmitting means for transmitting said transmission image data to a predetermined destination via said network.

7. The data providing system according to claim 6, wherein said associating means of said data providing apparatus issues said identifier to a predetermined advertisement image as said inlay image to associate said advertisement image with said template image, said provision image data generating means of said data providing apparatus generates said provision image data of said provision image which is reusable by inlaying said predetermined advertisement image into said template image, and said transmission image data generating means of said data acquisition apparatus generates said transmission image data while displaying said provision image based on said provision image data on predetermined display means.

8. A data acquisition apparatus, comprising:
acquiring-side receiving means for receiving provision image data of a reusable provision image generated by inlaying a predetermined inlay image into a predetermined template image associated with an issued identifier, said provision image data being received from a predetermined data providing apparatus via a network;
transmission image data generating means for generating transmission image data of a transmission image for inlaying a predetermined user image as superimposed upon said inlay image into said template image of said provision image based on said provision image data, and displaying said predetermined user image in preference to said predetermined inlay image until said predetermined user image is detached from said template image; and
acquiring-side transmitting means for transmitting said transmission image data to a predetermined destination via said network;
wherein said acquiring-side receiving means receives, from said data providing apparatus via said network, said provision image data of said provision image generated by inlaying a predetermined advertisement image into said template image as said inlay image and said transmission image data generating means generates said transmission image data while displaying said provision image based on said provision image data onto a predetermined display means.

9. A data providing system, comprising:
a data providing apparatus, including:
associating means for issuing an identifier to each of at least one template image in which a predetermined user image can be inlaid into a predetermined advertisement image as superimposed upon said predetermined advertisement image and to said at least one predetermined advertisement image to associate said at least one template image with said one predetermined advertisement image,
storage means for storing into a predetermined recording medium said at least one template image and said at least one predetermined advertisement image along with said identifiers thereof,
provision image data generating means for generating provision image data added with said identifier corresponding to a reusable provision image in which said predetermined advertisement image is inlaid in said associated template image, and
providing-side transmitting means for transmitting said provision image data via a network; and
a data acquisition apparatus, including:
acquiring-side receiving means for receiving said provision image data from said data providing apparatus via said network,
transmission image data generating means for generating transmission image data by inlaying said predetermined user image as superimposed upon said predetermined advertisement image into said template image of said provision image based on said provision image data, and adding said identifier to said provision image that displays said predetermined user image in preference to said predetermined advertisement image until said predetermined user image is detached for reuse from said template image, and
acquiring-side transmitting means for transmitting said transmission image data to a predetermined destination from said network via said data providing apparatus,
wherein said data providing apparatus extracts said identifier from said transmission image data to be transmitted from said data acquisition apparatus via said network though said provision image data generating means, retrieves a new associated advertisement image from said storage means on the basis of said extracted identifier, and updates said provision image used for generating said transmission image data based on said retrieved advertisement image.

10. A data providing apparatus, comprising:
associating means for issuing an identifier to each of at least one template image in which a predetermined user image can be inlaid into a predetermined advertisement image as superimposed on said predetermined advertisement image and to said at least one predetermined advertisement image to associate said at least one template image with said at least one predetermined advertisement image;
storage means for storing into a predetermined recording medium said at least one template image and said at least one predetermined advertisement image along with said respective identifiers thereof;
provision image data generating means for generating provision image data added with said at least one identifier corresponding to a reusable provision image in which said predetermined advertisement image is inlaid in said associated template image; and providing-side transmitting means for transmitting said provision image data via a network; and providing-side receiving means for receiving transmission image data generated by adding said received identifier to said provision image for inlaying said user image into said template image of said provision image as superimposed upon said advertisement image based on said provision image data halfway in a transmission from a data acquiring apparatus to a predetermined destination via said network as a result of said transmission of said provision image data to said data acquiring apparatus and displaying said user image in preference to said advertisement image until said user image is detached from said template image for reuse, wherein said provision image data generating means extracts said identifier from said transmission image data and reads a new associated advertisement image from said storage means based on said extracted identifier, by use of the retrieved new advertisement image updates said provision image used for generating said transmission image data, and said providing-side transmitting means transmits said transmission image data generated by updating said provision image to said predetermined destination via said network.

11. The data providing apparatus according to claim 10, wherein said provision image data generating means reads said new associated advertisement image from said storage means on the basis of said identifier extracted from said transmission image data and a date of the transmission of said transmission image data and, by use of said retrieved advertisement image, updates said provision image used for generating said transmission image data.

12. A data acquiring apparatus, comprising:

acquiring-side receiving means for receiving provision image data generated by adding an identifier corresponding to a reusable provision image generated by inlaying an advertisement image into a template image that are transmitted in a predetermined data providing apparatus in which said identifier is issued to each of said template image and said advertisement image to associate with said images;

transmission image data generating means for generating transmission image data by adding said identifier to said provision image generated by inlaying said user image into said template image of said provision image based on said provision image data, and until said user image is detached from said template image for reuse displaying said user image in preference to said advertisement image; and acquiring-side transmitting means for transmitting said transmission image data from said network to a predetermined destination though said data providing apparatus to update said advertisement image of said provision image used for generating said transmission image data based on said identifier.

13. A data providing system, comprising:

a data providing apparatus, including:

issuing means for issuing an identifier to a predetermined template image, storage means for storing said template image along with said identifier into a predetermined recording medium, and providing-side transmitting means for transmitting said template image and said corresponding identifier via a network;

a data acquiring apparatus, including:

acquiring-side receiving means for receiving said template image and said identifier from said data providing apparatus via said network, transmission image data generating means for generating transmission image data composed of a predetermined user image that is inlaid into said template image and said identification information, and acquiring-side transmitting means for transmitting said transmission image data to a predetermined destination via said network; and a data relay apparatus, including:

relay-side receiving means for receiving in a relay manner said transmission image data transmitted from said data acquiring apparatus to said predetermined destination via said network, capturing means for extracting said identification information from said transmission image data and based on said extracted identification information capturing said corresponding template image from said data providing apparatus, and relay-side transmitting means for adding said template image to said transmission image data to transmit said transmission data to said predetermined destination via said network.

14. The data providing system according to claim 13, wherein said data providing apparatus further includes:

associating means for associating an advertisement image to which an identifier has been issued by said issuing means with said identifier of said template image, and provision image data generating means for generating provision image data of a provision image with said advertisement image inlaid into said associated template image;

said storage means of said data providing apparatus stores said advertisement image and said identifier corresponding thereto and said template image and said identifiers corresponding thereto into said recording medium;

said providing-side transmitting means of said data providing apparatus transmits said provision image data and at least one of said corresponding identifiers via said network;

said transmission image data generating means of said data acquiring apparatus generates manipulation information obtained by manipulating said provision image data by inlaying, as superimposed upon said advertisement image, said user image into said template image of said provision image based on said provision image data received at said acquiring-side receiving means;

said acquiring-side transmitting means of said data acquiring apparatus transmits said transmission image data added with said manipulation information to said predetermined destination;

said relay-side receiving means of said data relay apparatus receives in a relaying manner said transmission image data added with said manipulation information from said data acquiring apparatus via said network;

said capturing means of said data relay apparatus extracts said identification information from said transmission image data added with said manipulation information and, on the basis of the extracted identification information, captures said corresponding template image and said corresponding advertisement image from said data providing apparatus;

and said relay-side transmitting means of said data relay apparatus adds said template image and said advertisement image to said transmission image data added with said manipulation information and transmits the resultant transmission image data to said predetermined destination via said network.

15. A data providing apparatus, comprising:

issuing means for issuing an identifier to a predetermined template image;

storage means for storing said predetermined template image along with said identifier into a predetermined recording medium;

providing-side transmitting means for transmitting said template image and said corresponding identifier via said network and, when transmission image data composed of a predetermined user image that is to be inlaid into said template image at a predetermined acquiring side and said identifier are relayed by a predetermined relay apparatus for transmission to a predetermined destination transmitting said corresponding template image requested by said data relay apparatus based on said identifier to said data relay apparatus;

associating means for associating an advertisement image to which an identifier has been issued by said issuing means with said identifier of said template image; and provision image data generating means for generating provision image data of a provision image with said advertisement image inlaid into said associated template image;

wherein said storage means stores said advertisement image and said identifier corresponding thereto and said template image and said identifier corresponding thereto into said recording medium, and said providing-side transmitting means transmits said provision image data and at least one of said corresponding identifiers via said network and, when said transmission image data added with manipulation information obtained by manipulating said provision image data so that said user image is inlaid, as superimposed upon said advertisement image, into said template image of said provision image based on said provision image data to display said user image in preference to said advertisement image are relayed by said data relay apparatus to a predetermined destination, transmit said corresponding template image and said corresponding advertisement image requested by said data relay apparatus on the basis of said identifier to said data relay apparatus.

16. A data acquiring apparatus, comprising:

acquiring-side receiving means for receiving, from a predetermined data providing apparatus for storing a predetermined template image and an identifier issued to said template image said template image and said identifier via a network;

transmission image data generating means for generating transmission image data composed of a predetermined user image to be inlaid into said template image and said identification information; and acquiring-side transmitting means for transmitting said transmission image data by relaying from said network to a predetermined destination though a predetermined data relay apparatus that captures said corresponding template image from said data providing apparatus based on said identifier to add said captured template image to said transmission image data;

acquiring-side receiving means for receiving from a predetermined data providing apparatus for storing a predetermined template image and an identifier issued to said template image said template image and said identifier via a network;

transmission image data generating means for generating transmission image data composed of a predetermined user image to be inlaid into said template image and said identification information; and acquiring-side transmitting means for transmitting said transmission image data by relaying from said network to a predetermined destination though a predetermined data relay apparatus that captures said corresponding template image from said data providing apparatus based on said identifier to add said captured template image to said transmission image data.

17. The data acquiring apparatus according to claim 16, wherein said acquiring-side receiving means receives provision image data of a provision image with said advertisement image inlaid into said template image associated with each other by their identifiers and at least one of said corresponding identifiers from said data providing apparatus via said network; said transmission image data generating means generates manipulation information obtained by inlaying said user image into said template image of said provision image based on said provision image data as superimposed upon said advertisement image and manipulating said provision image data so that said user image is displayed in preference to said advertisement image; and said acquiring-side transmitting means adds said manipulation information to said transmission image data and transmits from said network to said predetermined destination though said data relay apparatus which captures said template image and said advertisement image corresponding to each other from said data providing apparatus on the basis of said identifier to add the captured images to said transmission image data.

18. A data acquiring apparatus, comprising:

acquiring-side receiving means for receiving provision image data of a provision image with an advertisement image inlaid into a predetermined template image and an identifier previously issued to said template image from a predetermined data providing apparatus via a network;

transmission image data generating means for generating transmission image data by manipulating said provision image data by presenting said provision image based on said provision image data displayed on predetermined display means and then inlaying said user image into said template image of said provision image as superimposed upon said advertisement image so that said user image is displayed in preference to said advertisement image; and acquiring-side transmitting means for adding said identifier of said template image to said transmission image data in order to count a number of times said template image has been used for product advertisement though said advertisement image and transmitting said resultant transmission image data to a predetermined destination via said network;

wherein said acquiring-side receiving means receives said provision image data and an identifier issued beforehand to said advertisement image of said provision image data from said data providing apparatus via said network and said acquiring-side transmitting means adds said identifier to said transmission image data in order to count the number of times said advertisement image has been used for product advertisement and transmits the resultant transmission image data to said predetermined destination via said network.

19. A data acquiring method, comprising:

receiving provision image data of a provision image with an advertisement image inlaid into a predetermined template image and an identifier previously issued to said template image from a predetermined data providing apparatus via a network;

generating transmission image data by manipulating said provision image data by presenting said provision image based on said provision image data displayed on predetermined display means and then inlaying said user image into said template image of said provision image as superimposed upon said advertisement image so that said user image is displayed in preference to said advertisement image; and adding said identifier of said template image to said transmission image data to count a number of times said template image has been used for product advertisement through said advertisement image and transmitting said resultant transmission image data to a predetermined destination via said network;

wherein said step of receiving provision image data receives said provision image data and an identifier issued beforehand to said advertisement image of said provision image data from said data providing apparatus via said network, and said adding step adds said identifier to said transmission image data in order to count the number of times said advertisement image has been used for product advertisement and transmits the resultant transmission image data to said predetermined destination via said network.

20. A data providing system, comprising:

a data providing apparatus, including:

provision image data generating means for generating provision image data of a reusable provision image embedded with a program for executing predetermined processing in accordance with contents of a template image and an inlay image by following a predetermined instruction given on said template image and said inlay image, said inlay image being inlaid into said template image into which a predetermined user image can be inlaid as superimposed upon said inlay image, and providing-side transmitting means for transmitting said provision image data via a network; and a data acquiring apparatus, including:

acquiring-side receiving means for receiving said provision image data from said data providing apparatus via said network, transmission image data generating means for generating transmission image data of a transmission-image for inlaying said user image into said template image of said provision image based on said provision image data as superimposed upon said inlay image and until said user image is detached for reuse from said template image displaying said user image in preference to said inlay image and activating said program by following said instruction given on said user image, and acquiring-side transmitting means for transmitting said transmission image data to a predetermined destination via said network.

21. The data providing system according to claim 20, wherein said provision image data generating means generates said provision image data of said reusable provision image embedded with said program for inlaying said inlay image into said template image and transmitting a result of said instruction to a predetermined device which holds another associated provision image or transmission image by following said instruction given on said template image and/or said inlay image.

22. The data providing system according to claim 20, wherein said provision data generating means of said data providing apparatus generates said provision image data of said reusable provision image embedded with said program for inlaying said inlay image into said template image and manipulating said template image and/or said inlay image by following said instruction given on said template image and/or said inlay image.

23. The data providing system according to claim 20, wherein said provision image data generating means generates said provision image data of said reusable provision image embedded with said program for inlaying an advertisement image as said inlay image into said template image and executing said predetermined processing by following said instruction given on said template image and/or said advertisement image.

24. A data providing apparatus, comprising:

provision image data generating means for generating provision image data of a reusable provision image embedded with a program for executing predetermined processing in accordance with contents of a template image and an inlay image by following an instruction given on said template image and said inlay image which is inlaid into said template image into which a predetermined user image can be inlaid as superimposed upon said inlay image, said provision image data providing transmission image for activating said program in accordance with said instruction given on said user image that is displayed in preference to said inlay image until said user image is detached from said template image, said user image being inlaid into said template image by a predetermined data acquiring apparatus as superimposed upon said inlay image; and providing-side transmitting means for transmitting said provision image data to said data acquiring apparatus via said network;

wherein said provision image data generating means generates said provision image data of said reusable provision image embedded with said program for inlaying said inlay image into said template image and, by following said instruction given on said template image and/or said inlay image, transmitting a result of said instruction to a predetermined device holding another associated provision image or transmission image.

25. The data providing apparatus according to claim 24, wherein said provision image data generating means of said data providing apparatus generates said provision image data of said reusable provision image embedded with said program for inlaying said inlay image into said template image and, by following said instruction given on said template image and/or said inlay image, manipulating said template image and/or said inlay image.

26. The data providing apparatus according to claim 24, wherein said provision image data generating means of said data providing apparatus generates said provision image data of said reusable provision image embedded with said program for inlaying an advertisement image as said inlay image into said template image and executing said predetermined processing by following said instruction given on said template image and/or said advertisement image.

27. A data acquiring apparatus, comprising:

acquiring-side receiving means for receiving, from a predetermined data providing apparatus via a network, provision image data of a reusable provision image embedded with a program for inlaying an inlay image into a predetermined template image and, in accordance with an instruction given on said template image and said inlay image executing predetermined processing in accordance with contents of said template image and said inlay image;

transmission image data generating means for generating transmission image data of a transmission image for inlaying said user image into said template image of said provision image based on said provision image data as superimposed upon said inlay image and until said user image is detached for reuse from said template image displaying said user image in preference to said inlay image and activating said program by following said instruction given on said user image; and acquiring-side transmitting means for transmitting said transmission image data to a predetermined destination via said network;

wherein said acquiring-side receiving means receives, from said data providing apparatus via said network, provision image data of reusable provision image embedded with said program for inlaying said inlay image into said template image and, by following an instruction given on said template image and/or said inlay image, transmitting a result of said instruction to a predetermined device holding another associated provision image or transmission image; and said transmission image data generating means generates said transmission image data of said transmission image by writing an address of a destination of said result of said instruction to said program so that said user image is inlaid into said template image of said provision image based on said provision image data as superimposed upon said inlay image and then, until said user image is detached for reuse from said template image, said user image is displayed in preference to said inlay image, and said result of said instruction is transmitted by activating said program by following said instruction given on said user image.

28. The data acquiring apparatus according to claim 27 wherein said acquiring-side receiving means receives said result of said instruction given on said user image of said transmission image from another predetermined device via said network; and said transmission image data generating means manipulates said template image, said inlay image, and/or said user image of said corresponding transmission image on the basis of said result of said instruction.

29. The data acquiring apparatus according to claim 27, wherein said acquiring-side receiving means receives, from said data providing apparatus via said network, provision image data of reusable provision image embedded with said program for inlaying said inlay image into said template image and manipulating said template image and/or said inlay image by following an instruction given on said template image and/or said inlay image; and said transmission image data generating means generates said transmission image data of said transmission image for manipulating said user image by inlaying said user image into said template image of said provision image based on said provision image data as superimposed upon said inlay image and then, until said user image is detached from said template image, displaying said user image in preference to said inlay image, and activating said program by following said instruction given on said user image.

* * * * *